United States Patent
Abe et al.

(10) Patent No.: US 8,074,755 B2
(45) Date of Patent: Dec. 13, 2011

(54) HYBRID VEHICLE

(75) Inventors: Noriyuki Abe, Saitama-ken (JP); Shigemitsu Akutsu, Saitama-ken (JP)

(73) Assignee: Honda Motor Co., Ltd., Minato-Ku, Tokyo (JP)

(*) Notice: Subject to any disclaimer, the term of this patent is extended or adjusted under 35 U.S.C. 154(b) by 389 days.

(21) Appl. No.: 12/309,916

(22) PCT Filed: Aug. 9, 2007

(86) PCT No.: PCT/JP2007/065602
§ 371 (c)(1), (2), (4) Date: Feb. 3, 2009

(87) PCT Pub. No.: WO2008/018539
PCT Pub. Date: Feb. 14, 2008

(65) Prior Publication Data
US 2009/0250280 A1 Oct. 8, 2009

(30) Foreign Application Priority Data
Aug. 10, 2006 (JP) .................... 2006-217742

(51) Int. Cl.
*B60W 10/06* (2006.01)
*B60W 10/08* (2006.01)
(52) U.S. Cl. .............. 180/65.265; 903/906; 903/930; 310/112
(58) Field of Classification Search ............ 180/65.265, 180/65.275, 65.285; 903/930, 906; 310/103, 310/112, 113, 114, 266, 268
See application file for complete search history.

(56) References Cited

U.S. PATENT DOCUMENTS
5,272,401 A * 12/1993 Lin ................. 310/49.51
(Continued)

FOREIGN PATENT DOCUMENTS
JP 10-023721 1/1998
(Continued)

OTHER PUBLICATIONS
European Search Report application No. 07792254.0 dated Apr. 22, 2010.

*Primary Examiner* — John Walters
(74) *Attorney, Agent, or Firm* — Squire, Sanders & Dempsey (US) LLP

(57) ABSTRACT

In a hybrid vehicle, a motor includes a first rotor having permanent magnets, and a second rotor having a cores. The first rotor is connected to front wheels, and the second rotor to an engine. When the magnetic poles of rotating magnetic fields of armatures and of the permanent magnets are in respective positions opposed to each other, if either of the magnetic poles of the rotating magnetic fields and either of the magnetic poles of the permanent magnets have polarities different from each other, the others of the magnetic poles of the rotating magnetic fields and of the magnetic poles of the permanent magnets have the same polarities. If either of the cores are between the magnetic poles of the rotating magnetic fields and of the permanent magnets, the others are positioned between adjacent two pairs of the magnetic poles of the rotating magnetic fields and the permanent magnets.

40 Claims, 26 Drawing Sheets

U.S. PATENT DOCUMENTS

| | | | |
|---|---|---|---|
| 5,675,203 A * | 10/1997 | Schulze et al. | 310/113 |
| 5,723,928 A | 3/1998 | Imai et al. | |
| 5,744,895 A * | 4/1998 | Seguchi et al. | 310/266 |
| 6,369,481 B1 * | 4/2002 | Bahn | 310/166 |
| 6,380,653 B1 * | 4/2002 | Seguchi | 310/112 |
| 6,472,845 B2 * | 10/2002 | Minagawa et al. | 318/801 |
| 7,296,648 B2 * | 11/2007 | Tatara et al. | 180/242 |
| 7,781,930 B2 * | 8/2010 | Abe et al. | 310/103 |

FOREIGN PATENT DOCUMENTS

| | | |
|---|---|---|
| JP | 11-164535 | 6/1999 |
| JP | 2000-197324 | 7/2000 |
| JP | 2001-095186 | 4/2001 |
| JP | 2001-157304 | 6/2001 |
| WO | 2005/112235 A1 | 11/2005 |

* cited by examiner

FIG. 10
(a)
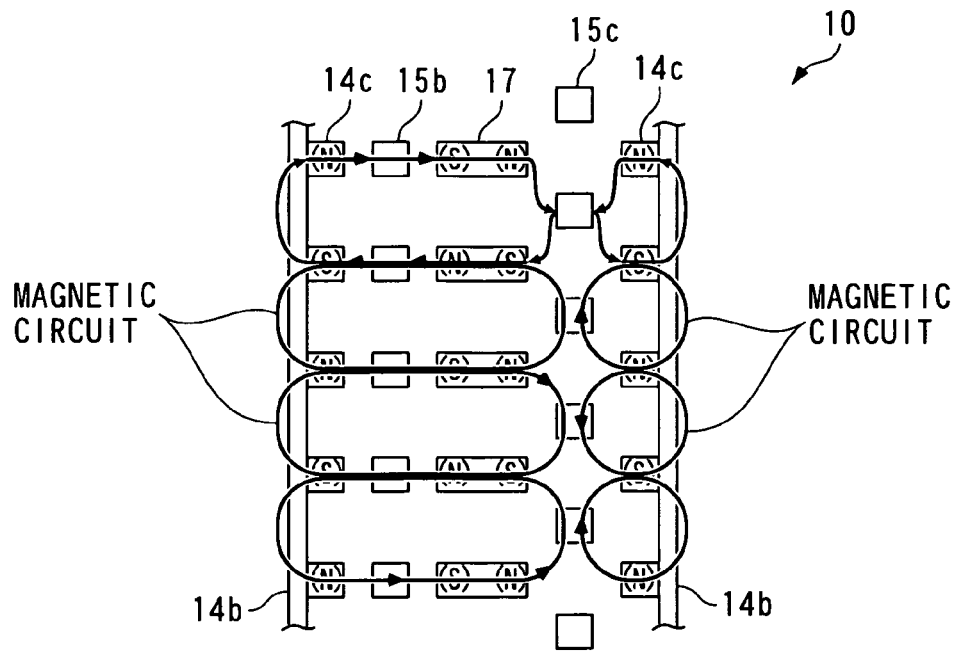
(b)
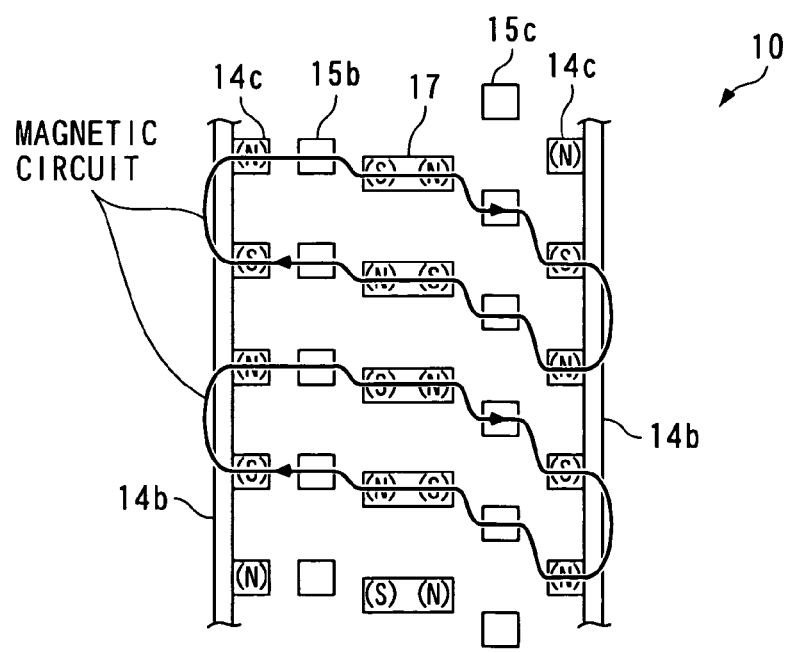

F I G. 1 1
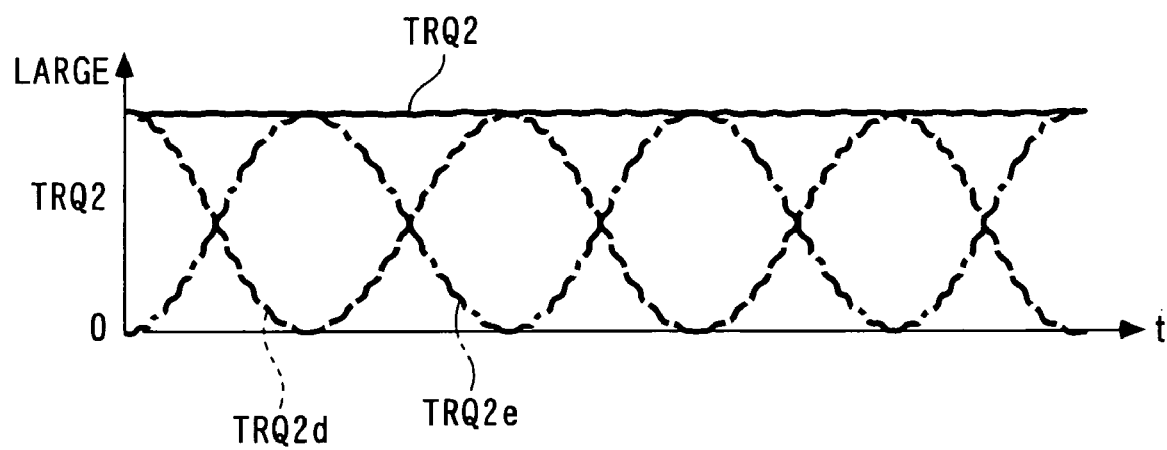

F I G. 1 2
(a)
WHEN FIRST ROTOR IS AT REST (V1=0)
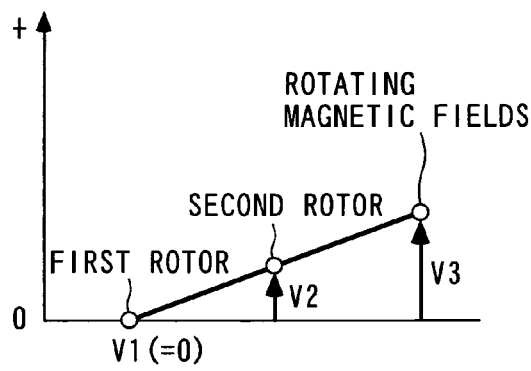
(b)
WHEN SECOND ROTOR IS AT REST (V2=0)
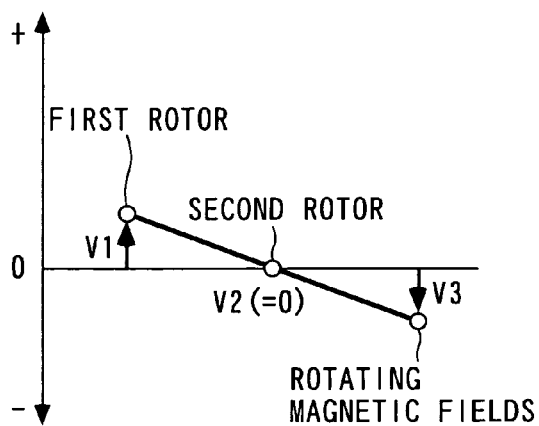
(c)
WHEN ALL ROTORS ROTATE and ROTATING MAGNETIC FIELDSS ARE GENERATED
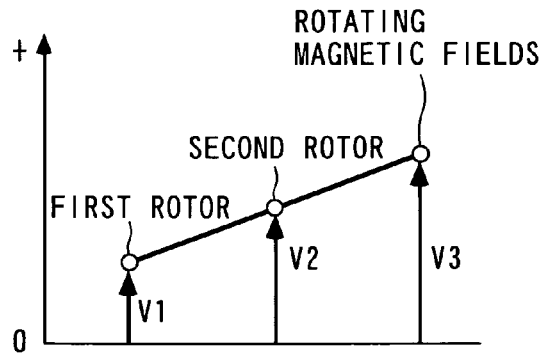
(d)
WHEN ROTATING MAGNETIC FIELDSS ARE STOPPED (V3=0)
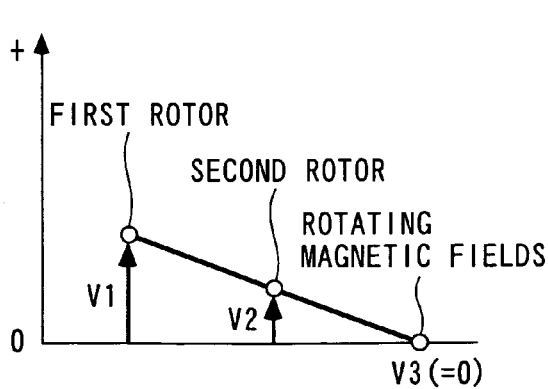

FIG. 13
(a)
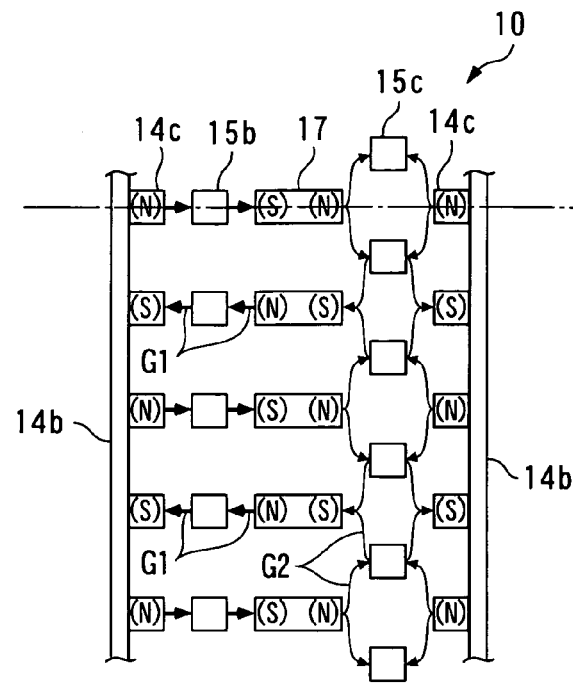
(b)
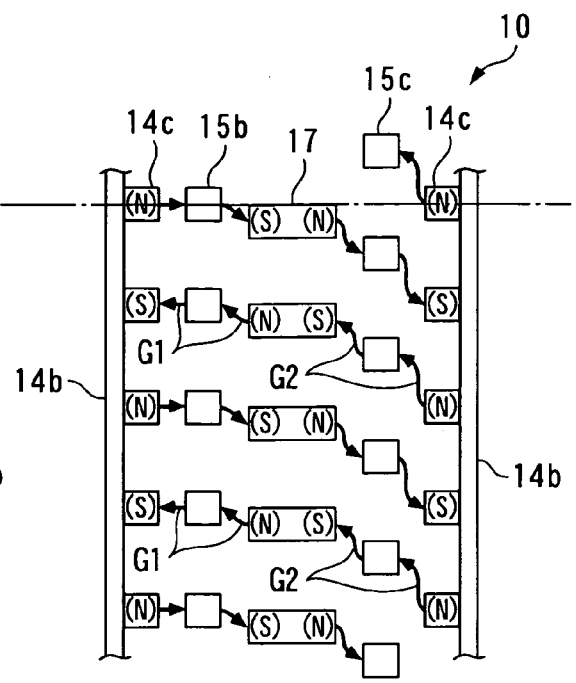
(c)
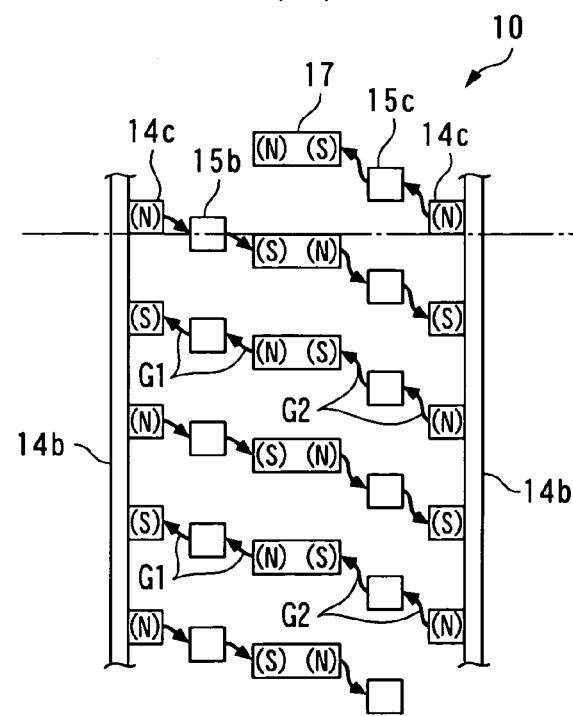
(d)
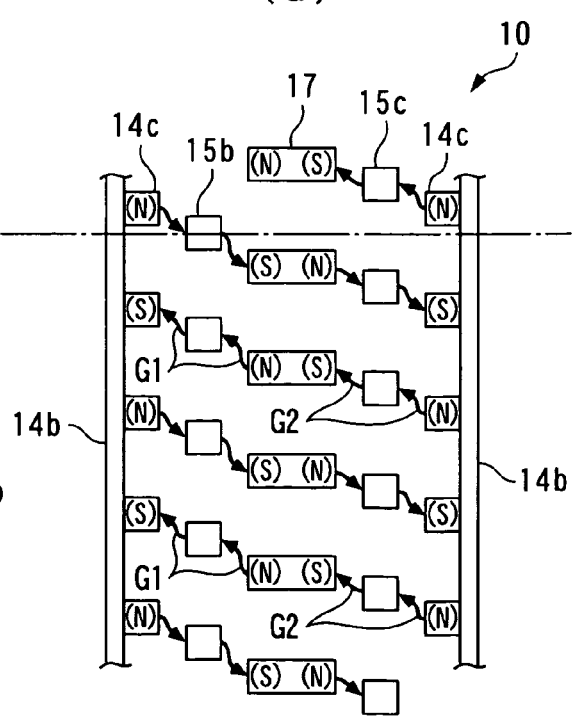

F I G. 1 7
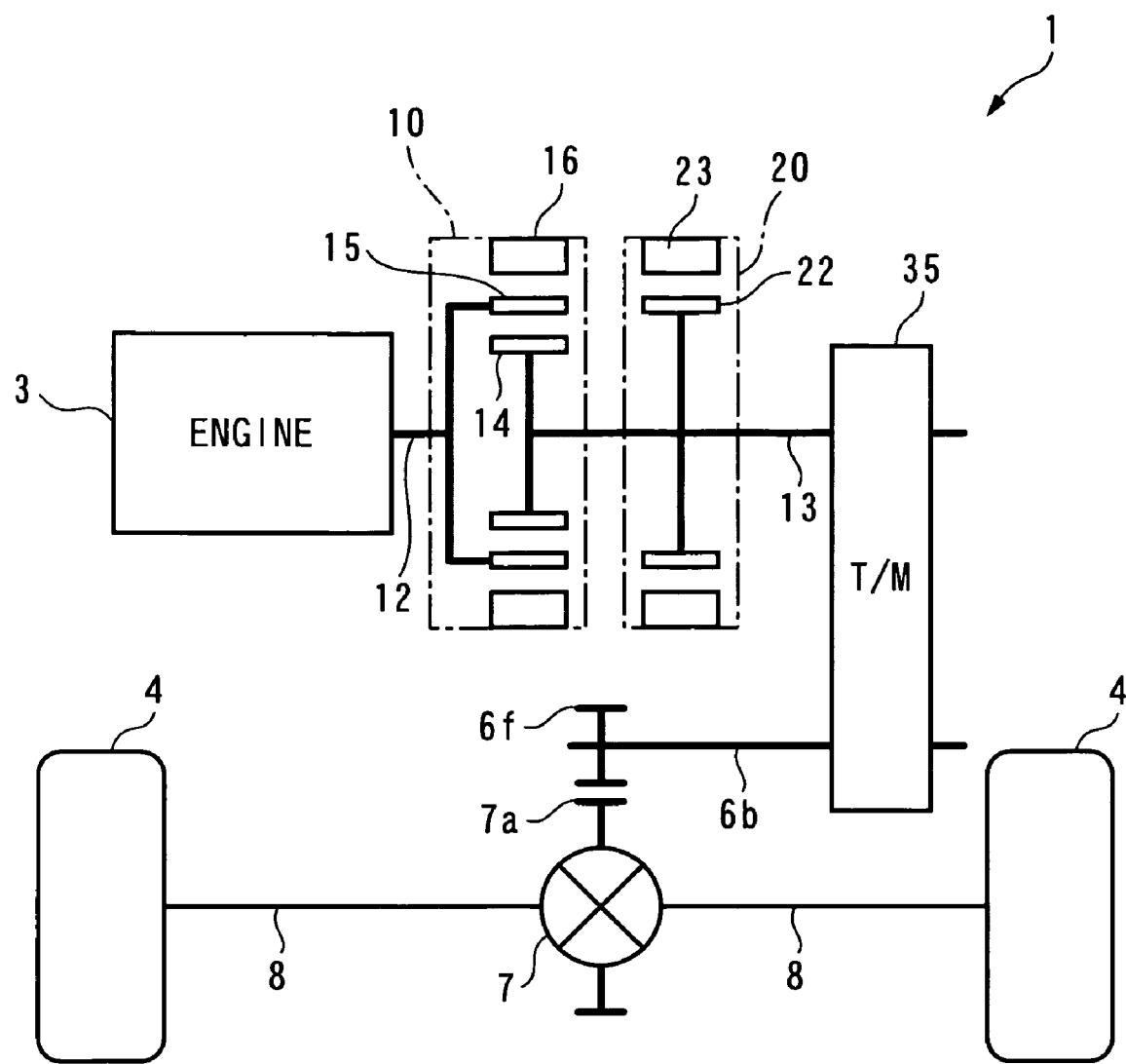

HYBRID VEHICLE

FIELD OF THE INVENTION

The present invention relates to a hybrid vehicle using an engine and electric motors as power sources.

BACKGROUND ART

Conventionally, as hybrid vehicle, one disclosed in Patent Literature 1 is known. This hybrid vehicle is comprised of an engine as a power source, a first electric motor and a second electric motor provided between the engine and drive wheels, a power storage device for storing electric power caused by the first electric motor and the second electric motor, and so forth. The first electric motor includes a stator, an intermediate rotor, and an inner rotor, which are concentrically arranged from a radially outer side toward a radially inner side.

The stator is formed by winding three-phase coils on an iron core. The stator has an annular shape in cross-section, and is fixed to a housing. Further, the intermediate rotor as well is formed by winding three-phase coils on an iron core, such that it has a smaller diameter than that of the stator and has an annular shape in cross-section. Furthermore, the intermediate rotor is mechanically connected to an output shaft of the engine via a speed-increasing gear, whereby it is driven by torque from the engine. Further, in an example illustrated in FIG. 2 of the publication, the inner rotor has permanent magnets arranged on an outer peripheral portion of an iron core thereof, and is mechanically connected to a rotor of the second electric motor, described hereinafter.

On the other hand, the second electric motor is formed by a three-phase synchronous AC machine, and includes a stator and a rotor. The stator is formed by winding three-phase coils on an iron core, such that it has an annular shape in cross-section, and is fixed to a housing. Further, the rotor has permanent magnets arranged on an outer peripheral portion of the iron core thereof, and is connected to the drive wheels via a drive shaft.

In the hybrid vehicle configured as above, demanded torque of the engine is determined according to the vehicle speed, an accelerator pedal opening, and a shift position, and torques generated by the first electric motor and the second electric motor, and the amount of electric power regenerated by the first and second electric motors are controlled according to the demanded torque, the rotational speed of the engine, and the charged state of the power storage device.

[Patent Literature 1] Japanese Laid-Open Patent Publication (Kokai) No. 2000-197324.

DISCLOSURE OF THE INVENTION

According to the above described conventional hybrid vehicle, the intermediate rotor of the first electric motor is formed by winding three-phase coils on its iron core, and hence it is low in durability. Further, the first electric motor has drawbacks in that the intermediate rotor has a relatively large weight due to the above construction and that it has a low efficiency since an induction machine is formed by the stator and the intermediate rotor. Particularly, since the intermediate rotor is mechanically connected to the engine, it is frequently driven by the engine during traveling of the vehicle. This makes the above drawbacks more conspicuously noticeable, resulting in degraded marketability of the hybrid vehicle.

The present invention has been made to provide a solution to the above-described problems, and an object thereof is to provide a hybrid vehicle which is capable of enhancing the durability and efficiency of an electric motor when the electric motor is mechanically connected to an engine, thereby making it possible to improve marketability of the hybrid vehicle.

To attain the object, the invention as claimed in claim 1 provides a hybrid vehicle 1, 1A, 1B, and 1C comprising an engine 3, a first electric motor 10 including a stator 16, a first rotor 14 and a second rotor 15 relatively rotatable with respect to the stator 16, one of the first rotor 14 and the second rotor 15 being mechanically connected to the engine 3, and first drive wheels (front wheels 4) mechanically connected to the other of the first rotor 14 and the second rotor 15 of the first electric motor 10, wherein the stator 16 includes a first armature row formed by a plurality of first armatures (armatures 16b) arranged side by side in a circumferential direction, for generating a first rotating magnetic field rotating in a predetermined rotating direction, by magnetic poles generated on the first armatures along with supply of electric power, and a second armature row formed by a plurality of second armatures (armatures 16b) arranged side by side in the circumferential direction, for generating a second rotating magnetic field rotating in the predetermined rotating direction, by magnetic poles generated on the second armatures along with supply of electric power, wherein the first rotor 14 includes a first magnetic pole row which is formed by a plurality of first magnetic poles (magnetic poles of permanent magnets 14c) arranged in the circumferential direction, each two adjacent ones of the first magnetic poles having polarities different from each other, and is arranged in a manner opposed to the first armature row, and a second magnetic pole row which is formed by a plurality of second magnetic poles (magnetic poles of permanent magnets 14c) arranged in the circumferential direction, each two adjacent ones of the second magnetic poles having polarities different from each other, and is arranged in a manner opposed to the second armature row, wherein the second rotor 15 includes a first soft magnetic material element row formed by a plurality of first soft magnetic material elements (first cores 15b) arranged in the circumferential direction at predetermined intervals, and is arranged between the first armature row and the first magnetic pole row, and a second soft magnetic material element row formed by a plurality of second soft magnetic material elements (second cores 15c) arranged in the circumferential direction at predetermined intervals, and is arranged between the second armature row and the second magnetic pole row, wherein when each magnetic pole of the first armature and each the first magnetic pole are opposed to each other, each magnetic pole of the second armature and each the second magnetic pole are opposed to each other, when each magnetic pole of the first armature and each the first magnetic pole opposed to each other have polarities different from each other, each magnetic pole of the second armature and each the second magnetic pole opposed to each other have a same polarity, and when each magnetic pole of the first armature and each the first magnetic pole opposed to each other have a same polarity, each magnetic pole of the second armature and each the second magnetic pole opposed to each other have polarities different from each other, and wherein when each magnetic pole of the first armature and each the first magnetic pole are opposed to each other, if each the first soft magnetic material element is in a position between the magnetic pole of the first armature and each the first magnetic pole, each the second soft magnetic material element is in a position between circumferentially adjacent two pairs of the magnetic poles of the second armatures and the second magnetic poles, and if each the second soft magnetic material element is in a position between the magnetic pole of the second armature and the second magnetic pole, each the first soft magnetic material element is in a position between circumferentially adjacent two pairs of the magnetic poles of the first armatures and the first magnetic poles.

According to this hybrid vehicle, the first soft magnetic material element row of the second rotor is disposed between the first armature row and the first magnetic pole row, and hence when electric power is supplied to the first armature row to thereby generate the first rotating magnetic field, the first soft magnetic material elements are magnetized by magnetic poles (hereinafter referred to as "the first armature magnetic poles") generated on the first armatures, and the first magnetic poles. Since the first soft magnetic material elements are thus magnetized, and further each two adjacent ones of the first soft magnetic material elements are arranged at predetermined intervals, magnetic lines of force (hereinafter referred to as "the first magnetic force lines") are generated between the first armature magnetic poles, the first soft magnetic material elements, and the first magnetic poles. Similarly, since the second soft magnetic material element row of the second rotor is disposed between the second armature row and the second magnetic pole row, when the second rotating magnetic field is generated by supplying electric power to the second armature row, the second soft magnetic material elements are magnetized by magnetic poles (hereinafter referred to as "the second armature magnetic poles") generated on the second armatures, and the second magnetic poles. Since the second soft magnetic material elements are thus magnetized, and further each two adjacent ones of the second soft magnetic material elements are arranged at predetermined intervals, magnetic lines of force (hereinafter referred to as "the second magnetic force lines") are generated between the second armature magnetic poles, the second soft magnetic material elements, and the second magnetic poles.

In a case where the vehicle is at a stop with the engine at rest, when the first and second rotating magnetic fields are simultaneously generated as described above, if each first soft magnetic material element is in a position between each first armature magnetic pole and each first magnetic pole in a state where the first armature magnetic pole and the first magnetic pole opposed to each other have polarities different from each other, the length of the first magnetic force line becomes shortest, and the total magnetic flux amount thereof becomes substantially largest. Further, in this case, each second armature magnetic pole and each second magnetic pole opposed to each other have a same polarity, and each second soft magnetic material element is positioned between circumferentially adjacent two pairs of second armature magnetic poles and second magnetic poles. In this state, the second magnetic force line is large in the degree of bend thereof and largest in its length, with the smallest total magnetic flux amount (it should be noted that throughout the specification, "when the first armature magnetic pole(s) and the first magnetic pole(s) are opposed to each other" is not intended to mean that the centers of the two are in quite the same position in the circumferential direction, but to also mean that they are in respective positions slightly different from each other).

In general, when the magnetic line of force is bent due to presence of a soft magnetic material element between two magnetic poles different in polarity, a magnetic force acts on the soft magnetic material element and the magnetic pole such that the length of the magnetic line of force is reduced, and the magnetic force has a characteristic that it becomes larger as the degree of bend of the magnetic line of force is larger and the total amount of magnetic flux thereof is larger. Therefore, as the degree of bend of the first magnetic force line is larger and the total amount of magnetic flux thereof is larger, a larger magnetic force acts on the first soft magnetic material element. That is, the magnetic force acting on the first soft magnetic material element has a characteristic that it is determined depending on the synergistic action of the degree of bend of the first magnetic force line and the total magnetic flux amount thereof. Similarly, the magnetic force acting on the second soft magnetic material element also has a characteristic that it is determined depending on the synergistic action of the degree of bend of the second magnetic force line and the total magnetic flux amount thereof.

Therefore, when the first rotating magnetic field starts to rotate in the predetermined rotating direction from the state in which each first soft magnetic material element is in a position between each first armature magnetic pole and each first magnetic pole having polarities different from each other, each first magnetic force line having a large total magnetic flux amount starts to be bent, so that a relatively strong magnetic force acts on the first soft magnetic material element and the first magnetic pole by the synergistic action of the degree of bend of the first magnetic force line and the total magnetic flux amount thereof. At this time, when the first rotor has much larger rotational resistance than that of the second rotor, this causes the second rotor to be driven in the rotating direction of the first rotating magnetic field in a state where the first rotor remains at rest. Further, simultaneously with the start of the first rotating magnetic field, the second rotating magnetic field also starts to rotate in the predetermined rotating direction, and accordingly, each second armature magnetic pole starts to rotate from a position where it is opposed to each second magnetic pole having the same polarity, toward each second magnetic pole which is adjacent to each second magnetic pole having a different polarity which is adjacent to that having the same polarity. In this state, although the degree of bend of the second magnetic force lines is large, the total magnetic flux amounts thereof are small, and hence by the synergistic action thereof, relatively weak magnetic forces act on the second soft magnetic material elements. As a result, the second rotor is driven by magnetic forces caused by the second magnetic force lines in the predetermined rotating direction with a small driving force.

When the first rotating magnetic field further rotates, although the degree of bend of the first magnetic force lines increases, the distance between the first armature magnetic poles and the first magnetic poles which have a different polarity increases to reduce the total magnetic flux amounts of the first magnetic force lines. This weakens the magnetic forces acting on the first soft magnetic material elements by the synergistic action of the degree of bend of the first magnetic force lines and the total magnetic flux amounts thereof, to reduce the driving force caused by the first magnetic force lines to act on the second rotor. On the other hand, the second rotating magnetic field as well further rotates in the predetermined rotating direction simultaneously with the rotation of the first rotating magnetic field, whereby each second armature magnetic pole rotates from the position opposed to each second magnetic pole having the same polarity, toward each second magnetic pole having a different polarity which is adjacent to that having the same polarity. Although the degree of bend of the second magnetic force lines decreases along with the rotation of the second armature magnetic poles, the total magnetic flux amounts thereof increase, whereby the synergistic action of the degree of bend of the second magnetic force lines and the total magnetic flux amounts thereof makes the magnetic forces acting on the second soft magnetic material elements stronger to increase the driving force caused by the second magnetic force lines to act on the second rotor.

Then, when each first armature magnetic pole is brought to each first magnetic pole having the same polarity, each first soft magnetic material element is brought to a position between two pairs of first armature magnetic poles and first magnetic poles adjacent to each other in the circumferential direction, whereby although the first magnetic force lines are large in the degree of bend, the total magnetic flux amounts thereof become substantially the minimum. As a result, the magnetic forces acting on the first soft magnetic material elements become substantially weakest by the synergistic action of the degree of bend of the first magnetic force lines and the total magnetic flux amounts thereof, to reduce the driving force caused by the first magnetic force lines to act on the second rotor to substantially the minimum. Then, when each second armature magnetic pole is brought to each second magnetic pole having a different magnetic pole therefrom, the total magnetic flux amount of the second magnetic force line becomes largest and each second soft magnetic material element rotates in a state slightly delayed relative to the second armature magnetic pole, whereby the second magnetic force lines are bent. As a result, the synergistic action of the degree of bend of the second magnetic force lines and the total magnetic flux amounts thereof makes the magnetic forces acting on the second soft magnetic material elements substantially strongest, to substantially maximize the driving force caused by the second magnetic force lines to act on the second rotor.

When the first and second rotating magnetic fields further rotate from the state in which the driving force caused by the first magnetic force lines to act on the second rotor is substantially minimum, and at the same time the driving force caused by the second magnetic force lines to act on the second rotor is substantially maximum, as described above, inversely to the above, the first magnetic force lines decreases in the degree of bend thereof and simultaneously the total magnetic flux amounts thereof increase, and the synergistic action thereof makes the magnetic forces acting on the first soft magnetic material elements stronger to increase driving force caused by the first magnetic force lines to act on the second rotor. On the other hand, the second magnetic force lines increase in the degree of bend thereof, and simultaneously decrease in the total magnetic flux amounts thereof, and the synergistic action thereof makes the magnetic forces acting on the second soft magnetic material elements weaker to lower the driving force caused by the second magnetic force lines to act on the second rotor.

As described hereinabove, the second rotor is driven continuously while repeating a state in which in accordance with the simultaneous rotation of the first and second rotating magnetic fields, the driving force caused by the first magnetic force lines to act on the second rotor, and the driving force caused by the second magnetic force lines to act on the second rotor are increased and decreased alternately. Therefore, when the rotational resistance of the first rotor is much larger than that of the second rotor, the second rotator can be continuously driven by causing the first and second rotating magnetic fields to be generated.

On the other hand, inversely to the above, in a case where the first and second rotating magnetic fields are simultaneously rotated in a state of the rotational resistance of the second rotor being much larger than that of the first rotor, if at the start of rotation of the first and second rotating magnetic fields, each first armature magnetic pole and each first magnetic pole having the same polarity are in a position opposed to each other, and each first soft magnetic material element is in a position between two pairs of first armature magnetic poles and first magnetic poles adjacent to each other in the circumferential direction, as described above, the first magnetic force line is large in the degree of bend thereof and substantially largest in its length, with the substantially smallest total magnetic flux amount.

From this state, if the first and second rotating magnetic fields start to rotate, the first armature magnetic poles of the stator start to move such that they become closer to the first soft magnetic material elements, and at the same time closer to first magnetic poles having a different polarity which are adjacent to those of the first rotor having the same polarity. Along with the motion of the first armature magnetic poles, the first magnetic force lines change such that they become shorter in length, while increasing the total magnetic flux amounts thereof and making the degree of bend thereof considerably larger. As a result, relatively large magnetic forces act on the first magnetic poles by virtue of the synergistic action of the total magnetic flux amounts of the first magnetic force lines and the degree of bend thereof, whereby the first rotor is driven in the direction opposite to the direction of rotation of the first rotating magnetic field.

Then, as the first armature magnetic poles become still closer to the first soft magnetic material elements, the first magnetic poles are also caused to move to become further closer to the first soft magnetic material elements by magnetic forces caused by the first magnetic force lines. When the first armature magnetic poles move to positions where they become closest to the first soft magnetic material elements, the first armature magnetic poles become opposed to first magnetic poles different in polarity with the first soft magnetic material elements positioned therebetween. In this state, the second soft magnetic material elements are positioned between two pairs of second armature magnetic poles and second magnetic poles adjacent to each other in the circumferential direction.

From this state, when the first and second rotating magnetic fields further rotate, the second armature magnetic poles of the stator become closer to the second soft magnetic material elements, and at the same time move such that they become closer to the second magnetic poles having a different polarity which are adjacent to those of the first rotor having the same polarity. Along with the motion of the second armature magnetic poles, the second magnetic force lines change such that they become shorter, while increasing the total magnetic flux amounts thereof and making the degree of bend thereof considerably larger. As a result, relatively large magnetic forces act on the second magnetic poles by virtue of the synergistic action of the total magnetic flux amounts of the second magnetic force lines and the degree of bend thereof, whereby the first rotor is driven in the direction opposite to the rotating direction of the first rotating magnetic field.

As described above, it is possible to drive the first rotor in the direction opposite to the rotating direction of the first and second rotating magnetic fields, with the driving force caused by the first magnetic force lines and the driving force caused by the second magnetic force lines repeatedly alternately acting on the first rotor in accordance with the rotation of the first and second rotating magnetic fields.

Further, in a case where the first rotor is unrotatable, and the second rotor is rotatable, when power is input to the second rotor to start the rotation of the second rotor, since the first rotor is at rest, along with the rotation of the second rotor, the magnetic fields are changed by the positional motions of the first magnetic poles and the first soft magnetic material elements, whereby an induced electromotive force is generated in the first armature row of the stator, and the magnetic fields are changed by the positional motions of the second magnetic poles and the second soft magnetic material elements, whereby an induced electromotive force is generated in the second armature row of the stator.

When the induced electromotive force is generated in such a regenerative state, the current phase of the stator also rotates along with the rotations of the magnetic poles and the soft magnetic material elements, to cause a state where rotating magnetic fields are being generated. In such a state, for example, when electric current supplied to the first and second armature rows is controlled to control the rotational speed and the strength of the induced electromotive force and the rotating magnetic fields, it is possible to transmit the power of the second rotor to the first rotor side via the first magnetic force lines and the second magnetic force lines, while executing electric power regeneration. Especially, when the rotational speed of the rotating magnetic fields is controlled to 0 in the above state, all power from the second rotor can be transmitted to the first rotor insofar as the power is within a range capable of being transmitted (it should be noted that throughout the present specification, "electric power regeneration" is intended to mean generation of electric power using an electric motor.)

As described above, in the first electric motor, when regarding the speed of the rotating magnetic fields of the stator as the rotational speed of the rotating member, the relationship in rotational speed between the first rotor, the second rotor, and the stator is the same as that in rotational speed between a sun gear, a planetary carrier, and a ring gear of a planetary gear unit. Further, when regarding electric power of the stator as power, the first electric motor can be regarded as a planetary gear unit which inputs and outputs power between the first rotor, the second rotor, and the stator. In short, the first electric motor can be regarded as a device having the same operating characteristics as those of the planetary gear unit, and hence by controlling the first electric motor to control the state of generation of the first and second magnetic force lines, power from the engine and/or the first electric motor can be transmitted to the first drive wheels to thereby cause the hybrid vehicle to travel.

The invention as claimed in claim 2 is a hybrid vehicle 1, 1A and 1B as claimed in claim 1, further comprising a control device (MOT•ECU 30, 1ST•PDU 31, 2ND•PDU 32) for controlling electric power supplied to the first armature row and the second armature row of the first electric motor 10, wherein the first rotor 14 of the first electric motor 10 is mechanically connected to the first drive wheels (front wheels 4), and second rotor 15 is mechanically connected to the engine 3.

According to this hybrid vehicle, electric power supplied to the first armature row and the second armature row is controlled, which makes it possible to control the state of generation of the first magnetic force lines and the second magnetic force lines, whereby power transmission between the first rotor and the second rotor by magnetism can be controlled. In addition, the first rotor of the first electric motor is mechanically connected to the first drive wheels, and the second rotor is mechanically connected to the engine. Further, as described above, the first electric motor has the same operating characteristics as the planetary gear unit. Therefore, power from the engine can be transmitted to the second rotor, the first rotor, and the first drive wheels, in the mentioned order, and control the state of transmission thereof.

Furthermore, the second rotor having a soft magnetic material element row is very often driven by the engine during operation of the engine, so that compared with the conventional vehicle in which a rotor formed by winding three-phase coils around an iron core is driven by the engine, the weight of the second rotor can be reduced, whereby it is possible to improve the efficiency and durability of the first electric motor. Furthermore, during operation of the first electric motor, the first and second soft magnetic material elements are magnetized to thereby cause the first electric motor to serve as a synchronous machine, and hence, compared with the conventional first electric motor serving as an induction machine, it is possible to further improve efficiency, thereby further improving marketability.

The invention as claimed in claim 3 is a hybrid vehicle 1, 1B as claimed in claim 2, wherein in a case where the engine 3 is at rest and at the same time the hybrid vehicle 1, 1B is at a stop, when predetermined engine-starting conditions are satisfied, the control device controls the electric power supplied to the first armature row and the scone armature row such that the first rotating magnetic field and the second rotating magnetic field are generated.

According to this hybrid vehicle, the first rotor of the first electric motor is mechanically connected to the first drive wheels, and the second rotor is mechanically connected to the engine. Therefore, in a case where the engine is at rest and at the same time the hybrid vehicle at a stop, the first rotor becomes much larger in rotational resistance than the second rotor. In this state, when predetermined engine-starting conditions are satisfied, if electric power supplied to the first armature row and the second armature row is controlled such that the first rotating magnetic field and the second rotating magnetic field are generated, since the first electric motor has the same operating characteristics as the planetary gear unit, as described above, the second rotor can be continuously driven, whereby power from the first electric motor can be transmitted to the engine via the second rotor. This makes it possible to start the engine by the first electric motor without using a starter or the like, when the hybrid vehicle is at a stop.

The invention as claimed in claim 4 is a hybrid vehicle 1B as claimed in claim 2 or 3, wherein in a case where the engine 3 is in operation and at the same time the hybrid vehicle 1B is at a stop, when predetermined vehicle-starting conditions are satisfied, the control device controls the electric power supplied to the first armature row and the second armature row such that electric power is regenerated from power from the engine 3 by the first electric motor 10, and after starting the regeneration, the regenerated electric power is reduced.

According to this hybrid vehicle, the first rotor is mechanically connected to the first drive wheels, and hence in a case where the engine is in operation and at the same time hybrid vehicle is at a stop, the first rotor is held at rest. On the other hand, the second rotor is mechanically connected to the engine, it rotates along with rotation of the engine. As described above, in this state, along with rotation of the second rotor, a magnetic field is changed by the positional changes of the first magnetic poles and the first soft magnetic material elements, whereby an electromotive force is generated in the first armature row of the stator, and a magnetic field is changed by the positional changes of the second magnetic poles and the second soft magnetic material elements, whereby an electromotive force is generated in the second armature row of the stator.

When the electromotive force is thus generated, along with rotation of the magnetic poles and the soft magnetic material elements, the phase of electric current flowing through the stator is rotated, whereby the stator is in a state where the rotating magnetic fields are generated. In this state, when the predetermined vehicle-starting conditions are satisfied, the electric power supplied to the first armature row and the second armature row start to be controlled such that the first electric motor regenerates electric power from power from the engine, it is possible to generate electric power from power from the engine. Then, after starting the regeneration, the electric power supplied to the first armature row and the second armature row are controlled such that the regenerated electric power is reduced. This makes it possible to transmit power from the second rotor to the first rotor side via the first magnetic force lines and the second magnetic force lines while executing electric power regeneration. As a result, the hybrid vehicle can be started.

The invention as claimed in claim 5 is a hybrid vehicle 1B as claimed in any one of claims 2 to 4, wherein in a case where the engine 3 is in operation and at the same time the hybrid vehicle 1B is traveling, depending on at least either of operating conditions of the engine 3 (engine speed NE and accelerator pedal opening AP) and traveling conditions of the hybrid vehicle 1B (vehicle speed VP), the control device controls the electric power supplied to the first armature row and the second armature row such that a ratio between part of power from the engine 3, which is transmitted to the first drive wheels (front wheels 4) via the first rotor 14, and part of the power, from which electric power is regenerated by the first electric motor 10, is changed.

According to this hybrid vehicle, as described hereinabove, the first electric motor has the same operating characteristics as the planetary gear unit, and hence by controlling the electric power supplied to the first and second armature rows, it is possible to steplessly change a ratio between part of power from the engine, which is transmitted to the first drive wheels via the first rotor, and part of the power, from which electric power is regenerated by the first electric motor, as desired. This makes it possible, when the engine is in operation and the hybrid vehicle is traveling, to cause the hybrid vehicle to travel, while appropriately controlling the regenerated electric power, depending on operating conditions of the engine and/or traveling conditions of the hybrid vehicle.

The invention as claimed in claim 6 is a hybrid vehicle 1B as claimed in claim 2 or 3, further comprising a power storage device (battery 33) electrically connected to the control device (MOT•ECU 30, 1ST•PDU 31, 2ND•PDU 32) and the first electric motor 10, and wherein in a case where the engine 3 is in operation and a remaining charge SOC of the power storage device (battery 33) is not higher than a predetermined value SOC_REF, the control device controls the first electric motor 10 such that electric power is regenerated by the first electric motor 10, and executes charging control for charging the power storage device (battery 33) with the regenerated electric power.

According to this hybrid vehicle, when the engine is in operation and the remaining charge of the power storage device is not higher than a predetermined value, the first electric motor is controlled such that electric power is regenerated by the first electric motor, and charging control is executed for charging the power storage device with the regenerated electric power. This makes it possible to convert power from the engine or kinetic energy of the vehicle into electric power by the first electric motor, and charge the power storage device with the electric power. Therefore, by appropriately setting the predetermined value, it is possible to secure sufficient remaining charge in the power storage device (it should be noted that through the present invention, "during engine operation" and "when the engine is in operation" are intended to mean a state of the engine in which a crankshaft thereof is rotating, and include a fuel-cut operation and the like).

The invention as claimed in claim 7 is a hybrid vehicle 1B as claimed in any one of claims 2 to 4, wherein in a case where the engine 3 is in operation and at the same time the hybrid vehicle 1B is traveling, when predetermined power-transmitting conditions are satisfied, the control device controls the electric power supplied to the first armature row and the second armature row such that a rational speed of the first rotating magnetic field and a rotational speed of the second rotating magnetic field of the first electric motor 10 become equal to 0.

According to this hybrid vehicle, when the engine is in operation and the hybrid vehicle is traveling, when predetermined power-transmitting conditions are satisfied, the electric power supplied to the first armature row and the second armature row are controlled such that the rotational speed of the first rotating magnetic field and that of the second rotating magnetic field become equal to 0, and hence, all power from the engine can be transmitted to the first drive wheels via the second rotor and the first rotor, insofar as it is within a range capable of being transmitted by magnetism.

The invention as claimed in claim 8 is a hybrid vehicle 1B as claimed in claim 2 or 3, further comprising a power storage device (battery 33) electrically connected to the control device (MOT•ECU 30, 1ST•PDU 31, 2ND•PDU 32) and the first electric motor 10, and wherein in a case where the engine 3 is in operation and the hybrid vehicle 1B is traveling, when predetermined assist conditions are satisfied, the control device controls the first electric motor 10 such that by supplying electric power in the power storage device (battery 33) to the first electric motor 10, the first drive wheels (front wheels 4) are driven by power from the engine 3 and the first electric motor 10.

According to this hybrid vehicle, in a case where the engine is in operation and the hybrid vehicle is traveling, when predetermined assist conditions are satisfied, by supplying electric power in the power storage device to the first electric motor, the first electric motor is controlled such that power from the engine and the first electric motor drives the first drive wheels. Therefore, assist traveling can be performed by using not only the engine but also the first electric motor as a drive source.

The invention as claimed in claim 9 is a hybrid vehicle 1B as claimed in any one of claims 2 to 8, further comprising a brake device (electromagnetic brake 40) electrically connected to the control device, for braking rotation of the second rotor 15, and wherein in a case where the engine 3 is at rest and the hybrid vehicle 1B is at a stop, when predetermined motor-driven vehicle-starting conditions are satisfied, the control device controls the brake device (electromagnetic brake 40) such that the rotation of the second rotor 15 is braked, and controls the electric power supplied to the first armature row and the second armature row such that the first rotating magnetic field and second rotating magnetic field are generated.

According to this hybrid vehicle, when the engine is at rest, and the hybrid vehicle is at a stop, when predetermined motor-driven vehicle-starting conditions are satisfied, the brake device is controlled such that the rotation of the second rotor is braked, which makes the second rotor much larger in rotational resistance than the first rotor. In this state, if the first and second rotating magnetic files are simultaneously generated by controlling the electric power supplied to the first armature row and the second armature row, as described hereinabove, along with rotation of the first and second rotating magnetic fields, the first rotor can be driven in a direction opposite to the rotating direction of the first and second rotating magnetic fields with a drive force caused by the first magnetic force lines and a drive force caused by the second magnetic force lines repeatedly alternately acting on the first rotor.

The invention as claimed in claim 10 is a hybrid vehicle 1 as claimed in claim 2, further comprising a second electric motor 20 electrically connected to the control device, and having a rotating shaft (output shaft 13) mechanically connected to the first drive wheels (front wheels 4) and the first rotor 14.

According to this hybrid vehicle, it further comprises a second electric motor mechanically connected to the first drive wheels and the first rotor, and hence by controlling the second electric motor, in addition to power from the engine and the first electric motor, power from the second electric motor can be transmitted to the first drive wheels. This makes it possible to drive the hybrid vehicle with a larger drive force than that with which the hybrid vehicle as recited in claim 2 is driven.

The invention as claimed in claim 11 is a hybrid vehicle 1 as claimed in claim 10, wherein in a case where the engine 3 is in operation and the hybrid vehicle 1 is at a stop, when predetermined vehicle-starting conditions are satisfied, the control device controls the electric power supplied to the first armature row and the second armature row such that electric power is regenerated from power from the engine 3 by the first electric motor 10, and controls the second electric motor 20 by supplying the regenerated electric power to the second electric motor 20.

According to this hybrid vehicle, the rotating shaft of the first rotor and the second electric motor is mechanically connected to the first drive wheels, and hence when the engine is in operation and the hybrid vehicle is at a stop, and hence the rotating shaft is held at rest. On the other hand, the second rotor is mechanically connected to the engine, and hence as described hereinabove, the second rotor rotates along with rotation of the engine, and along the rotation of the second rotor, electromotive forces are generated on the first armature row and the second armature row of the stator. In this state, when predetermined vehicle-starting conditions are satisfied, if the electric power supplied to the first armature row and the second armature row is controlled, by virtue of the above-described operating characteristics of the first electric motor, electric power can be regenerated from power from the engine by the first electric motor. Further, if the second electric motor is controlled by supplying the electric power thus regenerated by the first electric motor to the second electric motor, it is possible to drive the first drive wheels by power from the second electric motor, whereby the hybrid vehicle can be started.

The invention as claimed in claim 12 is a hybrid vehicle 1 as claimed in claim 10 or 11, wherein in a case where the engine 3 is in operation and at the same time the hybrid vehicle 1 is traveling, depending on at least either of operating conditions of the engine 3 (engine speed NE and accelerator pedal opening AP) and traveling conditions of the hybrid vehicle 1 (vehicle speed VP), the control device controls the electric power supplied to the first armature row and the second armature row such that a ratio between part of power from the engine 3, which is transmitted to the first drive wheels (front wheels 4) via the first rotor 14 and the rotating shaft (output shaft 13), and part of the power, from which electric power is regenerated by the first electric motor 10, is changed, and controls the second electric motor 20 by supplying the regenerated electric power to the second electric motor 20.

According to this hybrid vehicle, when the engine is in operation and the hybrid vehicle is traveling, depending on operating conditions of the engine and/or traveling conditions of the vehicle, the electric power supplied to the first armature row and the second armature row is controlled such that a ratio between part of power from the engine, which is transmitted to the first drive wheels via the first rotor and the rotating shaft, and part of the power, from which electric power is regenerated by the first electric motor, is changed, and the regenerated electric power is supplied to the second electric motor, whereby the second electric motor is controlled. In this case, the first electric motor has the same operating characteristics as the planetary gear unit, as described above, and hence if the first electric motor is controlled as described above, and the second electric motor is controlled by supplying the electric power regenerated by the first electric motor to the second electric motor, provided that electrical losses are ignored, a ratio between the rotational speed of the first electric motor of the first electric motor and that of the rotating shaft of the second electric motor, in other words, a ratio between the engine speed and the rotational speed of the first drive wheels, can be changed as desired while transmitting all power from the engine to the first drive wheels. In short, by controlling the two electric motors, it is possible to realize functions of an automatic transmission.

The invention as claimed in claim 13 is a hybrid vehicle 1 as claimed in claim 10, further comprising a power storage device (battery 33) electrically connected to the control device (MOT•ECU 30, 1ST•PDU 31, 2ND•PDU 32), the first electric motor 10 and the second electric motor 20, and wherein in a case where the engine 3 is in operation and at the same time a remaining charge SOC in the power storage device (battery 33) is not higher than a predetermined value SOC_REF, the control device controls at least one of the first electric motor 10 and the second electric motor 20 such that electric power is regenerated by at least one of the first electric motor 10 and the second electric motor 20, and executes charging control for charging the power storage device (battery 33) with the regenerated electric power.

According to this hybrid vehicle, when the engine is in operation and the remaining charge of the power storage device is not higher than a predetermined value, at least one of the first electric motor and the second electric motor is controlled such that at least one of the first electric motor and the second electric motor regenerates electric power, and charging control is executed to charge the power storage device with the regenerated electric power. This makes it possible to convert power from the engine and kinetic energy of the vehicle which is traveling is converted into electric power by the first electric motor and/or the second electric motor, and the power storage device can be charged with the electric power. Therefore, by appropriately setting the predetermine value, it is possible to secure sufficient remaining charge in the power storage device.

The invention as claimed in claim 14 is a hybrid vehicle 1 as claimed in any one of claims 10 to 12, further comprising a power storage device (battery 33) electrically connected to the control device (MOT•ECU 30, 1ST•PDU 31, 2ND•PDU 32) the first electric motor 10 and the second electric motor 20, and wherein in a case where the engine 3 is in operation and at the same time predetermined assist conditions are satisfied, the control device controls at least one of the first electric motor 10 and the second electric motor 20 such that electric power in the power storage device (battery 33) is supplied to at least one of the first electric motor 10 and the second electric motor 20 to thereby cause power from at least one of the first electric motor 10 and the second electric motor 20 and power from the engine 3 to be transmitted to the first drive wheels (front wheels 4).

According to this hybrid vehicle, when the engine is in operation, and at the same time predetermined assist conditions are satisfied, electric power in the power storage device is supplied to the first electric motor and/or the second electric motor, whereby the first electric motor and/or the second electric motor are controlled such that power from at least one of the first electric motor and the second electric motor and power from the engine are transmitted to the first drive wheels. This makes it possible to perform assist traveling by using the first electric motor and/or the second electric motor as a power source, in addition to the engine.

The invention as claimed in claim 15 is a hybrid vehicle 1 as claimed in claim 10, wherein in a case where the engine 3 is at rest and at the same time the hybrid vehicle 1 is at a stop, when predetermined motor-driven vehicle-starting conditions are satisfied, the control device executing powering control of the first electric motor 10 and the second electric motor 20.

According to this hybrid vehicle, in a case where the engine is at rest and the hybrid vehicle is at a stop, when predetermined motor-driven vehicle-staring conditions are satisfied, powering control of the first electric motor and the second electric motor is executed. This makes it possible to drive the first drive wheels by power from the first electric motor and the second electric motor, with the engine left at rest, whereby the hybrid vehicle can be started. As a result, fuel economy can be improved.

The invention as claimed in claim 16 is a hybrid vehicle 1 as claimed in claim 10, further comprising a transmission 35 for performing a speed changing operation between the rotating shaft (output shaft 13) of the first rotor 14 of the first electric motor 10 and the second electric motor 20, and the first drive wheels (front wheels 4).

According to this hybrid vehicle, it includes a transmission for performing a speed change operation between the rotating shaft of the first rotor of the first electric motor and the second electric motor, and first drive wheels. Therefore, by appropriately setting the change gear ratio of the transmission, it is possible to execute downsizing of the first electric motor and the second electric motor and make them adapted to low rotational speed. For example, by setting the reduction gear ratio of the transmission to a large value, it is possible to set the torque to be transmitted to the transmission via the first electric motor and the second electric motor to a small value, whereby the first electric motor and the second electric motor can be reduced in size.

The invention as claimed in claim 17 is a hybrid vehicle 1 as claimed in claim 10, further comprising a transmission 36 for performing a speed changing operation between the second rotor 15 of the first electric motor 10 and the engine 3.

According to this hybrid vehicle, it further comprises a transmission for performing a speed change operation between the second rotor of the first electric motor and the engine, and hence by setting the change gear ratio of the transmission, it is possible to reduce the sizes of the first electric motors. For example, by setting both the speed increasing ratio of the transmission and the final reduction gear ratio of a final reducer to larger values, it is possible to set the torque to be transmitted to the final reducer side via the first electric motor and the second electric motor to a smaller value, which makes it possible to make the first electric motor and the second electric motor small in size.

The invention as claimed in claim 18 is a hybrid vehicle 1 as claimed in claim 10, wherein the rotating shaft (output shaft 13) of the second electric motor 20 is mechanically connected to the first rotor 14 of the first electric motor 10 and the first drive wheels (front wheels 4) via a transmission 37, and wherein the transmission 37 performs a speed changing operation between the rotating shaft (output shaft 13) of the second electric motor 20, and the first rotor 14 of the first electric motor 10 and the first drive wheels (front wheels 4).

According to this hybrid vehicle, the rotating shaft of the second electric motor is mechanically connected to the first rotor of the first electric motor and the first drive wheels via the transmission, and the transmission performs a speed change operation between the first rotor of the first electric motor and the first drive wheels. Therefore, by appropriately setting the change gear ratio of the transmission, it is possible to make the second electric motor small in size and adapted to a lower rotational speed. For example, by setting the reduction gear ratio of the transmission, it is possible to set the torque to be transmitted from the second electric motor to the transmission to a smaller value, whereby the second electric motor can be made smaller in size.

The invention as claimed in claim 19 is a hybrid vehicle 1A as claimed in claim 2, further comprising a second electric motor 20 electrically connected to the control device, and mechanically connected to second drive wheels (rear wheels 5) which are separate from the first drive wheels (front wheels 4).

According to this hybrid vehicle, by controlling the first electric motor and the second electric motor, it is possible to drive the first drive wheels and the second drive wheels, respectively, whereby it is possible to realize a all-wheel drive vehicle.

The invention as claimed in claim 20 is a hybrid vehicle 1A as claimed in claim 19, further comprising a transmission 38 for performing a speed changing operation between the second rotor 15 of the first electric motor 10 and the engine 3.

According to this hybrid vehicle, it further comprises a transmission for performing a speed change operation between the second rotor of the first electric motor and the engine, and hence by appropriately setting the change gear ratio of the transmission, it is possible to make the first electric motor smaller in size. For example, by setting both the speed increasing ratio of the transmission and the final reduction gear ratio of a final reducer to larger values, it is possible to set the torque to be transmitted to the final reducer side via the first electric motor to a smaller value, which makes it possible to make the first electric motor smaller in size.

The invention as claimed in claim 21 is a hybrid vehicle 1A as claimed in claim 19 or 20, further comprising a transmission 39 for performing a speed changing operation between the second electric motor 20 and the second drive wheels (rear wheels 5).

According to this hybrid vehicle, it further comprises a transmission for performing a speed change operation between the second electric motor and the second drive wheels, and hence by appropriately setting the change gear ratio of the transmission, it is possible to make the second electric motor smaller in size and adapted to a lower rotational speed. For example, by setting the reduction gear ratio of the transmission to a larger value, it is possible to set the torque to be transmitted from the second electric motor to the transmission to a smaller value, which makes it possible to make the second electric motor smaller in size.

The invention as claimed in claim 22 is a hybrid vehicle 1C as claimed in claim 1, further comprising a control device (MOT•ECU 30, 1ST•PDU 31, 2ND•PDU 32) for controlling electric power supplied to the first armature row and the second armature row of the first electric motor 10, and wherein the first rotor 14 of the first electric motor 10 is mechanically connected to the engine 3, and the second rotor 15 is mechanically connected to the first drive wheels (front wheels 4).

According to this hybrid vehicle, the electric power supplied to the first armature row and the second armature row of the first electric motor is controlled, and hence it is possible to control the state of generation of the first magnetic force lines and the second magnetic force lines, whereby power transmission by magnetism between the first rotor and the second rotor can be controlled. In addition to this, since the first rotor of the first electric motor is mechanically connected to the engine, and the second rotor is mechanically connected to the first drive wheels, and as described hereinabove, the first electric motor has the same operating characteristics as the planetary gear unit, it is possible to transmit power from the engine to the first rotor, the second rotor, and the first drive wheels, in the mentioned order, and control the state of the transmission.

The invention as claimed in claim 23 is a hybrid vehicle 1C as claimed in claim 22, wherein in a case where the engine 3 is at rest and at the same time the hybrid vehicle 1C is at a stop, when predetermined engine-starting conditions are satisfied, the control device controls the electric power supplied to the first armature row and the scone armature row such that the first rotating magnetic field and the second rotating magnetic field are generated.

According to this hybrid vehicle, the first rotor of the first electric motor is mechanically connected to the engine, and the second rotor is mechanically connected to the first drive wheels, and hence when the engine is at rest and the hybrid vehicle is at a stop, the second rotor is much larger in rotational resistance than the first rotor. When predetermined engine-starting conditions are satisfied in this state, if the electric power supplied to the first armature row and the second armature row is controlled such that the first rotating magnetic field and the second rotating magnetic field are generated, since the first electric motor has the same operating characteristics as the planetary gear unit, as described above, it is possible to continuously drive the first rotor to thereby transmit power from the first electric motor to the engine via the first rotor, whereby it is possible to start the engine by the first electric motor without using a starter or the like, when the hybrid vehicle is at a stop.

The invention as claimed in claim 24 is a hybrid vehicle 1C as claimed in claim 22 or 23, wherein in a case where the engine 3 is in operation and at the same time the hybrid vehicle 1C is at a stop, when predetermined vehicle-starting conditions are satisfied, the control device controls the electric power supplied to the first armature row and the second armature row such that electric power is regenerated from power from the engine 3 by the first electric motor 10, and after starting the regeneration, the regenerated electric power is reduced.

According to this hybrid vehicle, in a case where the engine is in operation, and the hybrid vehicle is at a stop, since the second rotor is mechanically connected to the first drive wheels, it is held at rest.

On the other hand, the first rotor is mechanically connected to the engine, it rotates along with the rotation of the engine. In this respect, since the first electric motor has the same operating characteristics as the planetary gear unit, as the first rotor rotates, the phase of electric current flowing through the stator also rotates, whereby it is placed in a state in which the rotating magnetic fields are generated. In this state, if electric power is regenerated from power from the engine by the first electric motor when predetermined vehicle-starting conditions are satisfied, and after starting the regeneration, the electric power supplied to the first armature row and the second armature row is controlled such that the regenerated electric power is reduced, it is possible to transmit power from the first rotor, i.e. power from the engine to the second rotor side via the first magnetic force lines and the second magnetic force lines. As a result, it is possible to start the hybrid vehicle.

The invention as claimed in claim 25 is a hybrid vehicle 1C as claimed in any one of claims 22 to 24, wherein in a case where the engine 3 is in operation and at the same time the hybrid vehicle 1C is traveling, depending on at least either of operating conditions of the engine 3 (engine speed NE and accelerator pedal opening AP) and traveling conditions of the hybrid vehicle 1C (vehicle speed VP), the control device controls the electric power supplied to the first armature row and the second armature row such that a ratio between part of power from the engine 3, which is transmitted to the first drive wheels (front wheels 4) via the second rotor 15, and part of the power, from which electric power is regenerated by the first electric motor 10, is changed.

According to this hybrid vehicle, as described hereinbefore, the first electric motor has the same operating characteristics as the planetary gear unit, and hence by controlling the electric power supplied to the first and second armature rows, it is possible to steplessly change a ratio between part of power from the engine, which is transmitted to the first drive wheels via the second rotor, and part of the same, from which electric power is regenerated by the first electric motor, as desired. This makes it possible, when the engine is in operation and the hybrid vehicle is traveling, to cause the hybrid vehicle to travel while appropriately controlling the regenerated electric power, depending on operating conditions of the engine and/or traveling conditions of the hybrid vehicle.

The invention as claimed in claim 26 is a hybrid vehicle 1C as claimed in claim 22 or 23, further comprising a power storage device (battery 33) electrically connected to the control device (MOT•ECU 30, 1ST•PDU 31, 2ND•PDU 32) and the first electric motor 10, and wherein in a case where the engine 3 is in operation and a remaining charge SOC of the power storage device (battery 33) is not higher than a predetermined value SOC_REF, the control device controls the first electric motor 10 such that electric power is regenerated by the first electric motor 10, and executes charging control for charging the power storage device (battery 33) with the regenerated electric power.

According to this hybrid vehicle, it is possible to obtain the same advantageous effects as provided by the invention as recited in claim 6.

The invention as claimed in claim 27 is a hybrid vehicle 1C as claimed in any one of claims 22 to 24, wherein in a case where the engine 3 is in operation and at the same time the hybrid vehicle 1C is traveling, when predetermined power-transmitting conditions are satisfied, the control device controls the electric power supplied to the first armature row and the second armature row such that a rational speed of the first rotating magnetic field and a rotational speed of the second rotating magnetic field of the first electric motor 10 become equal to 0.

According to this hybrid vehicle, it is possible to obtain the same advantageous effects as provided by the invention as recited in claim 7.

The invention as claimed in claim 28 is a hybrid vehicle 1C as claimed in claim 22 or 23, further comprising a power storage device (battery 33) electrically connected to the control device (MOT•ECU 30, 1ST•PDU 31, 2ND•PDU 32) and the first electric motor 10, and wherein in a case where the engine 3 is in operation and the hybrid vehicle 1C is traveling, when predetermined assist conditions are satisfied, the control device controls the first electric motor 10 such that by supplying electric power in the power storage device (battery 33) to the first electric motor 10, the first drive wheels (front wheels 4) are driven by power from the engine 3 and the first electric motor 10.

According to this hybrid vehicle, it is possible to obtain the same advantageous effects as provided by the invention as recited in claim 8.

The invention as claimed in claim 29 is a hybrid vehicle 1C as claimed in any one of claims 22 to 28, further comprising a brake device (second electric motor 20) electrically connected to the control device, for braking rotation of the first rotor 14, and wherein in a case where the engine 3 is at rest and the hybrid vehicle 1C is at a stop, when predetermined motor-driven vehicle-starting conditions are satisfied, the control device controls the brake device (second electric motor 20) such that the rotation of the first rotor 14 is braked, and controls the electric power supplied to the first armature row and the second armature row such that the first rotating magnetic field and second rotating magnetic field are generated.

According to this hybrid vehicle, in a case where the engine is at rest and the hybrid vehicle is at a stop, when predetermined motor-driven vehicle-starting conditions are satisfied, the brake device is controlled such that the rotation of the first rotor is braked, and hence the first rotor is much larger in rotational resistance than the second rotor. In this state, if the first and second rotating magnetic fields are simultaneously generated by controlling the electric power supplied to the first armature row and the second armature row, the second rotor can be driven in a direction opposite to the rotating direction of the first and second rotating magnetic fields, as described hereinabove, with a drive force caused by the first magnetic force lines and a drive force caused by the second magnetic force lines repeatedly alternately act on the second rotor, along with rotation of the first and second rotating magnetic fields. This makes it possible to drive the first drive wheels by the first electric motor to thereby start the hybrid vehicle. As a result, it is possible to improve fuel economy.

The invention as claimed in claim 30 is a hybrid vehicle 1C as claimed in claim 22, further comprising a second electric motor 20 electrically connected to the control device, and having a rotating shaft (input shaft 12) mechanically connected to the engine 3 and the first rotor 14.

According to this hybrid vehicle, it further comprises a second electric motor having a rotating shaft mechanically connected to the engine and the first rotor, and hence by controlling the second electric motor, it is possible to transmit power from the second electric motor in addition to power from the engine and the first electric motor to the first drive wheels, whereby it is possible to drive the hybrid vehicle with a larger drive force than that with which the hybrid vehicle as recited in claim 22 is driven.

The invention as claimed in claim 31 is a hybrid vehicle 1C as claimed in claim 30, wherein in a case where the engine 3 is at rest and the hybrid vehicle 1C is at a stop, when predetermined engine-starting conditions are satisfied, the control device controls at least one of the first electric motor 10 and the second electric motor 20 such that at least one of power from the first electric motor 10 and power from the second electric motor 20 is supplied to the engine 3 via the rotating shaft (input shaft 12).

According to this hybrid vehicle, the first rotor of the first electric motor is mechanically connected to the engine, and the second rotor is mechanically connected to the first drive wheels, and hence when the engine is at rest and the hybrid vehicle is at a stop, the second rotor is much larger in rotational resistance than the first rotor. In this state, when the predetermined engine-starting conditions are satisfied, at least one of the first electric motor and the second electric motor is controlled, it is possible to drive the rotating shaft of the first rotor of the first electric motor and/or the second electric motor. This makes it possible to transmit power from the first electric motor and/or the second electric motor to the engine via the first rotor and/or the rotating shaft, whereby when the hybrid vehicle is at a stop, it is possible to start the engine by the first electric motor and/or the second electric motor without using a start or the like.

The invention as claimed in claim 32 is a hybrid vehicle 1C as claimed in claim 30 or 31, wherein in a case where the engine 3 is in operation and the hybrid vehicle 1C is at a stop, when predetermined vehicle-starting conditions are satisfied, the control device controls the electric power supplied to the first armature row and the second armature row such that electric power is regenerated from power from the engine 3 by the first electric motor 10 and after starting the regeneration, the generated electric power is reduced, and controls the second electric motor 20 by supplying the regenerated electric power to the second electric motor 20.

According to this hybrid vehicle, the second rotor is mechanically connected to the first drive wheels, and hence in a case where the engine is in operation and the hybrid vehicle is at a stop, the second rotor is held at rest. On the other hand, the rotating shaft of the first rotor and the second electric motor is mechanically connected to the engine, they rotate along with rotation with the engine. Along with the rotation of the first rotor, by virtue of the operating characteristics of the first electric motor described hereinabove, an electromotive force is generated in the second armature row of the stator, and in this state, when predetermined vehicle-starting conditions are satisfied, if the electric power supplied to the first armature row and the second armature row are controlled, electric power can be regenerated from power from the engine. Further, if the second electric motor is controlled by supplying the electric power regenerated by the first electric motor to the second electric motor, the first rotor is drive by the power. Thus, in a state where the first rotor is being driven by power from the engine and power from the second electric motor, if the electric power regenerated by the first electric motor is reduced, by virtue of the operating characteristics of the first electric motor similar to those of the planetary gear unit, described hereinabove, it is possible to increase the power transmitted to the first drive wheels, which makes it possible to start the hybrid vehicle.

The invention as claimed in claim 33 is a hybrid vehicle 1C as claimed in any one of claims 30 to 32, wherein in a case where the engine 3 is in operation and at the same time the hybrid vehicle 1C is traveling, depending on at least either of operating conditions of the engine 3 (engine speed NE and accelerator pedal opening AP) and traveling conditions of the hybrid vehicle 1C (vehicle speed VP), the control device controls the second electric motor 20 such that a ratio between part of power from the engine 3, which is transmitted to the first rotor 14 via the rotating shaft (input 12), and part of the power, from which electric power is regenerated by the second electric motor 20, is changed, and controls the first electric motor 10 by supplying the regenerated electric power to the first armature row and the second armature row of the first electric motor 10.

According to this hybrid vehicle, in a case where the engine is in operation and the hybrid vehicle is traveling, depending on operating conditions of the engine and/or traveling conditions of the hybrid vehicle, the second electric motor is controlled such that a ratio between part of power from the engine, which is transmitted to the first rotor via the rotating shaft, and part of the power, from which electric power is regenerated by the second electric motor, is changed, and the regenerated electric power is supplied to the first armature row and the second armature row, whereby the first electric motor is controlled. In this case, as described hereinabove, the first electric motor has the same operating characteristics as the planetary gear unit, by controlling the second electric motor as described above and at the same time controlling the first electric motor by supplying the electric power regenerated by the second electric motor thereto, provided that electrical losses are ignored, it is possible to change a ratio between the rotational speed of the rotating shaft of the second electric motor and the rotational speed of the second rotor, in other words, a ratio between the engine speed and the rotational speed of the first drive wheels, as desired, while transmitting all power from the engine to the first drive wheels. In short, by controlling the two electric motors, it is possible to realize the functions of an automatic transmission.

The invention as claimed in claim 34 is a hybrid vehicle 1C as claimed in claim 30, further comprising a power storage device (battery 33) electrically connected to the control device (MOT•ECU 30, 1ST•PDU 31, 2ND•PDU 32), the first electric motor 10 and the second electric motor 20, and wherein in a case where the engine 3 is in operation and at the same time a remaining charge SOC in the power storage device (battery 33) is not higher than a predetermined value SOC_REF, the control device controls at least one of the first electric motor 10 and the second electric motor 20 such that electric power is regenerated by at least one of the first electric motor 10 and the second electric motor 20, and executes charging control for charging the power storage device (battery 33) with the regenerated electric power.

According to this hybrid vehicle, it is possible to obtain the same advantageous effects as provided by the invention as recited in claim 13.

The invention as claimed in claim 35 is a hybrid vehicle 1C hybrid vehicle as claimed in any one of claims 30 to 32, further comprising a power storage device (battery 33) electrically connected to the control device (MOT•ECU 30, 1ST•PDU 31, 2ND•PDU 32), the first electric motor 10 and the second electric motor 20, and wherein in a case where the engine 3 is in operation and at the same time predetermined assist conditions are satisfied, the control device controls at least one of the first electric motor 10 and the second electric motor 20 such that electric power in the power storage device (battery 33) is supplied to at least one of the first electric motor 10 and the second electric motor 20 to thereby cause power from at least one of the first electric motor 10 and the second electric motor 20 and power from the engine 3 to be transmitted to the first drive wheels (front wheels 4).

According to this hybrid vehicle, it is possible to obtain the same advantageous effects as provided by the invention as recited in claim 14.

The invention as claimed in claim 36 is a hybrid vehicle 1C as claimed in claim 30, wherein in a case where the engine 3 is at rest and at the same time the hybrid vehicle 1C is at a stop, when predetermined motor-driven vehicle-starting conditions are satisfied, the control device controls the second electric motor 20 such that the rotating shaft (input shaft 12) is held unrotatable, and executes powering control of the first electric motor 10.

According to this hybrid vehicle, in a case where the engine is at rest and the hybrid vehicle is at a stop, when predetermined motor-driven vehicle-starting conditions are satisfied, the second electric motor is controlled such that the rotating shaft thereof is held unrotatable, and the powering control of the first electric motor is executed. Therefore, by virtue of the above-described operating characteristics of the first electric motor similar to those of the planetary gear unit, it is possible to transmit power from the first electric motor to the first drive wheels with engine left at rest, whereby the hybrid vehicle can be started. As a result, it is possible to improve fuel economy.

The invention as claimed in claim 37 is a hybrid vehicle 1C as claimed in claim 30, further comprising a clutch 41 for mechanically connecting or disconnecting between the rotating shaft (input shaft 12) of the first rotor 14 of the first electric motor 10 and the second electric motor 20, and the engine 3, and wherein in a case where the engine 3 is at rest, and the hybrid vehicle 1C is at a stop, when predetermined vehicle-starting conditions are satisfied, the control device controls the clutch 41 to a disconnecting state, and executes powering control of at least one of the first electric motor 10 and the second electric motor 20.

According to this hybrid vehicle, in a case where the engine is at rest and the hybrid vehicle is at a stop, when predetermined vehicle-starting conditions are satisfied, the clutch is controlled to a disconnected side, and at least one of the first electric motor and the second electric motor is subjected to powering control. Therefore, it is possible to transmit power from the first electric motor and/or the second electric motor to the first drive wheels, with the engine left at rest, whereby the hybrid vehicle can be started. As a result, it is possible to improve fuel economy.

The invention as claimed in claim 38 is a hybrid vehicle 1C as claimed in claim 30, further comprising a transmission 45 for performing a speed changing operation between the second rotor 15 of the first electric motor 10 and the first drive wheels (front wheels 4).

According to this hybrid vehicle, it further comprises a transmission for performing a speed change operation between the second rotor of the first electric motor and the first drive wheels, and hence by appropriately setting the reduction gear ratio of the transmission, it is possible to make the first electric motor and the second electric motor smaller in size and adapted to a lower rotational speed. For example, by setting the reduction gear ratio of the transmission, it is possible to set the torque to be transmitted to the transmission via the first electric motor and the second electric motor, whereby the first electric motor and the second electric motor are made smaller in size.

The invention as claimed in claim 39 is a hybrid vehicle 1C as claimed in claim 30, further comprising a transmission 46 for performing a speed changing operation between the rotating shaft (input shaft 12) of the second electric motor 20 and the engine 3.

According to this hybrid vehicle, it further comprises a transmission for performing a speed change operation between the rotating shaft of the second electric motor and the engine, and hence by appropriately setting the change gear ratio of the transmission, it is possible to make the first electric motor smaller in size. For example, by setting both the speed increasing ratio of the transmission and the final reduction gear ratio of a final reducer to larger values, it is possible to set the torque to be transmitted to the final reducer side via the first electric motor and the second electric motor to a smaller value, which makes it possible to make the first electric motor and the second electric motor smaller in size.

The invention as claimed in claim 40 is a hybrid vehicle 1C as claimed in claim 22, further comprising a second electric motor 20 electrically connected to the control device, and mechanically connected to second drive wheels (rear wheels 5) which are separate from the first drive wheels (front wheels 4).

According to this hybrid vehicle, by controlling the first electric motor and the second electric motor, it is possible to drive the first drive wheels and the second drive wheels, respectively, whereby it is possible to realize a all wheel-drive vehicle.

BRIEF DESCRIPTION OF THE DRAWINGS

FIG. 10 A diagram showing magnetic circuits formed during the operation of the first electric motor.

FIG. 11 A diagram showing an example of torque which is generated in a second rotor by rotation of rotating magnetic fields when the first rotor is unrotatable.

FIG. 12 A diagram showing velocity diagrams representative of the rotational speeds of two rotors and rotating magnetic fields, in which: (a) shows a case in which armatures of a stator are caused to generate rotating magnetic fields in a state of the first rotor being stopped; (b) a case in which the rotating magnetic fields are generated in a state of the second rotor being stopped; (c) a case in which the rotating magnetic fields are generated in a state of the first rotor and the second rotor rotating; and (d) a case in which the rotating magnetic fields are stopped in a state of the first rotor and the second rotor rotating.

FIG. 13 A diagram illustrating operation of the first electric motor when the second rotor is unrotatable.

FIG. 17 A diagram showing an example in which a transmission apparatus is provided in the hybrid vehicle according to the first embodiment.

BEST MODE FOR CARRYING OUT THE INVENTION

Figure 1:
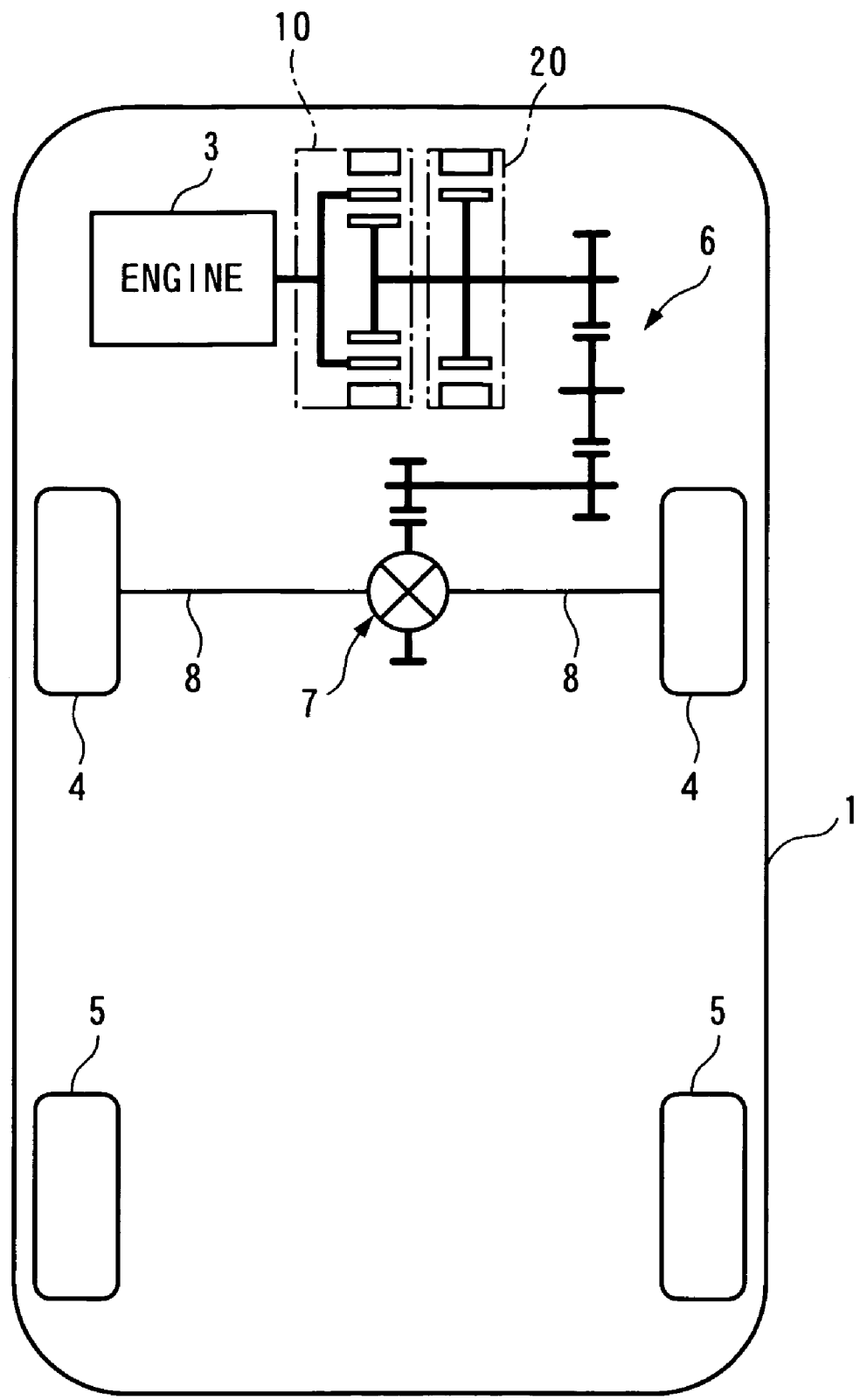
FIG. 1 A diagram schematically showing a hybrid vehicle according to a first embodiment of the present invention.
Figure 2:
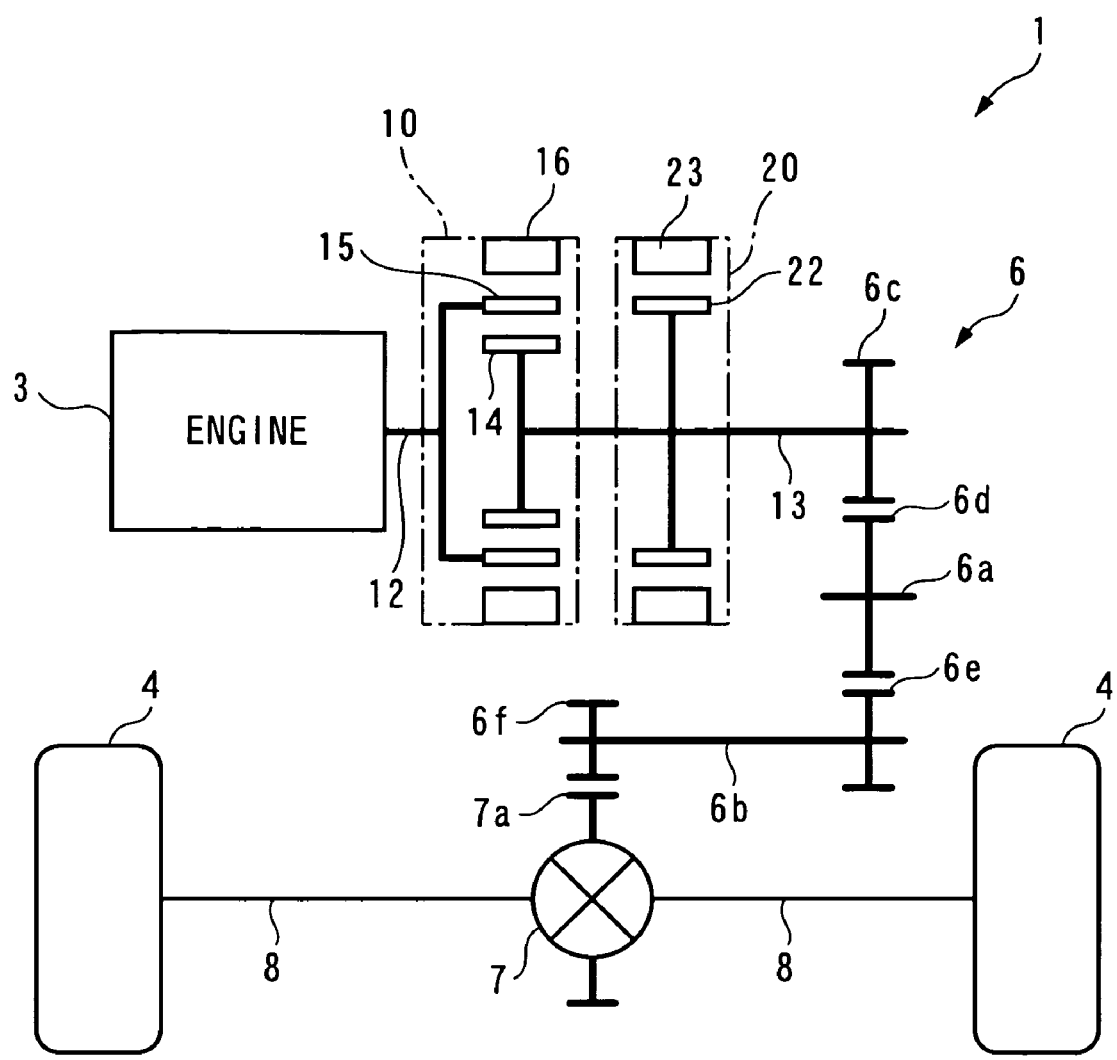
FIG. 2 A skeleton diagram schematically showing a drive system of the hybrid vehicle.

Hereafter, a hybrid vehicle according to a first embodiment of the present invention will be described with reference to the drawings. It should be noted that in the following description, the left side and the right side as viewed in FIG. 1 will be referred to as "left" and "right". As shown in FIGS. 1 and 2, the hybrid vehicle (hereinafter referred to as "the vehicle") 1 according to the present embodiment is comprised of an engine 3, a first electric motor 10, and a second electric motor 20, as power sources, left and right front wheels 4 and 4 (first drive wheels) driven by these power sources, left and right rear wheels 5 and 5, which are idler wheels.

In the vehicle 1, the engine 3 is connected to the first electric motor 10, and the first electric motor 10 and the second electric motor 20 are connected to the left and right front wheels 4 and 4 by a gear mechanism 6, a differential gear mechanism 7, and left and right drive shafts 8 and 8. Thus, as described hereinafter, the driving force of the engine 3, and the driving forces of the first electric motor 10 and the second electric motor 20 are transmitted to the front wheels 4 and 4.

The two electric motors 10 and 20, and the gear mechanism 6 are all housed in a drive system housing (not shown) fixed to a cylinder block (not shown). The gear mechanism 6 is comprised of first and second gear shafts 6a and 6b parallel to an output shaft 13, described hereinafter, of the first electric motor 10, the output shaft 13, and four gears 6c to 6f arranged on the two gears 6a and 6b.

The gear 6c is concentrically fixed to the right end of the output shaft 13, in constant mesh with the gear 6d. The gear 6d is concentrically and rotatably fitted in the first gear shaft 6a, and in constant mesh not only with the above gear 6c but also with the gear 6e concentrically fixed to the right end of the second gear shaft 6b. Further, the gear 6f is concentrically fixed to the left end of the second gear shaft 6b, and is in constant mesh with a gear 7a of the differential gear mechanism 7. With the above arrangement, the rotation of the output shaft 13 is changed in speed at a predetermined gear ratio by the gear mechanism 6, and is transmitted to the differential gear mechanism 7. It should be noted that the predetermined gear ratio is set to an appropriate value depending on the performances of the engine 3, the first electric motor 10, and the second electric motor 20.

Figure 3:
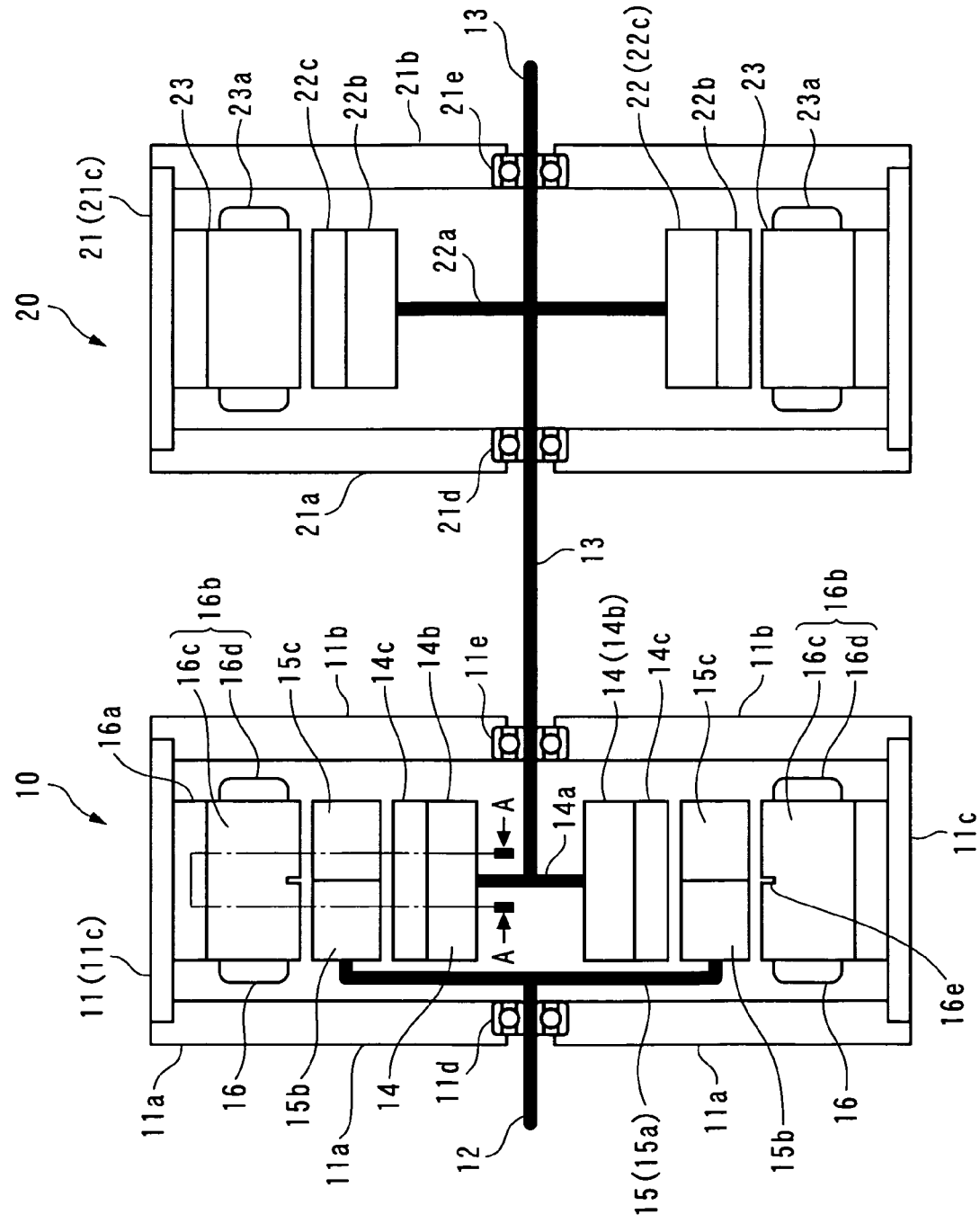
FIG. 3 A cross-sectional view schematically showing a first electric motor and a second electric motor.
Figure 4:
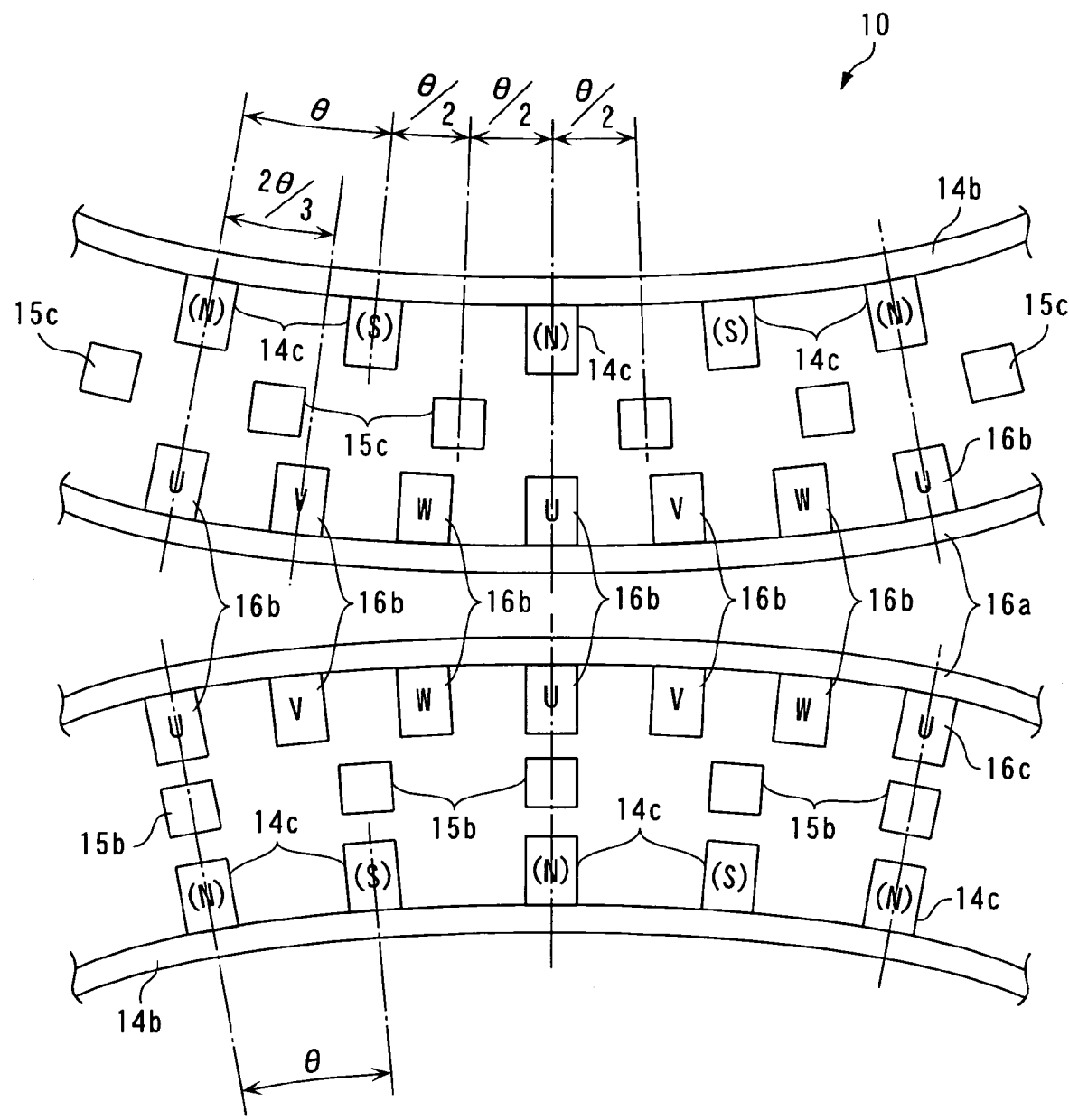
FIG. 4 A development view schematically showing part of a cross-section of the first electric motor taken on line A-A of FIG. 3 along a circumferential direction.

Next, a description will be given of the first electric motor 10, and the second electric motor 20. FIG. 3 is a cross-sectional view schematically showing the first electric motor 10, and the second electric motor 20. FIG. 4 is a development view schematically showing part of a cross-section of the first electric motor 10 taken on line A-A of FIG. 3 along a circumferential direction. It should be noted that in the figures, hatching in portions illustrating cross-sections are omitted for ease of understanding.

First, a description will be given of the first electric motor 10. As shown in FIG. 3, the first electric motor 10 is comprised of a casing 11 fixed to the above-described drive system housing, an input shaft 12 having a left end connected to the crankshaft of the engine 3, the output shaft 13 concentric with the input shaft 12, a first rotor 14 housed in the casing 11, for rotation in unison with the output shaft 13, a second rotor 15 housed in the casing 11, for rotation in unison with the input shaft 12, and a stator 16 fixed to the inner peripheral surface of a peripheral wall 11c of the casing 11. The first rotor 14, the second rotor 15, and the stator 16 are arranged concentrically with each other from the radially inner side toward the radially outer side.

The casing 11 is comprised of left and right side walls 11a and 11b, and the peripheral wall 11c which has a hollow cylindrical shape and is fixed to the outer peripheral ends of the left and right side walls 11a and 11b. Bearings 11d and 11e are mounted in the central portions of the left and right side walls 11a and 11b, respectively, and the input shaft 12 and the output shaft 13 are rotatably supported by the bearings 11d and 11e, respectively. Further, The axial motions of the two shafts 12 and 13 are restricted by thrust bearings, not shown, etc.

The first rotor 14 is comprised of a turntable portion 14a concentrically fixed to the left end of the output shaft 13, and a hollow cylindrical ring portion 14b fixed to the outer end of the turntable portion 14a. The ring portion 14b is formed of a soft magnetic material, and on an outer peripheral surface thereof, a permanent magnet row is disposed along the circumferential direction. The permanent magnet row is formed by 2n (n is an integer) permanent magnets 14c, and the permanent magnets 14c are arranged at the same angular intervals of a predetermined angle θ such that each two adjacent ones of the permanent magnets 14c have polarities different from each other (see FIG. 4). Further, each permanent magnet 14c has a predetermined width in the left-right direction. It should be noted that in the present embodiment, magnetic poles at opposite-side portions of the permanent magnet 14c correspond to a first magnetic pole and a second magnetic pole, respectively.

The stator 16 has an annular fixing portion 16a mounted on the inner peripheral surface of the peripheral wall 11c of the casing 11, and an armature row circumferentially formed on the inner peripheral surface of the fixing portion 16a. The armature row generates rotating magnetic fields by being supplied with electric power, and is formed by 3n armatures 16b. The armatures 16b are arranged at the same angular intervals of a predetermined angle (2θ/3) (see FIG. 4), and electrically connected to a 1ST•PDU 31, described hereinafter. It should be noted that in the present embodiment, the armatures 16b correspond to first armatures and second armatures.

Each armature 16b is comprised of an iron core 16c, and coils 16d wound around the iron core 16c by concentrated winding. The iron core 16c has the same width as that of each permanent magnet 14c in the left-right direction, and has a central portion of the inner peripheral surface thereof formed with a circumferentially extending groove 16e. Further, the 3n coils 16d form n sets of three-phase coils, i.e. U-phase coils, V-phase coils, and W-phase coils.

On the other hand, the second rotor 15 has a turntable portion 15a fixed to the right end of the input shaft 12, and a first core row and a second core row which are fixed to the outer end of the turntable portion 15a and are disposed between the permanent magnet row of the first rotor 14 and the armature row of the stator 16. The first core row and the second core row are respectively formed by 2n first cores 15b and 2n second cores 15c. The first and second cores 15b and 15c are formed by soft magnetic material elements (e.g. laminates of steel plates), and are arranged along the circumferential direction such that the radial distance between each thereof and each permanent magnet 14c becomes equal to the radial distance between the same and each iron core 16c. It should be noted that in the present embodiment, the first and second cores 15b and 15c correspond to first and second soft magnetic material elements, respectively.

Further, the first cores 15b are arranged at the same angular intervals of the predetermined angle θ, and the second cores 15c as well are arranged at the same angular intervals of the predetermined angle θ, while the pitches of the first and second cores 15b and 15c are circumferentially displaced from each other by a half of the angle θ (see FIG. 4). Further, the first and second cores 15b and 15c are set such that the widths thereof in the left-right direction are identical to each other, and become equal to a half of the width of the permanent magnet 14c.

On the other hand, the second electric motor 20 is formed by a DC brushless motor, and includes a casing 21 fixed to the above-described drive system housing, a rotor 22 housed in the casing 21 and concentrically fixed to the output shaft 13 (rotating shaft), a stator 23 fixed to the inner peripheral surface of a peripheral wall 21c of the casing 21, and so forth.

The casing 21 is formed by left and right side walls 21a and 21b, and the hollow cylindrical peripheral wall 21c fixed to the outer peripheral ends of the left and right side walls 21a and 21b. Bearings 21d and 21e are mounted in the inner ends of the left and right side walls 21a and 21b, respectively, and the output shaft 13 is rotatably supported by the bearings 21d and 21e.

The rotor 22 is comprised of a turntable portion 22a concentrically fixed to the output shaft 13, and a hollow cylindrical ring portion 22b fixed to the outer end of the turntable portion 22a. The ring portion 22b is formed of a soft magnetic material, and a permanent magnet row is disposed on an outer peripheral surface of the ring portion 22b along the circumferential direction. The permanent magnet row is formed by a predetermined number of permanent magnets 22c, and the permanent magnets 22c are arranged at the same angular intervals of a predetermined angle such that each two adjacent ones of the permanent magnets 22c have polarities different from each other.

The stator 23 has a plurality of armatures 23a arranged on the inner peripheral surface of the peripheral wall 21c of the casing 21 along the circumferential direction. The armatures 23a, which generate rotating magnetic fields by being supplied with electric power, are arranged at the same angular intervals of a predetermined angle, and electrically connected to a 2ND•PDU 32, described hereinafter.

Figure 5:
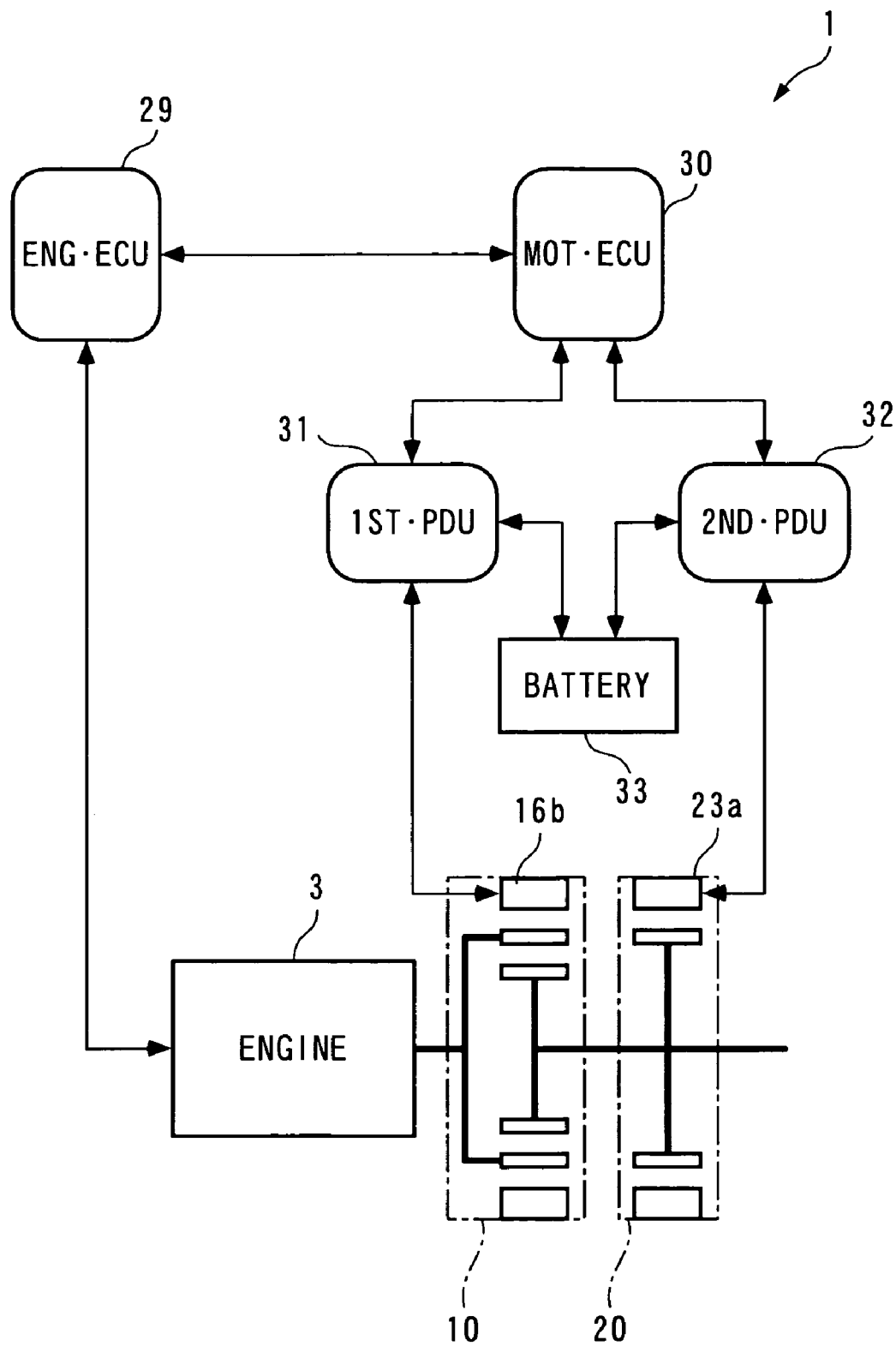
FIG. 5 A block diagram schematically showing a control system of the hybrid vehicle.

On the other hand, as shown in FIG. 5, the vehicle 1 is comprised of an ENG•ECU 29 for mainly controlling the engine 3, and an MOT•ECU 30 for mainly controlling the first electric motor 10 and the second electric motor 20. The ECUs 29 and 30 are implemented by microcomputers, not shown, each including a RAM, a ROM, a CPU, and an I/O interface.

To the ENG•ECU 29 are connected various sensors, such as a crank angle sensor, a drive shaft rotational speed sensor, an accelerator pedal opening sensor, and a vehicle speed sensor (none of which are shown). The ENG•ECU 30 calculates the engine speed NE, the rotational speed ND of the drive shaft 8 (hereinafter referred to as "the drive shaft speed ND"), the accelerator pedal opening AP (an operation amount of an accelerator pedal, not shown), a vehicle speed VP, and so forth, based on the detection signals output from these various sensors, and drives fuel injection valves and spark plugs according to these parameters, to thereby control the operation of the engine 3. Further, the ENG•ECU 29 is electrically connected to the MOT•ECU 30 and performs transmission and reception of data of the engine sped NE, the drive shaft speed ND, etc., between the same and the MOT•ECU 30.

On the other hand, the MOT•ECU 30 is connected to the first electric motor 10 via the 1ST•PDU 31, and is connected to the second electric motor 20 via the 2ND•PDU 32. The 1ST•PDU 31 is implemented by an electric circuit including an inverter and so forth, and is connected to a battery 33. Further, similarly to the 1ST•PDU 31, the 2ND•PDU 32 is also implemented by an electric circuit including an inverter and so forth, and is connected to the battery 33. It should be noted that in the present embodiment, the MOT•ECU 30, the 1ST•PDU 31 and the 2ND•PDU 32 correspond to a control device, and the battery 33 corresponds to a power storage device.

As will be described hereinafter, when the vehicle 1 is started during operation of the engine 3, or when the engine 3 is decelerated during traveling of the vehicle 1, the MOT•ECU 30 controls power regeneration and powering performed by the first electric motor 10, and controls not only a ratio of generation of the regenerated electric power but also a ratio of regenerated electric power used for charging the battery 33 and a ratio of regenerated electric power supplied to the second electric motor 20.

Further, e.g. during the start of the engine, the MOT•ECU 30 controls the operation of the first electric motor 10 by supplying electric power from the battery 33 to the first electric motor 10 via the 1ST•PDU 31. Furthermore, when the vehicle 1 is restarted in a state in which the remaining amount of electric charge in the battery 33 is sufficient, the MOT•ECU 30 supplies the electric power from the battery 33 to the two electric motors 10 and 20 via the two PDUs 31 and 32, respectively, thereby controlling the operations of the electric motors 10 and 20.

Next, a description will be given of the operation of the first electric motor 10, which is being controlled by the MOT•ECU 30. The MOT•ECU 30 causes the electric power from the battery 33 to be modulated into a pseudo three-phase AC current via the 1ST•PDU 31 by a pulse-width modulation method, thereby causing the pseudo three-phase AC current to be supplied to the three-phase AC current to the armatures 16b of the first electric motor 10. This causes the armatures 16b to generate magnetic poles different from each other, at respective ends of each iron core 16c, opposed to the second rotor 15, with the groove 16e positioned therebetween, such that the magnetic poles move at a value dependent on the frequency of supply current from the 1ST•PDU 31, whereby rotating magnetic fields are generated, and magnetic forces generated by the armatures 16b become equal to a value dependent on the value of electric current supplied from the 1ST•PDU 31. As described above, in the first electric motor 10, the magnetic forces generated by the armatures 16b are controlled according to the value of the supply electric current from the 1ST•PDU 31, and the rotational speed of the rotating magnetic fields is controlled according to the frequency of the electric current supplied from the 1ST•PDU 31.

Here, assuming that the rotation radius of each permanent magnet 14c, that of each first core 15b and each second core 15c, and that of the rotating magnetic field of each armature 16b are infinitely large, it is possible to consider that the permanent magnet 14c, the first core 15b, and the second core 15c move linearly, and the rotating magnetic field of the armature 16b also moves linearly. In this case, FIG. 4, referred to hereinabove, can be regarded as an equivalent to FIG. 6. Further, since the polarities of the magnetic poles of the armature 16b periodically change, the operation of the rotating magnetic field of the armature 16b can be regarded as an equivalent to the rotating operation of a permanent magnet. In this case, the arrangement shown in FIG. 6 can be regarded as an equivalent to the arrangement shown in FIG. 7.

Figure 6:
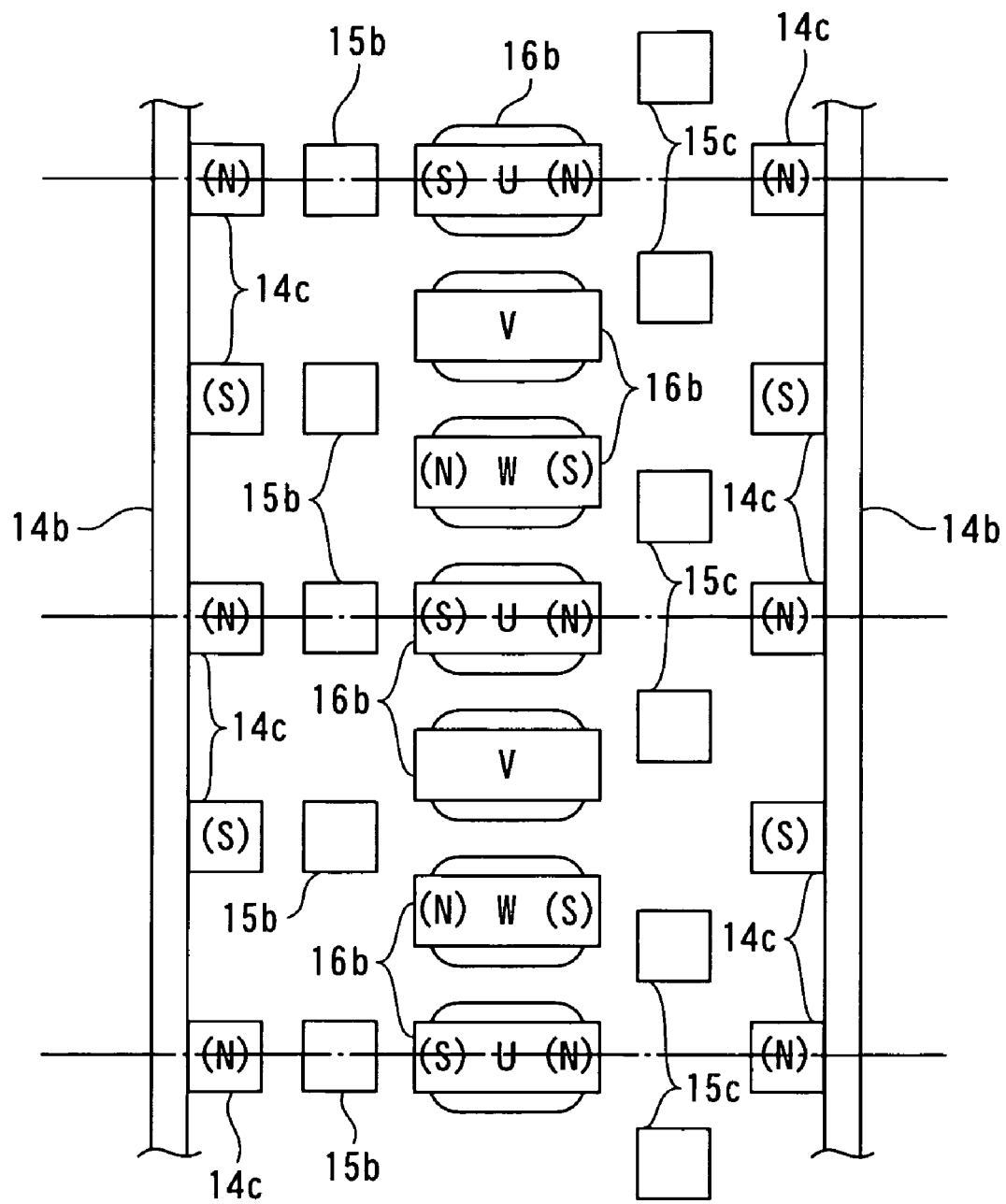
FIG. 6 A development view equivalent to FIG. 4.
Figure 7:
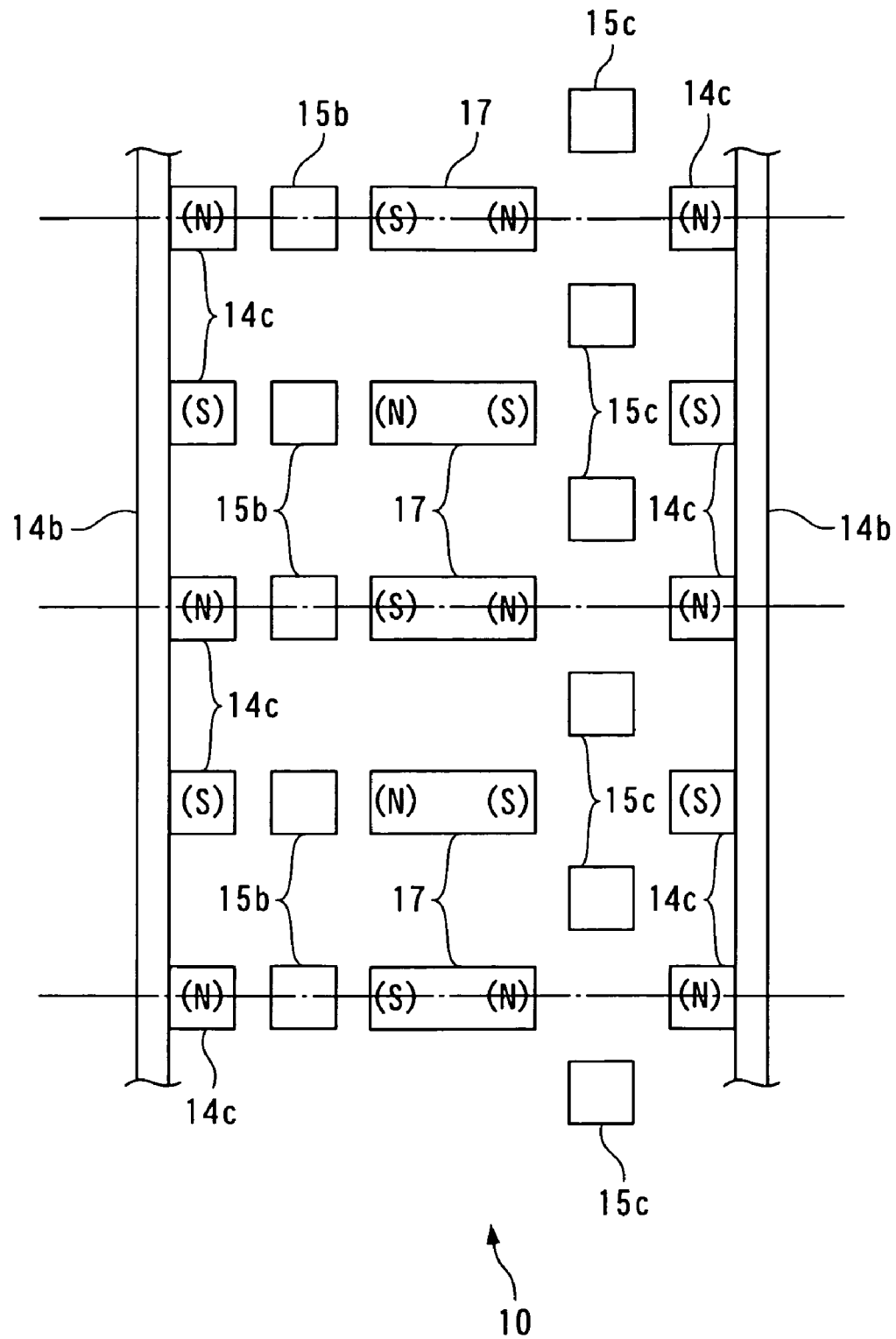
FIG. 7 A diagram useful in explaining operation of the first electric motor, in which magnetic poles of rotating magnetic fields of armatures in FIG. 6 are replaced by magnetic poles of imaginary permanent magnets.

The arrangement shown in FIG. 7 corresponds to an arrangement in which the armatures 16b in FIG. 6 are replaced by 2n permanent magnets which are imaginary (hereinafter referred to as "the imaginary permanent magnets") 17, and the imaginary permanent magnets 17 are arranged such that the magnetic poles of each two adjacent imaginary permanent magnets 17 and 17 have polarities different from each other. Therefore, hereinafter, the operation of the first electric motor 10 will be described based on the FIG. 7 arrangement in which the operation of the rotating magnetic fields is replaced by the rotating operation of the imaginary permanent magnets 17. It should be noted that in the following description, the left side and the right side as viewed in FIG. 7 will be referred to as "left" and "right".

First, a description will be given of an operation of the first electric motor 10 performed when the armatures 16b are caused to generate rotating magnetic fields in a state of the first rotor 14 being unrotatable, thereby driving the second rotor 15, with reference to FIGS. 8 and 9. It should be noted that such an operation specifically corresponds to an operation of the first electric motor 10 performed for starting the engine 3 e.g. when the vehicle 1 is at a stop with the engine stopped.

First, at the start of generation of the rotating magnetic fields, if magnetic poles at opposite sides of each rotating magnetic field, that is, magnetic poles at opposite sides of each imaginary permanent magnet 17 are opposed to the magnetic poles of the permanent magnets 14c of the first rotor 14, one of two pairs of the magnetic poles opposed to each other have polarities different from each other, and the other have the same polarity. For example, as shown in FIG. 8(*a*), the magnetic pole of each permanent magnet 14c shown on the left side and a magnetic pole at a left-side portion of the imaginary permanent magnet 17 have polarities different from each other, while the magnetic pole of each permanent magnet 14c shown on the right side and a magnetic pole at a right-side portion of the imaginary permanent magnet 17 have the same polarity. In this state, when each first core 15b is in a position between the magnetic pole of the permanent magnet 14c shown on the left side and the magnetic pole at the left-side portion of the imaginary permanent magnet 17, each second core 15c is positioned at the center between a pair of a permanent magnet 14c and an imaginary permanent magnet 17 opposed to each other and having the same polarity, and a pair of a permanent magnet 14c and an imaginary permanent magnet 17 adjacent to the pair and having the same polarity.

In this state, the first core 15b is magnetized by the magnetic pole of the permanent magnet 14c and the magnetic pole at the left-side portion of the imaginary permanent magnet 17. The first cores 15b are thus magnetized, and further, each two adjacent ones of the first cores 15b are arranged at predetermined intervals, whereby magnetic lines G1 of force are generated between the magnetic poles of the permanent magnets 14c, the first cores 15b, and the magnetic poles at the left-side portions of the imaginary permanent magnets 17. Similarly, each second core 15c is positioned at the center between one pair of a permanent magnet 14c and an imaginary permanent magnet 17, and the adjacent pair of a permanent magnet 14c and an imaginary permanent magnet 17, whereby the second core 15c is magnetized by the magnetic poles of the permanent magnets 14c and the magnetic poles at the right-side portions of the imaginary permanent magnets 17. The second cores 15c are thus magnetized, and further, each two adjacent ones of the second cores 15c are arranged at predetermined intervals, whereby magnetic lines G2 of force are generated between the magnetic poles of the permanent magnets 14c, the second cores 15c, and the magnetic poles at the right-side portions of the imaginary permanent magnets 17. As a result, magnetic circuits as shown in FIG. 10(a) are formed.

Now, as described hereinbefore, the magnetic lines of force have a characteristic that when bent, they generate magnetic forces acting to reduce the lengths thereof, and therefore when the first magnetic lines G1 are bent, magnetic forces acting on the first cores 15b become larger as the degree of bend of the first magnetic lines G1, and the total magnetic flux amounts thereof are larger. More specifically, the magnetic forces acting on the first cores 15b are determined depending on the synergistic action of the degree of bend of the first magnetic lines G1 and the total magnetic flux amounts thereof. Similarly, also in a case where the second magnetic lines G2 are bent, magnetic forces acting on the second cores 15c are determined depending on the synergistic action of the degree of bend of the second magnetic lines G2 and the total magnetic flux amounts thereof. Therefore, in states shown in FIGS. 8(a) and 10(b), the synergistic action of the degree of bend of the second magnetic lines G2 and the total magnetic flux amounts thereof does not generate such magnetic forces as cause the second cores 15c to rotate upward or downward, as viewed in the figures, on the second cores 15c.

When the rotating magnetic fields rotate such that each imaginary permanent magnet 17 rotates from a position shown in FIG. 8(a) to a position shown in FIG. 8(b), in accordance with the rotation of the imaginary permanent magnet 17, the second magnetic line G2 generated between an N pole of the right-side permanent magnet 14c, the second core 15c, and an S pole at the right side of the imaginary permanent magnet 17, or between an S pole of the right-side permanent magnet 14c, the second core 15c, and an N pole at the right side of the imaginary permanent magnet 17, increases in the total magnetic flux amount thereof, and the first magnetic line G1 generated between the first core 15b and the magnetic pole at the left-side portion of the imaginary permanent magnet 17 is bent. Accordingly, magnetic circuits as shown in FIG. 10(b) are formed by the first magnetic lines G1 and the second magnetic lines G2.

Figure 8:
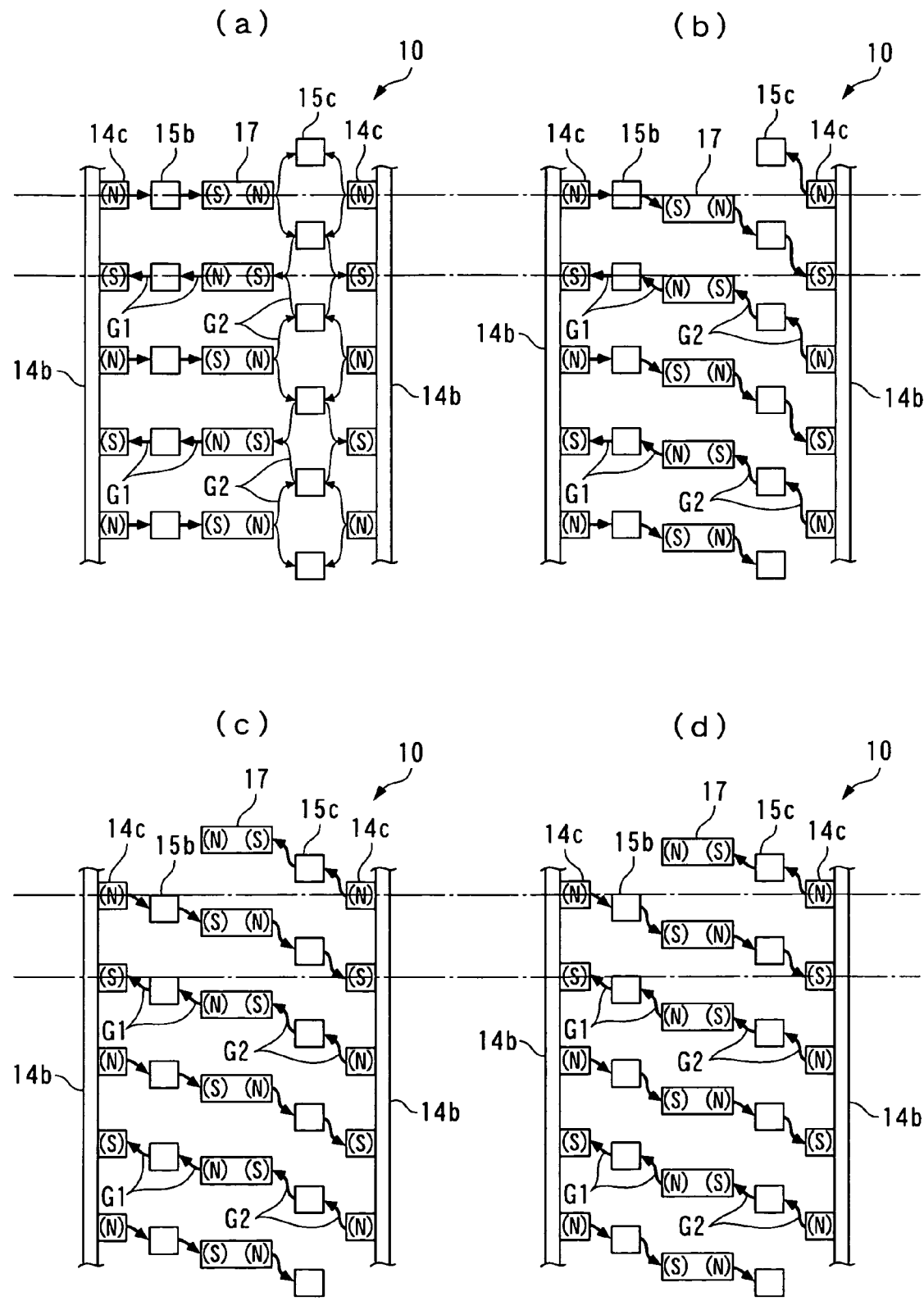
FIG. 8 A diagram illustrating operation of the first electric motor when a first rotor is unrotatable.

In this state, considerably strong magnetic forces act on the first cores 15b by the synergistic action of the degree of bend of the first magnetic lines G1 and the total magnetic flux amounts thereof, and drive the first cores 15b downward, as viewed in FIG. 8, while relatively weak magnetic forces act on the second cores 15c by the synergistic action of the degree of bend of the second magnetic lines G2 and the total magnetic flux amounts thereof, and drive the second cores 15c downward, as viewed in FIG. 8. As a result, the second rotor 15 is driven by the resultant force of the magnetic forces acting on the first cores 15b and the magnetic forces acting on the second cores 15c such that it rotates in the same direction as the rotating direction of the rotating magnetic fields.

Then, as the rotating magnetic fields rotate such that each imaginary permanent magnet 17 rotates from the position shown in FIG. 8(b) to positions shown in FIGS. 8(c), 8(d), 9(a), and 9(b) in the mentioned order, the first cores 15b and the second cores 15c are driven downward by magnetic forces caused by the first magnetic lines G1 and the second magnetic lines G2, respectively, whereby the second rotor 15 rotates in the same direction as the rotating direction of the rotating magnetic fields. During the rotation of the rotating magnetic fields, the magnetic forces acting on the first cores 15b are progressively decreased by the synergistic action of the degree of bend of the first magnetic lines G1 and the total magnetic flux amounts thereof, whereas the magnetic forces acting on the second cores 15c are progressively increased by the synergistic action of the degree of bend of the second magnetic lines G2 and the total magnetic flux amounts thereof.

Figure 9:
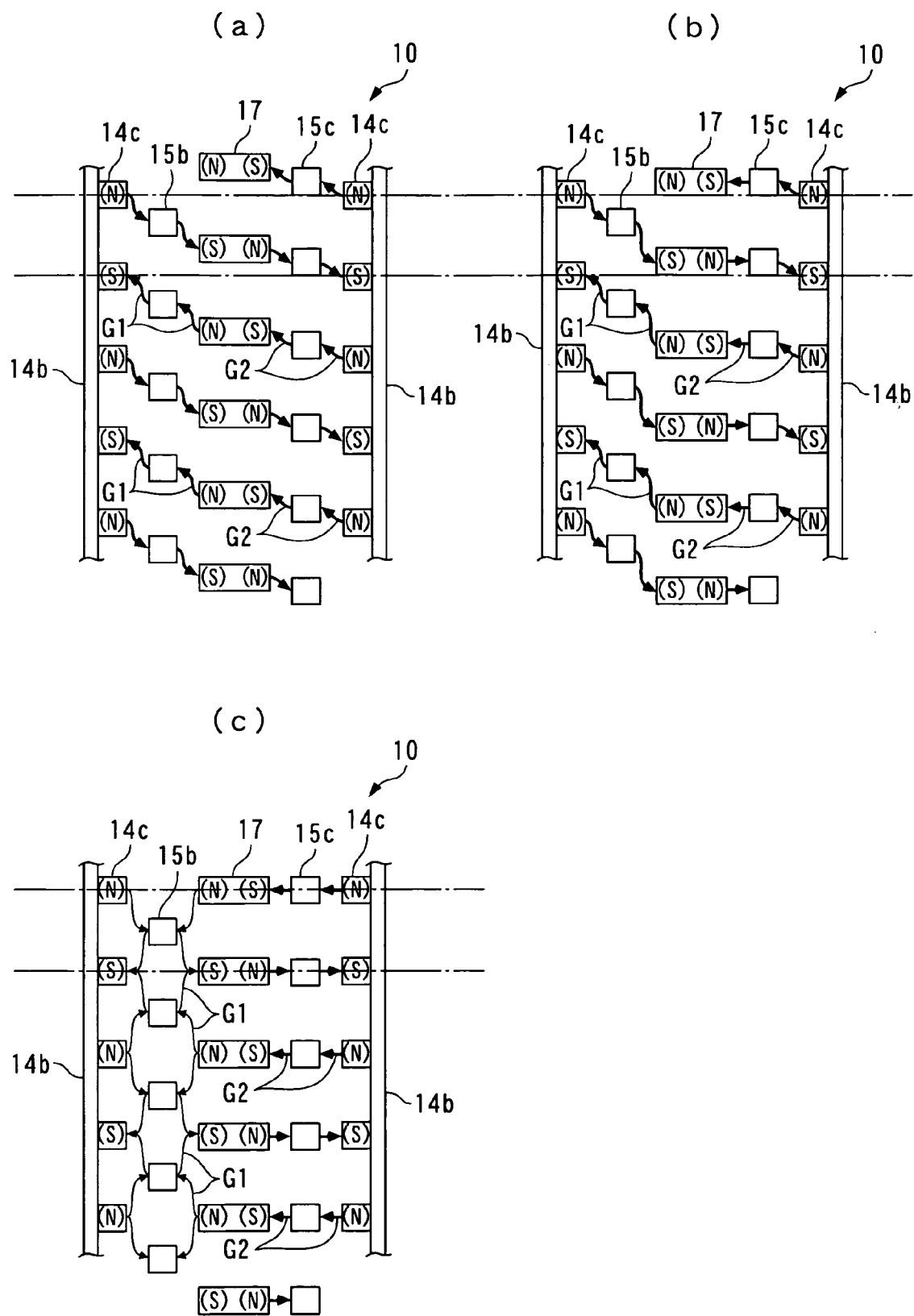
FIG. 9 A diagram which is useful in explaining operations continued from the FIG. 8 operation.

While the rotating magnetic fields rotate such that each imaginary permanent magnet 17 rotates from the position shown in FIG. 9(b) toward a position shown in FIG. 9(c), the second magnetic lines G2 are bent, and the total magnetic flux amounts thereof become substantially maximum, so that the strongest magnetic force acts on the second core 15c due to the synergistic action of the degree of bend of the second magnetic lines G2 and the total magnetic flux amounts thereof. After that, as shown in FIG. 9(c), when the rotating magnetic fields rotate by one pitch of the permanent magnets 14c, causing each imaginary permanent magnet 17 to move to a position where it is opposed to left and right permanent magnets 14c and 14c, the magnetic pole at the left-side portion of the permanent magnet 14c and the magnetic pole at the left-side portion of the imaginary permanent magnet 17 have the same polarity and each first core 15b is brought to a position between the magnetic poles of two pairs of the permanent magnets 14c and 12c, each pair having the same polarity. In this state, the synergistic action of the degree of bend of the first magnetic lines G1 and the total magnetic flux amounts thereof does not generate such a magnetic force as rotates the first core 15b downward, as viewed in FIG. 9, on the first core 15b. On the other hand, the magnetic pole at the right-side portion of the permanent magnet 14c, and the magnetic pole at the right-side portion of the imaginary permanent magnet 17 have polarities different from each other.

From this state, when the rotating magnetic fields further rotate, the first cores 15b are driven downward by the magnetic forces caused by the synergistic action of the degree of bend of the first magnetic lines G1 and the total magnetic flux amounts thereof, while the second cores 15c are driven downward by the magnetic forces caused by the synergistic action of the degree of bend of the second magnetic lines G2 and the total magnetic flux amounts thereof, whereby the second rotor 15 rotates in the same direction as the rotating direction of the rotating magnetic fields. During the process, as the rotating magnetic fields rotate to the position shown in FIG. 8(a), inversely to the above, the magnetic forces acting on the first cores 15b are increased by the synergistic action of the degree of bend of the first magnetic lines G1 and the total magnetic flux amounts thereof, whereas the magnetic forces acting on the second cores 15c are decreased by the synergistic action of the degree of bend of the second magnetic lines G2 and the total magnetic flux amounts thereof.

As described above, a state is repeated in which in accordance with the rotation of the rotating magnetic fields, the magnetic forces acting on the first core 15b, and the magnetic forces acting on the second core 15c are increased and decreased alternately, whereby the second rotor 15 is driven. Therefore, provided that heat losses and so forth are ignored, all the electric power W supplied to the armatures 16b is transmitted to the second rotor 15 as a driving force (power).

In this case, when torques transmitted via the first core 15b and the second core 15c are represented by TRQ2d and TRQ2e, the relationship between torque TRQ2 transmitted to the second rotor 15, and these torques TRQ2d and TRQ2e is generally as shown in FIG. 11. As shown in the figure, the two torques TRQ2*d* and TRQ2*e* repeat periodic changes, and the sum thereof becomes equal to the torque TRQ2 transmitted to the second rotor 15. That is, TRQ2=TRQ2*d*+TRQ2*e* holds.

Further, as is clear from comparison between FIG. 8(*a*) and FIG. 9(*c*), when the imaginary permanent magnets 17, that is, the rotating magnetic fields rotate by one pitch P of the permanent magnets 14*c*, the second rotor 15 rotates by only a half of the same, and hence the second rotor 15 is driven such that it rotates at a value equal to one half of the rotational speed of the rotating magnetic fields. This relationship is represented as shown in FIG. 12(*a*), in which V2=0.5×(V3+V1)=0.5×V3 holds. As described above, since the rotational speed V2 of the second rotor 12 is reduced to one half of the rotational speed V3 of the rotating magnetic fields, the torque TRQ2 transmitted to the second rotor 15 becomes twice as large as a value TRQ3 of torque obtained by conversion from the electric power W supplied to the armatures 16*b* and the rotational speed V3 of the rotating magnetic fields. That is, TRQ2=2×TRQ3 holds.

It should be noted that during the rotation of the rotating magnetic fields as described above, the second rotor 15 is rotated by the magnetic forces caused by the first magnetic lines G1 and the second magnetic lines G2, in a manner pulled by the rotating magnetic fields, so that the second rotor 15 rotates with a small phase delay with respect to the rotating magnetic fields. Therefore, when the imaginary permanent magnets 17 are at the positions shown in FIG. 9(*c*) during rotation of the rotating magnetic fields, the first core 15*b* and the second core 15*c* are actually positioned slightly upward of the positions shown in FIG. 9(*c*). In FIG. 9(*c*), however, for ease of understanding the above-described rotational speed, the second core 15*c* and the first core 15*b* are shown at the positions illustrated in the figure.

Next, a description will be given of an operation of the first electric motor 10 performed when the first rotor 14 is driven by causing the armatures 16*b* to generate the rotating magnetic fields in a state of the second rotor 15 being unrotatable, with reference to FIGS. 13 and 14. It should be noted that such an operation specifically corresponds to an operation of the first electric motor 10 performed for starting the vehicle 1 which is at a stop with the engine stopped, while leaving the engine at rest.

First, it is assumed that the magnetic poles at the opposite-side portions of each imaginary permanent magnet 17, and the left and right magnetic poles of permanent magnets 14*c* are in a positional relationship shown in FIG. 13(*a*) at the start of rotation of the rotating magnetic fields. When rotating magnetic fields rotate from this state, causing each imaginary permanent magnets 17 rotate to respective positions shown in FIG. 13(*b*), the first magnetic lines G1 between the first cores 15*b* and the imaginary permanent magnets 17 are bent, and at the same time the imaginary permanent magnets 17 become closer to the second cores 15*c*, whereby the lengths of the second magnetic lines G2 between the second cores 15*c* and the magnetic poles at the right-side portions of the imaginary permanent magnets 17 are decreased to increase the total magnetic flux amounts thereof. As a result, magnetic circuits as shown in FIG. 10(*b*) are formed.

In this state, although magnetic forces are generated between the first and second cores 15*b* and 15*c* and the magnetic poles at the opposite side portions of the imaginary permanent magnets 17 by the synergistic action of the degree of bend of the first magnetic lines G1 and the second magnetic lines G2 and the total magnetic flux amounts thereof, the second rotor 15 is unrotatable as mentioned above, causing the first and second cores 15*b* and 15*c* to be fixed, and the imaginary permanent magnets 17 correspond to the rotating magnetic fields, so that these magnetic forces do not exert influence. Further, since the first magnetic lines G1 between the magnetic poles of the left permanent magnets 14*c* shown on the left side and the first cores 15*b* are straight though their total magnetic flux amounts are large, no magnetic forces for driving the first cores 15*b* are generated. On the other hand, the second magnetic lines G2 between the magnetic poles of the permanent magnets 14*c* shown on the right side and the second cores 15*c* generate such magnetic forces as pull the permanent magnets 14*c* shown on the right side toward the second cores 15*c*, by the synergistic action of the degree of bend of the second magnetic lines G2 and the total magnetic flux amounts thereof, whereby the first rotor 14 is driven in a direction (upward as viewed in FIG. 13) opposite to the rotating direction of the rotating magnetic fields, to rotate toward a position shown in FIG. 13(*c*).

While the first rotor 14 rotates from the position shown in FIG. 13(*b*) toward the position shown in FIG. 13(*c*), the rotating magnetic fields, i.e. the imaginary permanent magnets 17 rotate toward a position shown in FIG. 13(*d*). Along with the rotation of the rotating magnetic fields, the imaginary permanent magnets 17 become still closer to the second core 15*c*, and the second magnetic lines G2 between the imaginary permanent magnets 17 and the permanent magnets 14*c* shown on the right side increase in the total magnetic flux amounts thereof, and decrease in the degree of bend thereof, so that magnetic forces that pull the permanent magnets 14*c* shown on the right side toward the second cores 15*c* are caused by the synergistic action of the degree of bend of the second magnetic lines G2 and the total magnetic flux amounts thereof. On the other hand, bent first magnetic lines G1 are generated between the magnetic poles of the permanent magnets 14*c* shown on the left side and the first cores 15*b*, and magnetic forces that pull the permanent magnets 14*c* shown on the left side toward the first cores 15*b* are caused by the synergistic action of the degree of bend of the first magnetic lines G1 and the total magnetic flux amounts thereof. However, the magnetic forces caused by the first magnetic lines G1 are considerably weaker than the magnetic forces caused by the second magnetic lines G2. As a result, the first rotor 14 is driven in the direction opposite to the rotating direction of the rotating magnetic fields by a magnetic force corresponding to the difference between the above magnetic forces.

When the imaginary permanent magnets 17 and the first rotor 14 are placed in a positional relationship shown in FIG. 13(*d*), the magnetic forces caused by the first magnetic lines G1 between the magnetic poles of the permanent magnets 14*c* shown on the left side and the first cores 15*b*, and the magnetic forces caused by the second magnetic lines G2 between the magnetic poles of the permanent magnets 14*c* shown on the right side and the second cores 15*c* are balanced, whereby the first rotor 14 is temporarily placed in an undriven state.

Figure 14:
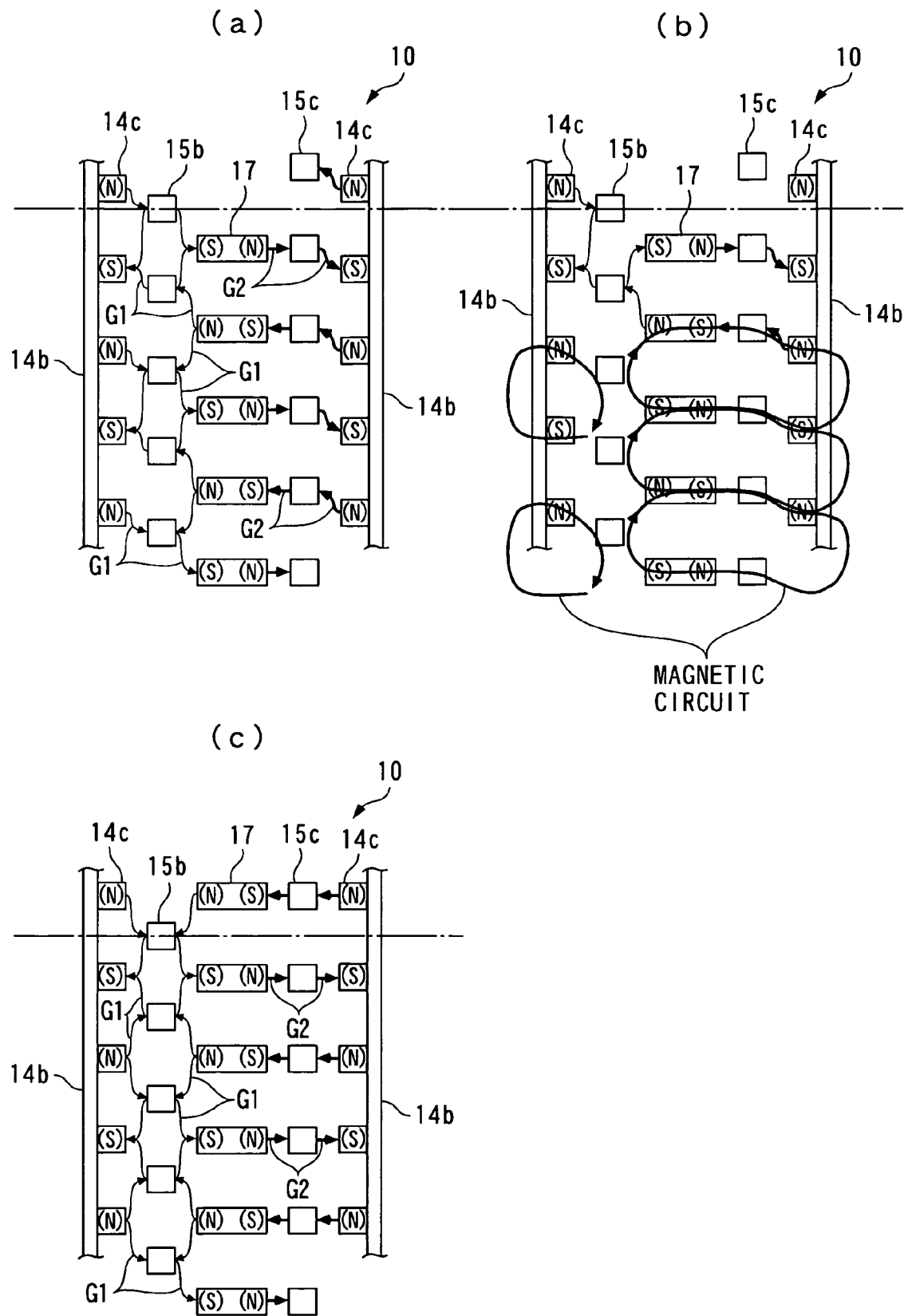
FIG. 14 A diagram illustrating operation continued from the operation illustrated in FIG. 13.

From this state, when the imaginary permanent magnets 17 rotates to respective positions shown in FIG. 14(*a*), the state of generation of the first magnetic lines G1 is changed to form magnetic circuits as shown in FIG. 14(*b*). This causes the magnetic forces caused by the first magnetic lines G1 to cease to act to pull the left-side permanent magnets 14*c* toward the first cores 15*b*, and therefore the right-side permanent magnets 14*c* are pulled toward the second cores 15*c* by the magnetic forces caused by the second magnetic lines G2, whereby the first rotor 14 is driven to a position shown in FIG. 14(*c*) in the direction opposite to the rotating direction of the rotating magnetic fields.

When the imaginary permanent magnets 17 rotates slightly downward, as viewed in the figures, from the position shown in FIG. 14(*c*), inversely to the above, the first magnetic lines G1 between the magnetic poles of the permanent magnets 14c shown on the left side and the first cores 15b generate magnetic forces that pull the permanent magnets 14c shown on the left side toward the first cores 15b by the synergistic action of the degree of bend of the first magnetic lines G1 and the total magnetic flux amounts thereof, whereby the first rotor 14 is driven in the direction opposite to the rotating direction of the rotating magnetic fields. Further, when the rotating magnetic fields rotate downward, as viewed in the figure, the first rotor 14 is driven by the magnetic force corresponding to the difference between the magnetic forces caused by the first magnetic lines G1 and the magnetic forces caused by the second magnetic lines G2, in the direction opposite to the rotating direction of the rotating magnetic fields. After that, when the magnetic forces caused by the second magnetic lines G2 cease to act, the first rotor 14 is driven only by the magnetic forces caused by the first magnetic lines G1, in the direction opposite to the rotating direction of the rotating magnetic fields.

As described above, along with the rotation of the rotating magnetic fields, the magnetic forces caused by the first magnetic lines G1 between the permanent magnets 14c shown on the left side and the first cores 15b, the magnetic forces caused by the second magnetic lines G2 between the permanent magnets 14c shown on the right side and the second cores 15c, and the magnetic forces corresponding to the difference between these magnetic forces alternately act on the first rotor 14, whereby it is possible to drive the first rotor 14 in the direction opposite to the rotating direction of the rotating magnetic fields.

In this case, as shown in FIG. 12(b), the first rotor 14 rotates at the same speed as that of the rotating magnetic fields in the direction opposite to the rotating direction thereof, whereby V1=−V3, i.e. |V1|=|V3| holds. Further, the value of the torque TRQ3 obtained by conversion from the electric power W supplied to the armatures 16b and the rotational speed V3 of the rotating magnetic fields directly becomes equal to the torque TRQ1 to be transmitted to the first rotor 14. That is, TRQ1=TRQ3 holds.

Further, when none of the rotational speed V3 of the rotating magnetic fields of the armatures 16b, the rotational speed V2 of the second rotor 12, and the rotational speed V1 of the first rotor 14 are equal to 0 (e.g. when the engine 3 and the first electric motor 10 are both in operation during traveling of the vehicle 1), the relationship between the speeds V1 to V3 is as shown in FIG. 12(c). That is, V2=0.5×(V1+V3) holds.

Further, when the rotational speed V3 of the rotating magnetic fields is controlled to 0 during rotation of the second rotor 15 (e.g. when lock current is caused to flow through the armatures 16b or phase-to-phase short circuit control is executed in the first electric motor 10 when the engine 3 is in operation during traveling of the vehicle 1), all the driving forces of the second rotor 15 are transmitted to the first rotor 14 via the magnetic lines of force. In this case, TRQ1=0.5× TRQ2 holds, and the relationship between the three rotational speeds V1 to V3 is as shown in FIG. 12(d). That is, V1=2×V2 holds.

Further, as is clear from FIGS. 12(a) to 12(d), the rotational speeds V1 to V3 of the two rotors 14 and 15, and the rotating magnetic fields have the same characteristics as those of the rotational speeds of three members of a planetary gear unit, so that the first electric motor 10 can be regarded as a planetary gear unit that inputs and outputs a rotating force using two of the members, and inputs and outputs electric power using one of the same. That is, the first electric motor 10 can be regarded as a device which has the same function as that of the planetary gear unit, and performs the same operation as carried out by the same.

Further, the MOT•ECU 30 controls the operation of the second electric motor 20 by causing electric power from the battery 33 to be modulated into a pseudo three-phase AC current via the 2ND•PDU 32 by the pulse-width modulation method, and causing the pseudo three-phase AC current to be supplied to the armatures 23a of the second electric motor 20. More specifically, in the second electric motor 20, the magnetic forces generated by the armatures 23a are controlled according to the value of electric current supplied from the 2ND•PDU 32, and the rotational speed of the rotating magnetic fields is controlled according to the frequency of the electric current supplied from the 2ND•PDU 32.

Next, a description will be given of the method of controlling the first electric motor 10 and the second electric motor 20 using the MOT•ECU 30. First, a description will be given of engine start control performed for starting the engine 3 when the vehicle 1 is at a stop. In this control, in a case where the engine is at rest and the vehicle is at a stop, when predetermined engine-starting conditions are satisfied (e.g. an ignition switch, not shown, is switched from an off state to an on state), the MOT•ECU 30 supplies electric power from the battery 33 to the first electric motor 10 via the 1ST•PDU 31, to cause the armatures 16b to generate the rotating magnetic fields. In this case, in the first electric motor 10, the first rotor 14 is mechanically connected to the front wheels 4, and the second rotor 15 is mechanically connected to the crankshaft of the engine 3, and therefore when the vehicle 1 is at a stop with the engine stopped, the rotational resistance of the first rotor 14 becomes much larger than that of the second rotor 15, which causes the second rotor 15 to be driven in the rotating direction of the rotating magnetic fields with the first rotor 14 remaining at rest. As a result, as shown in FIGS. 8 and 9, referred to hereinabove, the second rotor 15 is driven along with the rotation of the rotating magnetic fields, whereby the engine 3 can be started.

Further, in a case where the vehicle 1 is at a stop with the engine 3 in operation, when predetermined vehicle-starting conditions are satisfied (e.g. when a brake pedal, not shown, is not operated, and the accelerator pedal opening AP becomes not lower than a predetermined value), vehicle start control is executed. First, when the vehicle 1 is at a stop, the output shaft 13, i.e. the first rotor 14 is in a state in which rotation thereof is stopped, so that all the driving forces caused by the engine 3 are transmitted to the armatures 16b of the first electric motor 10 via magnetic lines of force to cause the armatures 16b to generate rotating magnetic fields, whereby an induced electromotive force W is generated. The MOT•ECU 30 controls current supplied to the armatures 16b to thereby regenerate electric power from the induced electromotive force W caused by the armatures 16b, and supplies all the regenerated electric power W to the second electric motor 20 via the 1ST•PDU 31 and the 2ND•PDU 32. As a result, the output shaft 13 is driven by the rotor 22 of the second electric motor 20, to drive the front wheels 4 and 4, whereby the vehicle 1 is started. After the vehicle 1 is started, the MOT•ECU 30 causes the power regenerated by the first electric motor 10 to be progressively reduced as the vehicle speed increases, and at the same time causes the regenerated electric power to be supplied to the second electric motor 20.

Further, when the vehicle 1 is traveling with the engine 3 in operation, speed change control is executed. In the speed change control, depending on operating conditions of the engine 3 (e.g. the engine speed NE, the accelerator pedal opening AP, etc.) and/or traveling conditions of the hybrid vehicle 1 (e.g. the vehicle speed VP), the first electric motor 10 is controlled such that a ratio between part of power output from the engine 3, which is transmitted via the first rotor 14 to the front wheels 4, and part of the same, from which electric power is regenerated by the first electric motor 10, is changed, and the second electric motor 20 is controlled by supplying the regenerated electric power W thereto. In this case, since the first electric motor 10 has operating characteristics similar to those of a planetary gear unit, as mentioned hereinabove, by controlling the first electric motor 10 as described above and controlling the second electric motor 20 by supplying the regenerated electric power W to the second electric motor 20, provided that electrical losses are ignored, it is possible to change the ratio between the rotational speed of the second rotor 15 and the rotational speed of the output shaft 13, in other words, the ratio between the engine speed NE and the drive shaft speed ND as desired while transmitting all the power from the engine 3 to the front wheels 4 via the first electric motor 10 and the second electric motor 20. In short, by controlling the two electric motor 10 and 20, it is possible to realize the functions of an automatic transmission.

Further, during the speed change control, when predetermined power-transmitting conditions are satisfied (e.g. the engine speed NE and the accelerator pedal opening AP are in a predetermined region), the regeneration of electric power by the first electric motor 10 is stopped, and the rotational speed of first and second rotating magnetic fields of the first electric motor 10 is controlled to 0 by supplying lock current to the armatures 16b or executing phase-to-phase short circuit control of the first electric motor 10. When such control is performed, insofar as the power from the engine 3 is within a range capable of being transmitted by magnetism, it is possible to transmit all the power from the engine 3 to the front wheels 4 by magnetism, so that it is possible to enhance power transmission efficiency, compared with the case in which electric power regenerated by the first electric motor 10 is caused to be supplied to the second electric motor 20 via the 2ND•PDU 32.

On the other hand, in a case where the vehicle 1 is traveling with the engine 3 in operation (including when the engine 3 is in a decelerating fuel-cut operation), when a remaining charge SOC of the battery 33 is not higher than a predetermined value SOC_REF (e.g. 50%), the electric power regenerated by the first electric motor 10 and/or the second electric motor 20 is controlled to execute charging control for charging the battery 33. This makes it possible to secure sufficient remaining charge SOC of the battery 33.

Further, in a case where the engine 3 is in operation, when predetermined assist conditions (e.g. when the vehicle 1 is started uphill, is traveling uphill, or is accelerating) are satisfied, assist control is executed. More specifically, by supplying electric power from the battery 33 to the first electric motor 10 and/or the second electric motor 20, the first electric motor 10 and/or the second electric motor 20 are controlled such that power from the first electric motor 10 and/or the second electric motor 20, and power from the engine 3 are transmitted to the front wheels 4. With this control, in addition to the engine 3, the first electric motor 10 and/or the second electric motor 20 are/is used as power sources, whereby the vehicle 1 can perform assist traveling or assist starting.

Further, in a case where the engine 3 is at rest and the hybrid vehicle 1 is at a stop, when predetermined motor-driven vehicle-starting conditions are satisfied (e.g. when the accelerator pedal opening AP is not lower than a predetermined value in a state where the remaining charge SOC of the battery 33 is higher than the predetermined value SOC_REF, and the brake pedal is not operated), the motor-driven start control is executed. More specifically, electric power is simultaneously supplied from the battery 33 to the first electric motor 10 and the second electric motor 20 while the engine 3 remains at rest, whereby the two motors 10 and 20 are simultaneously driven. At this time, the output shaft 13 starts to rotate simultaneously with the start of rotation of the second electric motor 20, and in the first electric motor 10, the rotational resistance of the second rotor 15 connected to the stopped engine 3 becomes considerably larger than that of the first rotor 14. As a result, by causing the armatures 16b to generate rotating magnetic fields, the first rotor 14 can be driven, as shown in FIGS. 13 and 14, and the vehicle 1 can be started by the driving forces of the first electric motor 10 and the second electric motor 20. It should be noted if the rotational resistance of the engine 3 is insufficient, the engine 3 may be locked, or a device for increasing the rotational resistance may be provided.

As described hereinabove, according to the hybrid vehicle 1 of the present embodiment, when the hybrid vehicle 1 is at a stop with the engine stopped, it is possible to start the engine 3 by the first electric motor 10 without using a starter or the like. Further, when the vehicle 1 is started after the start of the engine 3, it is possible to convert all power from the engine 3 into regenerated electric power by the first electric motor 10, and by supplying all the regenerated electric power to the second electric motor 20 via the 1ST•PDU 31 and the 2ND•PDU 32, it is possible to positively start the hybrid vehicle 1.

Further, when the hybrid vehicle 1 is traveling with the engine 3 in operation, by executing the speed change control, it is possible to change the ratio between the drive shaft speed ND and the engine speed NE as desired while transmitting all power from the engine 3 to the front wheels 4. That is, by controlling the two electric motors 10 and 20, it is possible to realize the functions of the automatic transmission.

In addition, when predetermined assist conditions are satisfied during engine operation, the assist control is executed, and hence it is possible to perform assist traveling or assist starting by using not only the engine 3 but also the first electric motor 10 and the second electric motor 20, as power sources.

Further, during traveling of the hybrid vehicle 1, the second rotor 15 having the first and second cores 15b and 15c are driven by the engine 3 very frequently and hence compared with the conventional vehicle in which rotors configured to have three-phase coils wound around iron cores are driven by the engine, it is possible to reduce the weight of the second rotor 15 to thereby enhance not only the efficiency of the first electric motor 10 but also the durability thereof. Furthermore, during the operation of the first electric motor 10, the first and second cores 15b and 15c are magnetized to thereby cause the first electric motor 10 to function as a synchronous machine, so that compared with the conventional vehicle in which the first electric motor 10 functions as an induction machine, it is possible to further improve the efficiency of the first electric motor 10. This makes it possible to further improve marketability of the hybrid vehicle 1.

Furthermore, in a case where the hybrid vehicle 1 is traveling with the engine 3 in operation, when the remaining charge SOC of the battery 33 is not higher than the predetermined value SOC_REF, the charging control for charging the battery 33 is executed, which makes it possible to secure a sufficient remaining charge SOC of the battery 33. This makes it possible to start the engine 3, or drive the first electric motor 10 and the second electric motor 10 with the engine 3 stopped, to thereby start the hybrid vehicle 1, by the electric power within the battery 33, as described above.

Figure 15:
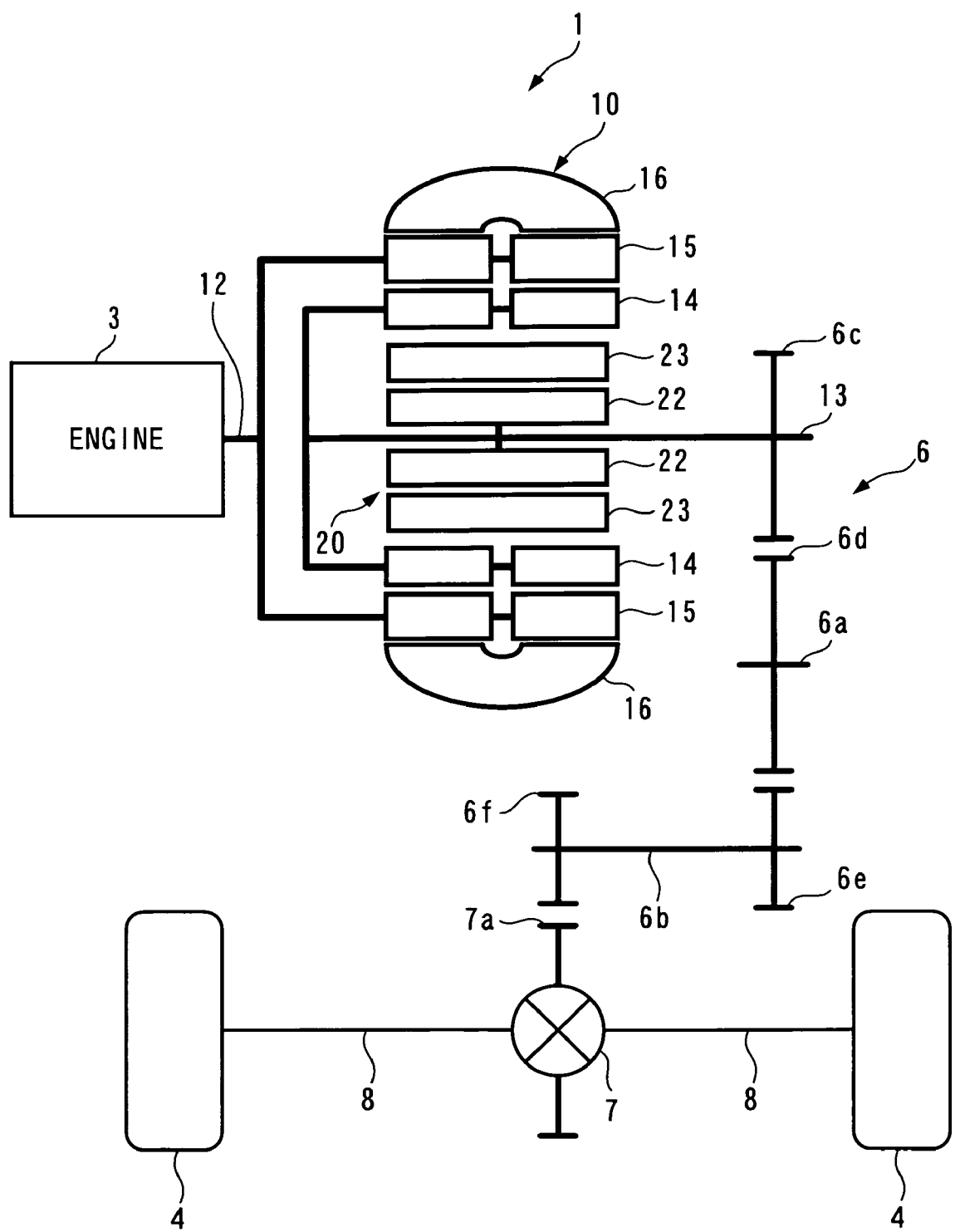
FIG. 15 A diagram showing a variation of the arrangement of the first electric motor and the second electric motor.

It should be noted that although the first embodiment is an example in which the first electric motor 10 and the second electric motor 20 are axially arranged side by side on the output shaft 13, the arrangement of the first electric motor 10 and the second electric motor 20 is not limited to this. For example, as shown in FIG. 15, the first and second electric motors 10 and 20 may be radially arranged side by side such that the first electric motor 10 is positioned outside the second electric motor 20. This arrangement makes it possible to make the two electric motors 10 and 20 compact in size in the axial direction, thereby making it possible to improve the degree of freedom in design of the hybrid vehicle 1.

Figure 16:
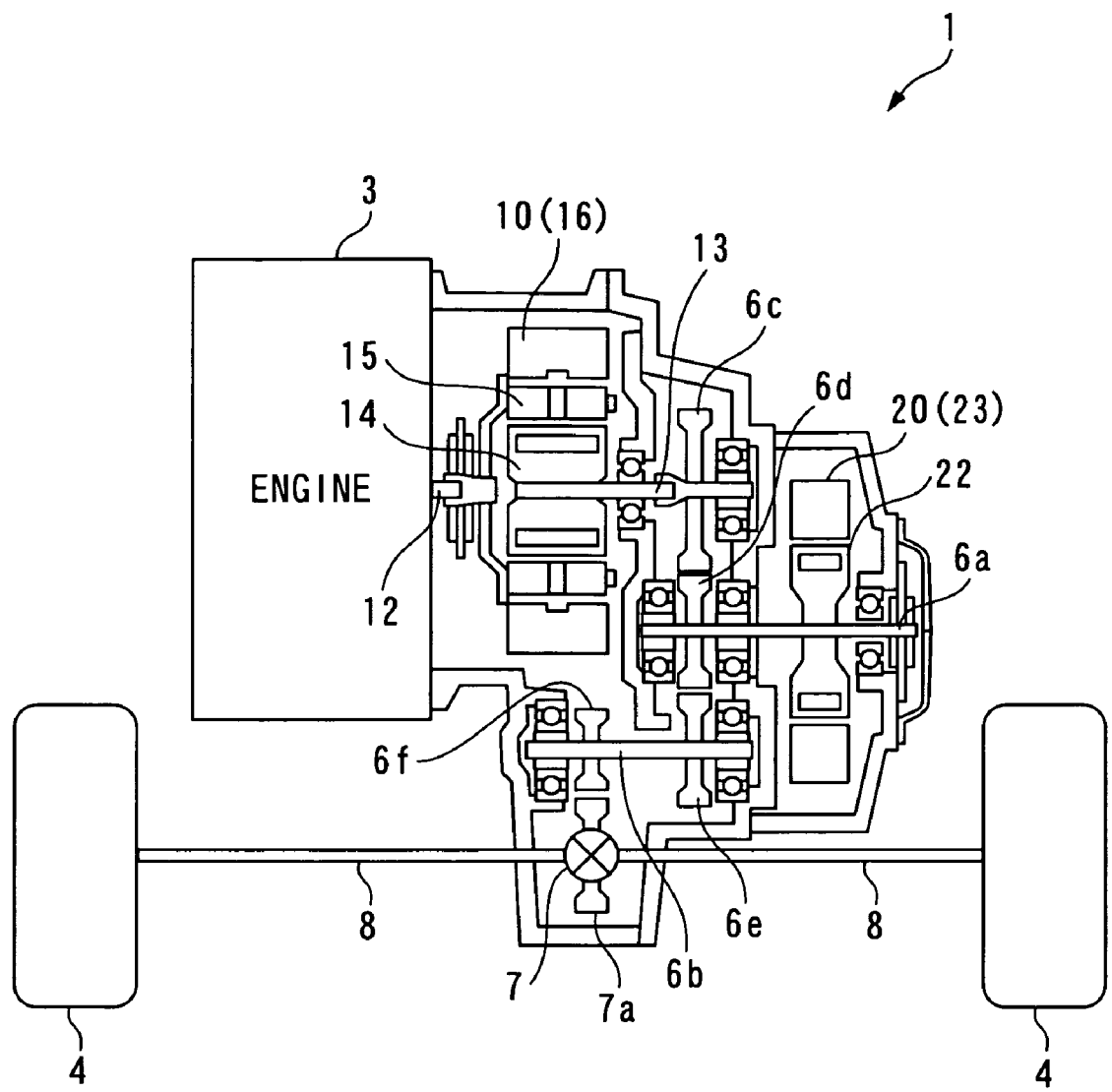
FIG. 16 A diagram showing another variation of the arrangement of the first electric motor and the second electric motor.

Further, as shown in FIG. 16, the first rotor 14 of the first electric motor 10, and the rotor 22 of the second electric motor 20 may be arranged on different shafts. It should be noted that in FIG. 16, hatching in portions illustrating cross-sections are omitted for ease of understanding. As shown in the figure, in the second electric motor 20, the rotor 22 is provided not on the above-described output shaft 13 but on the first gear shaft 6a. This makes it possible to improve the degree of freedom in design of the hybrid vehicle 1 in respect of the arrangement of the two electric motors 10 and 20.

Further, although the first embodiment is an example in which the numbers of the first cores 15b and the second cores 15c as first soft magnetic material elements and second soft magnetic material elements are set to the same value of 2n as that of the permanent magnets 14c as first magnetic poles and second magnetic poles, the first soft magnetic material elements and the second soft magnetic material elements in the present invention are not limited to these, but there may be used first soft magnetic material elements and second soft magnetic material elements which are different in number from the first magnetic poles and the second magnetic poles. For example, the numbers of the first cores 15b and the second cores 15c may be set to n.

Further, although the first embodiment is an example in which the armatures 16b are circumferentially arranged in one row as a first armature row and a second armature row, the first armature row and the second armature row in the present invention are not limited to these, but, for example, two kinds of armatures different from each other which are circumferentially arranged in two rows may be as the first armature row and the second armature row. In this case, it is only required that the rotational speed and the rotating direction of the rotating magnetic fields of the first armature row, and those of the rotating magnetic fields of the second armature row are controlled to be identical to each other.

Further, although the first embodiment is an example in which the first magnetic pole row and the second magnetic pole row are formed by the left and right rows of magnetic poles of a magnet row formed by circumferentially arranging the permanent magnets 14c, the first magnetic pole row and the second magnetic pole row in the present invention are not limited to these, but two permanent magnet rows formed by circumferentially arranging permanent magnets in two rows may be prepared, whereby a magnetic pole row of one of the permanent magnet rows and a magnetic pole row of the other permanent magnet row may be used as the first magnetic pole row and the second magnetic pole row.

Furthermore, although the first embodiment is an example in which the first rotor 14, the second rotor 15, and the stator 16 of the first electric motor 10 are arranged from the radially inner side toward the radially outer side, it is to be understood that the arrangement of the first rotor, the second rotor, and the stator of the first electric motor in the present invention is by no means limited to this. For example, the first rotor, the second rotor, and the stator may be arranged side by side in the direction of the rotational axis of the first electric motor.

Further, although the first embodiment is an example in which the battery 33 is used as a power storage device, this is not limitative, the power storage device according to the present invention is not limited to this, but may be any power storage device insofar as it is capable of storing electric power. For example, a capacitor may be employed as the power storage device.

Furthermore, although the first embodiment is an example in which the MOT•ECU 30, the 1ST•PDU 31, and the 2ND•PDU 32 are used as control devices for controlling the operations of the first electric motor 10 and the second electric motor 20, the control devices for controlling the first electric motor 10 and the second electric motor 20 are not limited to these, but they may be any control devices insofar as they are capable of controlling the operations of the motors 10 and 20. For example, electric circuits or the like which have microcomputers mounted thereon may be employed as the control devices for controlling the first electric motor 10 and the second electric motor 20.

On the other hand, in the hybrid vehicle according to the first embodiment, as shown in FIG. 17, the gear mechanism 6 may be replaced by a transmission (indicated by "T/M" in the figure) 35. The transmission 35 changes the reduction gear ratio between the output shaft 13 and the front wheels in a stepped or stepless manner and the MOT•ECU 30 controls the speed change operation. It should be noted that as the transmission 35, there may be employed any of a stepped automatic transmission equipped with a torque converter, a belt-type stepless automatic transmission, a toroidal-type stepless automatic transmission, an automatic MT (stepped automatic transmission which executes a connecting/disconnecting operation of a clutch and a speed change operation, using an actuator), etc. as appropriate.

With this arrangement, it is possible to set the torque to be transmitted to the transmission 35 via the first electric motor and the second electric motor 20 to a smaller value, by setting the reduction gear ratio of the transmission 35 for a low-rotational speed and high-load region to a large value, whereby the first electric motor 10 and the second electric motor 20 can be reduced in size. On the other hand, it is possible to reduce the rotational speed of the first electric motor and the second electric motor 20, by setting the reduction gear ratio of the transmission 35 for a high-rotational speed and high-load region to a small value. Therefore, as for the first electric motor 10, it is possible to reduce the field rotational speed, and hence it is possible to reduce energy loss and improve the transmission efficiency as well as prolong the service life thereof. Further, as for the second electric motor 20, it is possible to improve the operating efficiency and prolong the service life thereof.

Figure 18:
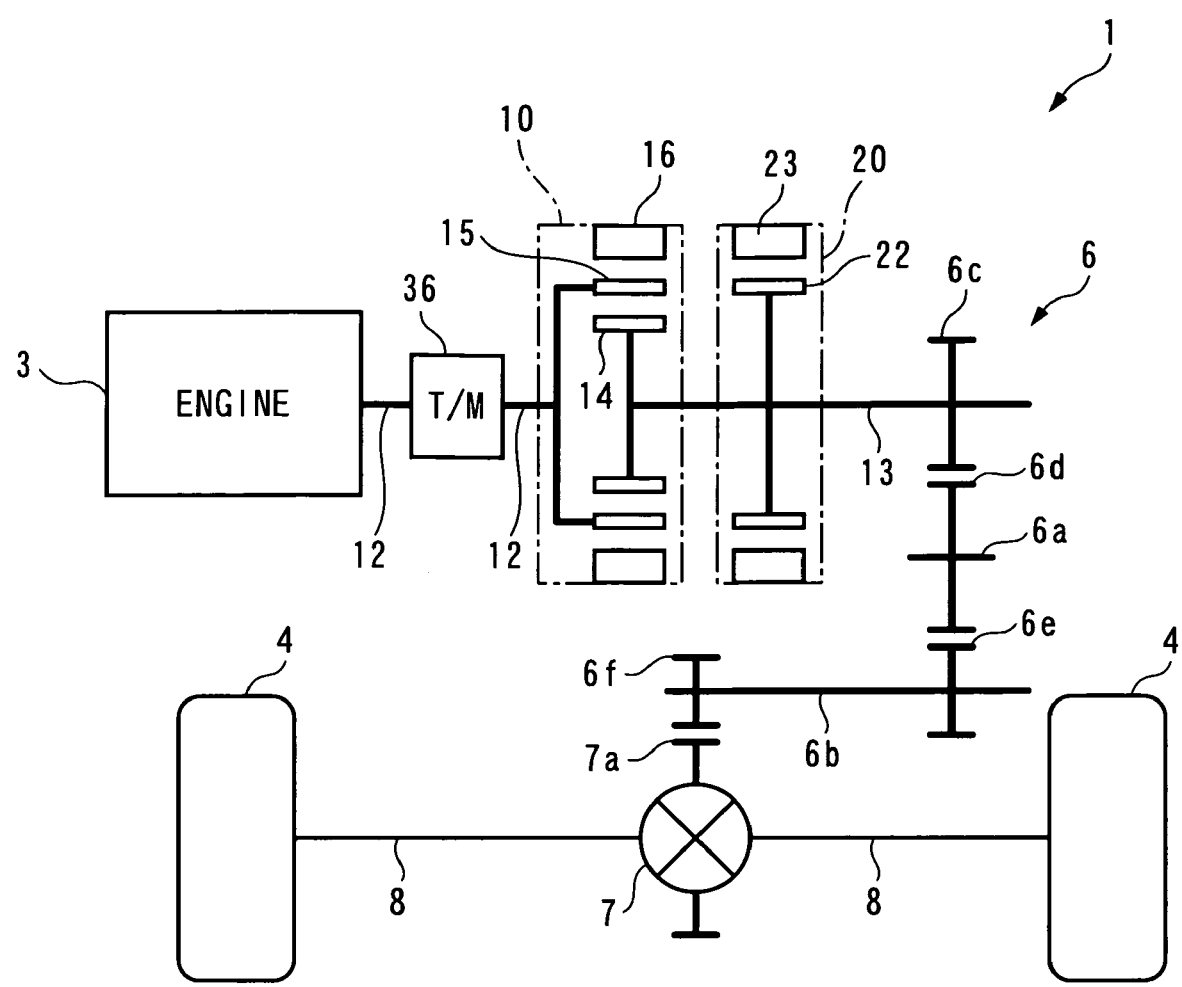
FIG. 18 A diagram showing another example in which a transmission apparatus is provided in the hybrid vehicle according to the first embodiment.

Further, in the hybrid vehicle 1 according to the first embodiment, as shown in FIG. 18, a transmission 36 may be interposed in an intermediate portion of the input shaft 12 extending between the engine 3 and the second rotor 15. The transmission 36 changes the speed increasing ratio between the engine 3 and the second rotor 15 in a stepped or stepless manner. It should be noted that as the transmission 36, similarly to the transmission 35, there may be employed any of a stepped automatic transmission equipped with a torque converter, a belt-type stepless automatic transmission, a toroidal-type stepless automatic transmission, an automatic MT, etc. as appropriate.

With this arrangement, it is possible to set the torque to be transmitted to a final reducer side via the first electric motor 10 and the second electric motor 20 to a small value, by setting both the speed increasing ratio of the transmission 36 for a low-rotational speed and high-load region and the final reduction gear ratio of a final reducer to larger values, whereby the first electric motor 10 and the second electric motor 20 can be reduced in size. On the other hand, by setting the speed increasing ratio of the transmission 36 for a high-vehicle speed and high-load region to a small value (or 1:1), it is possible to reduce the rotational speed of the first electric motor 10 and that of the second electric motor 20. Therefore, as for the first electric motor 10, it is possible to reduce the field rotational speed, whereby it is possible to reduce the energy loss and improve the transmission efficiency as well as prolong the service life thereof. Further, as for the second electric motor 20, it is possible to improve the operating efficiency and prolong the service life thereof.

Figure 19:
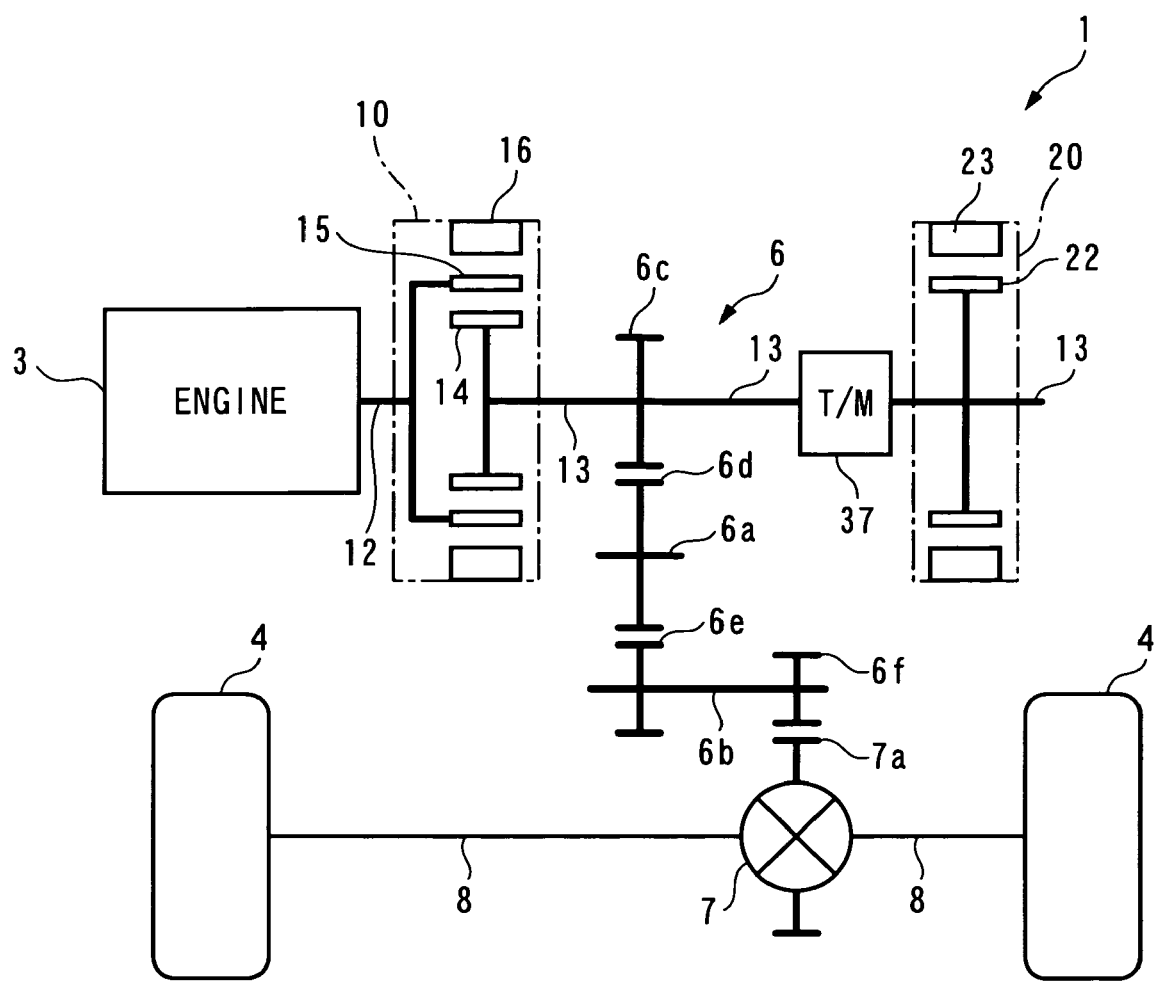
FIG. 19 A diagram showing still another example in which a transmission apparatus is provided in the hybrid vehicle according to the first embodiment.

Further, in the hybrid vehicle 1 according to the first embodiment, as shown in FIG. 19, the location of the gear mechanism 6 may be changed to a portion of the output shaft 13 between the first rotor 14 and the second rotor 22, and the transmission 37 may be provided in a portion of the output shaft 13 between the gear mechanism 6 and the rotor 22. The transmission mechanism 37 changes the reduction gear ratio between the rotor 22 and the gear 6c in a stepped or stepless manner and the MOT•ECU 30 controls the speed change operation. It should be noted that as the transmission 37, similarly to the transmission 35 described above, there may be employed any of a stepped automatic transmission equipped with a torque converter, a belt-type stepless automatic transmission, a toroidal-type stepless automatic transmission, an automatic MT, etc. as appropriate.

With this arrangement, it is possible to set the torque to be transmitted from the second electric motor 20 to the front wheels 4 by setting the reduction gear ratio of the transmission 37 for a low-rotational speed and high-load region to a large value, whereby the second electric motor 20 can be reduced in size. On the other hand, it is possible to reduce the rotational speed of the second electric motor 20 by setting the reduction gear ratio of the transmission 37 for a high-vehicle speed and high-load region, whereby it is possible to improve the operating efficiency and prolong the service life thereof, as described above.

Figure 20:
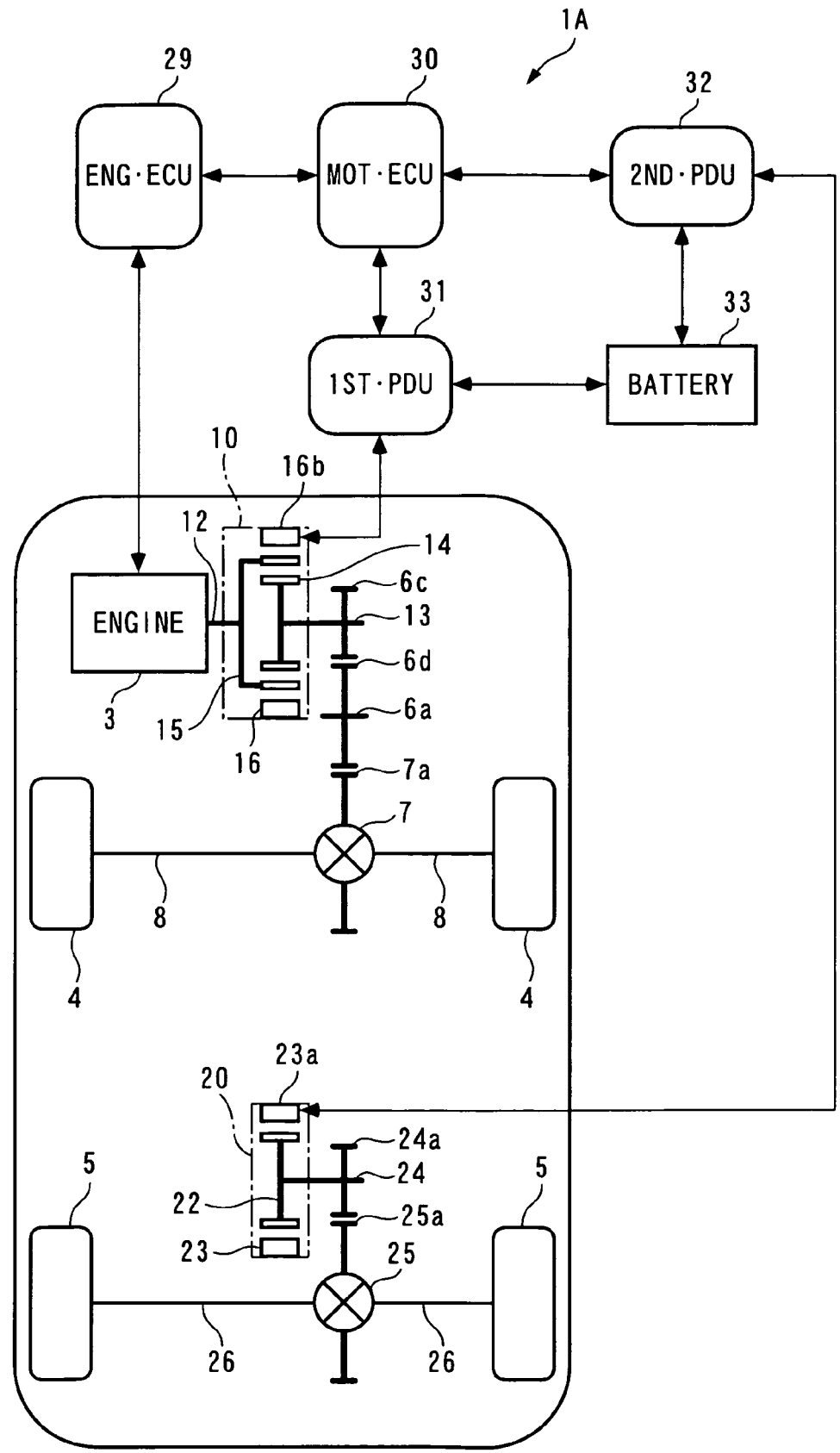
FIG. 20 A diagram schematically showing a hybrid vehicle according to a second embodiment.

Next, a hybrid vehicle (hereinafter referred to as "the vehicle") 1A according to a second embodiment of the present invention will be described with reference to FIG. 20. As shown in the figure, the vehicle 1A is distinguished from the vehicle 1 according to the first embodiment in that the second electric motor 20 is employed as a power source for driving the rear wheels, and in the other respects, the vehicle 1A is configured substantially similarly to the vehicle 1 according to the first embodiment. Therefore, the following description will be given mainly of points different from the vehicle 1 according to the first embodiment, and component elements of the vehicle 1A identical to those of the vehicle 1 according to the first embodiment are denoted by identical reference numerals, with detailed description omitted.

In the vehicle 1A, the gear 6d on the first gear shaft 6a is in constant mesh with the gear 7a of the differential gear mechanism 7, whereby the rotation of the output shaft 13 is changed in speed at a gear ratio between the gears 6c and 6d, and the gear 7a, for being transmitted to the differential gear mechanism 7 and the front wheels 4 and 4.

Further, the second electric motor 20 is connected to the left and right rear wheels 5 and 5 via a differential gear mechanism 25, and left and right drive shafts 26 and 26, whereby as described hereinbelow, the power from the second electric motor 20 is transmitted to the rear wheels 5 and 5. It should be noted that in the present embodiment, the front wheels 4 correspond to the first drive wheels, and the rear wheels 5 to the second drive wheels.

The rotor 22 of the second electric motor 20 is concentrically fixed to the left end of a gear shaft 24, and a gear 24a is connected to the right end of the gear shaft 24 concentrically with the gear shaft 24. The gear 24a is in constant mesh with a gear 25a of the differential gear mechanism 25. With the above arrangement, the power from the second electric motor 20 is transmitted via the gear 24a and the gear 25a to the differential gear mechanism 25 and the rear wheels 5 and 5.

With this arrangement, it is possible to obtain the same advantageous effects as provided by the vehicle 1 according to the first embodiment. In addition, at the start of the vehicle 1A, by supplying electric power regenerated by the first electric motor 10 to the second electric motor 20, the vehicle 1A can be started in an all-wheel drive state, whereby it is possible to improve startability on low μ roads including a snowy road. Further, also during traveling, the vehicle 1A can run in an all-wheel drive state, which makes it possible to improve traveling stability of the vehicle 1A on low μ roads.

Further, in the hybrid vehicle 1A according to the second embodiment, as shown in 21, a transmission 38 may be provided in an intermediate portion of the input shaft 12 extending between the engine 3 and the second rotor 15, and a transmission 39 may be provided in a portion of the gear shaft 24 between the gear 24a and the rotor 22. The transmission 38 changes the reduction gear ratio between the engine 3 and the second rotor 15 in a stepped or stepless manner and the MOT•ECU 30 controls the speed change operation.

Further, the transmission 39 changes the reduction gear ratio between the second electric motor 20 and the rear wheels 5 in a stepped or stepless manner and the MOT•ECU 30 controls the speed change operation. It should be noted that as the transmissions 38 and 39, similarly to the transmission 35 described above, there may be employed any of a stepped automatic transmission equipped with a torque converter, a belt-type stepless automatic transmission, a toroidal-type stepless automatic transmission, an automatic MT, etc. as appropriate.

With this arrangement, it is possible to set the torque to be transmitted to a final reducer side via the first electric motor 10 to a small value, by setting both the speed increasing ratio of the transmission 38 for a low-rotational speed and high-load region and the final reduction gear ratio of a final reducer to larger values, whereby the first electric motor 10 can be reduced in size. On the other hand, by setting the speed increasing ratio of the transmission 38 for a high-vehicle speed and high-load region to a small value (or 1:1), it is possible to reduce the rotational speed of the first electric motor 10. Therefore, as for the first electric motor 10, it is possible to reduce the field rotational speed, whereby it is possible to reduce the energy loss and improve the transmission efficiency as well as prolong the service life thereof.

Further, by setting the reduction gear ratio of the transmission 39 for a low-rotational speed and high-load region, it is possible set the torque to be generated by the second electric motor 20 to a smaller value, whereby the second electric motor 20 can be reduced in size. On the other hand, it is possible to reduce the rotational speed of the second electric motor 20 by setting the reduction gear ratio of the transmission 39 for a high-vehicle speed and high-load region, whereby it is possible to improve the operating efficiency and prolong the service life of the second electric motor 20, as described above.

Figure 21:
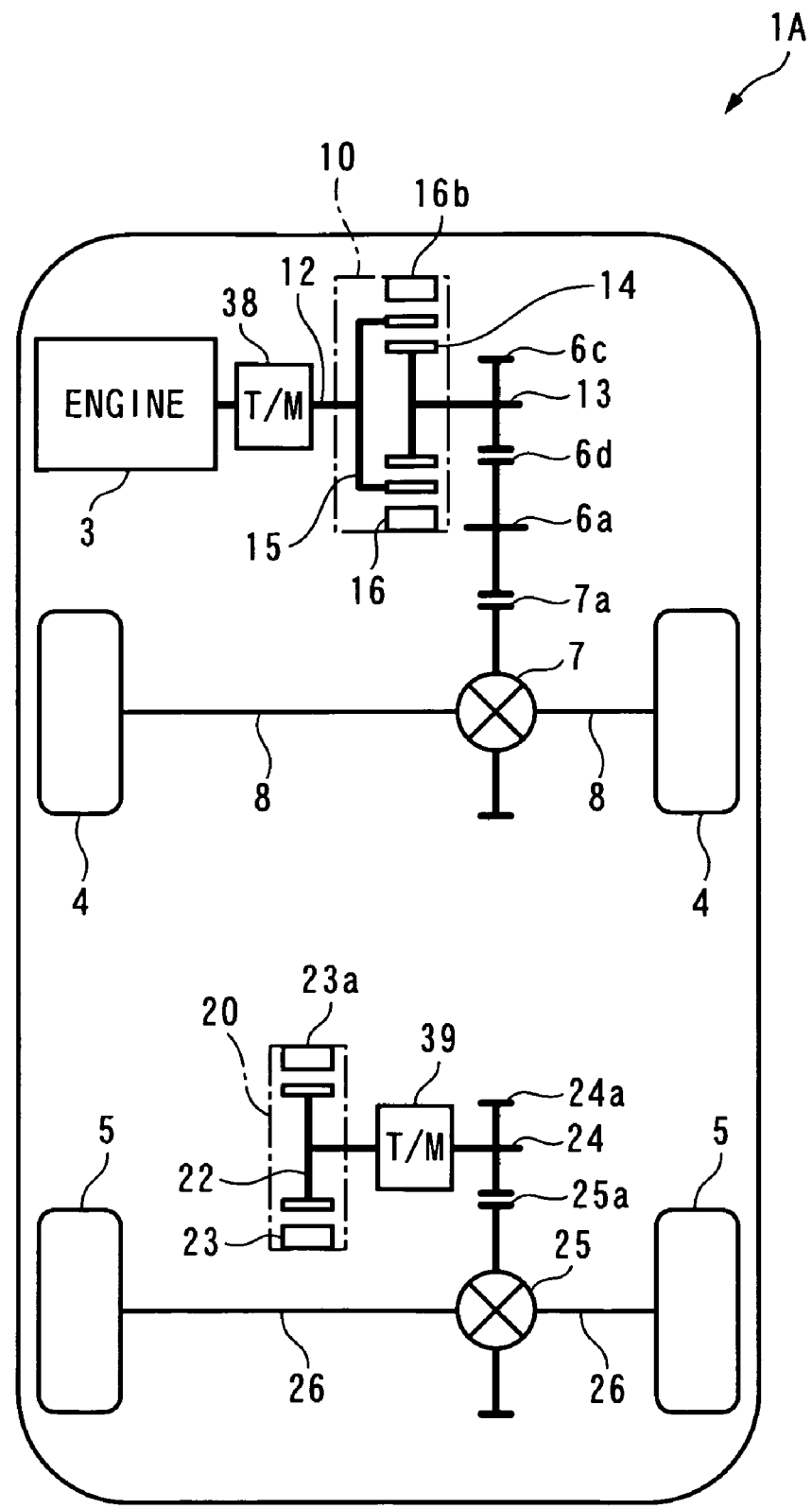
FIG. 21 A diagram showing an example in which a transmission apparatus is provided in the hybrid vehicle according to the second embodiment.

It should be noted that in the exampled shown in FIG. 21, the two transmissions 38 and 39 are provided in the hybrid vehicle 1A, one of the transmissions 38 and 39 may be omitted.

Figure 22:
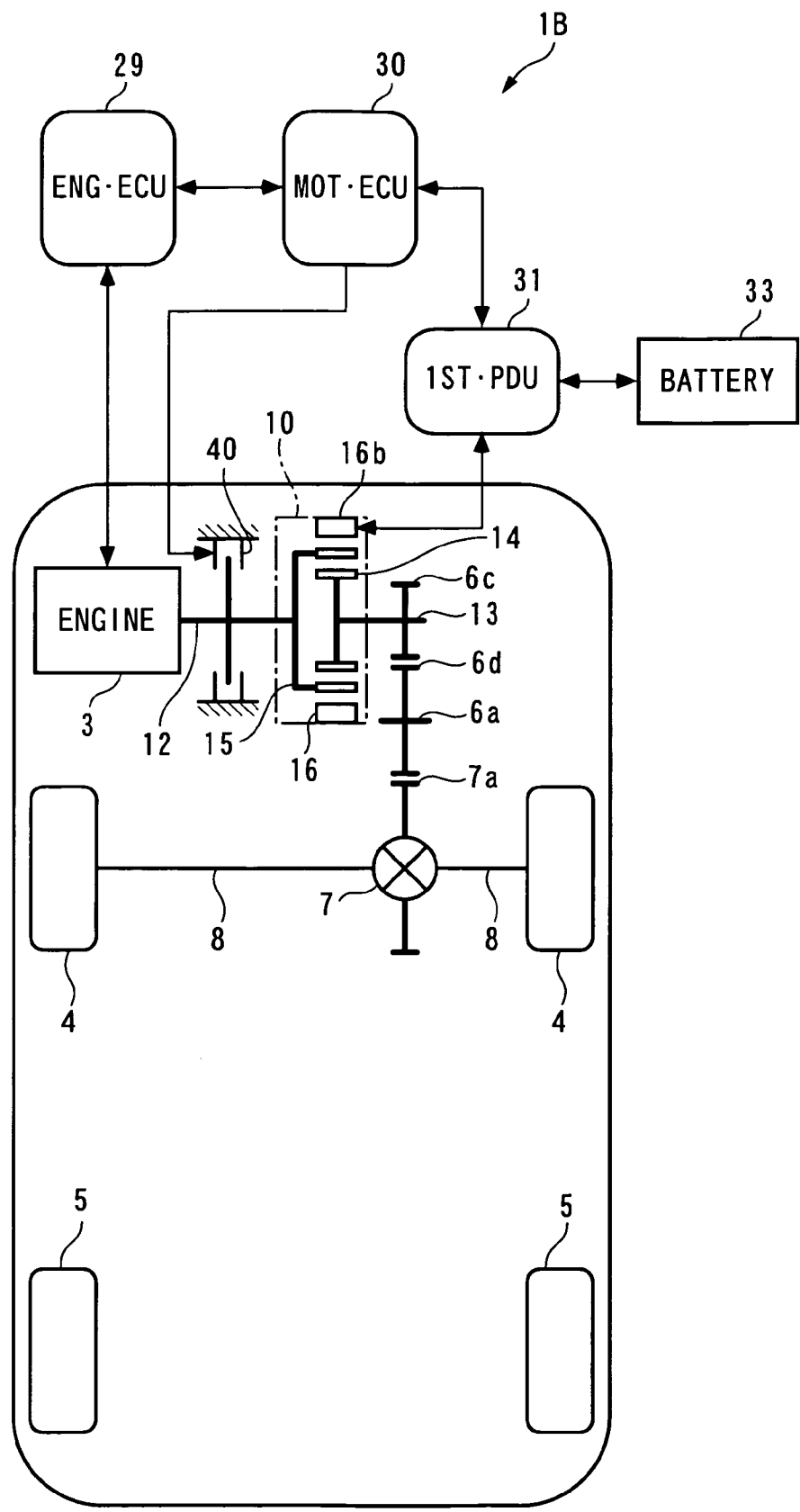
FIG. 22 A diagram schematically showing a hybrid vehicle according to a third embodiment.

Next, a hybrid vehicle (hereinafter referred to as "the vehicle") 1B according to a third embodiment of the present invention will be described with reference to FIG. 22. As shown in the figure, the vehicle 1B is distinguished from the vehicle 1 according to the first embodiment in that the second electric motor 20 and the 2ND•PDU 32 are omitted, and a electromagnetic brake 40 is added, and in the other respects, the vehicle 1B is configured substantially similarly to the vehicle 1 according to the first embodiment. Therefore, the following description will be given mainly of points different from the vehicle 1 according to the first embodiment, and component elements of the vehicle 1B identical to those of the vehicle 1 according to the first embodiment are denoted by identical reference numerals, with detailed description omitted.

In the vehicle 1B, similarly to the aforementioned vehicle 1A according to the second embodiment, the gear 6d on the first gear shaft 6a is in constant mesh with the gear 7a of the differential gear mechanism 7, whereby the rotation of the output shaft 13 is changed in speed at the gear ratio between the gears 6c and 6d, and the gear 7a, for being transmitted to the differential gear mechanism 7 and the front wheels 4 and 4. It should be noted that in the present embodiment, the front wheels 4 correspond to the first drive wheels.

Further, the electromagnetic brake 40 (brake device) is provided between the first electric motor 10 on the input shaft 12 and the engine 3, and is electrically connected to the MOT•ECU 30. The ON/OFF state of the electromagnetic brake 40 is switched by the MOT•ECU 30. In the OFF state, the electromagnetic brake 40 permits the rotation of the input shaft 12, whereas in the ON state, the electromagnetic brake 40 brakes the rotation of the input shaft 12.

Next, a description will be given of control of the first electric motor 10 and the electromagnetic brake 40 by the MOT•ECU 30. It should be noted the electromagnetic brake 40 is controlled to the ON state only when motor-driven start control, described hereinafter, is executed, and in the other various types of control than the motor-driven start control, it is held at the OFF state.

First, a description will be given of engine start control. The engine start control is for starting the engine 3 by the power from the first electric motor 10, on condition that the aforementioned predetermined engine-starting conditions are satisfied when the engine is at rest and the vehicle 3 is at a stop. More specifically, when the predetermined engine-starting conditions are satisfied, the electric power is supplied from the battery 33 to the first electric motor 10 via the 1ST•PDU 31, whereby the second rotor 15 is driven while the first rotor 14 remains at rest. As a result, the engine 3 is started.

Further, in a case where the engine 3 is in operation with the vehicle 1 at a stop, when the aforementioned predetermined vehicle-starting conditions are satisfied, vehicle start control is executed. In the vehicle start control, if the predetermined vehicle-starting conditions are satisfied, first, the first electric motor 10 regenerates electric power from power from the engine 3 (i.e. generates electric power). Then, after the start of the electric power regeneration, the first electric motor 10 is controlled such that the regenerated electric power is reduced. This makes it possible to start the vehicle 1C by the power from the engine 3 while preventing engine stalling.

Further, when the engine 3 is in operation and the vehicle 1 is traveling, distribution control of engine power is executed. In the distribution control, depending on operating conditions of the engine (e.g. the engine speed NE and the accelerator pedal opening AP) and/or traveling conditions of the hybrid vehicle 1 (e.g. the vehicle speed VP), the first electric motor 1 is controlled such that a ratio between part of power output from the engine 3, which is transmitted via the first rotor 14 to the front wheels 4, and part of the same, from which electric power is regenerated by the first electric motor 10, is changed. This makes it possible to cause the hybrid vehicle 1B to travel while appropriately controlling the regenerated electric power, depending on the operating conditions of the engine 3 and/or the traveling conditions of the hybrid vehicle 1B.

Further, during the distribution control, when the aforementioned predetermined power-transmitting conditions are satisfied, the first electric motor 1 is controlled such that the rotational speed of the first and second rotating magnetic fields of the first electric motor 10 becomes equal to 0, whereby insofar as the power from the engine 3 is within a range capable of being transmitted by magnetism, it is possible to transmit all the power to the front wheels 4 via the second rotor 15 and the first rotor 14.

On the other hand, in a case where the vehicle 1 is traveling with the engine 3 in operation (including when the engine 3 is in a decelerating fuel-cut operation), when the remaining charge SOC of the battery 33 is not higher than the aforementioned predetermined value SOC_REF, the regenerated electric power is supplied to the battery 33 whereby charging control for charging the battery 33 is executed. This makes it possible to secure sufficient remaining charge SOC of the battery 33. It should be note that also when the electric power regeneration is performed during the above-described vehicle start control, if the remaining charge SOC of the battery 33 is not higher the predetermined value SOC_REF, the charging control for charging the battery 33 is executed. This makes it possible secure sufficient remaining charge SOC of the battery 33.

Further, in a case where the vehicle 1 is traveling with engine 3 in operation, when predetermined assist conditions are satisfied, the assist control is executed. More specifically, electric power in the battery 33 is supplied to the first electric motor 10 and the first electric motor 10 is controlled such that the front wheels 4 are driven by power from the engine 3 and power from the first electric motor 10. With this control, the vehicle 1 can perform assist traveling by using the first electric motor 10 as a power source, in addition to the engine 3.

Further, in a case where the engine 3 is at rest and the hybrid vehicle 1B is at a stop, when the predetermined motor-driven vehicle-starting conditions are satisfied, the electromagnetic brake 40 is turned ON to brake the second rotor 15, and at the same time, electric power is supplied from the battery 33 to the first electric motor 10, whereby powering control of the first electric motor 10 is executed. This makes it possible to drive the front wheels by the first electric motor 10 with the engine 3 left at rest, to thereby start the hybrid vehicle 1B. As a result, it is possible to improve fuel economy.

Figure 23:
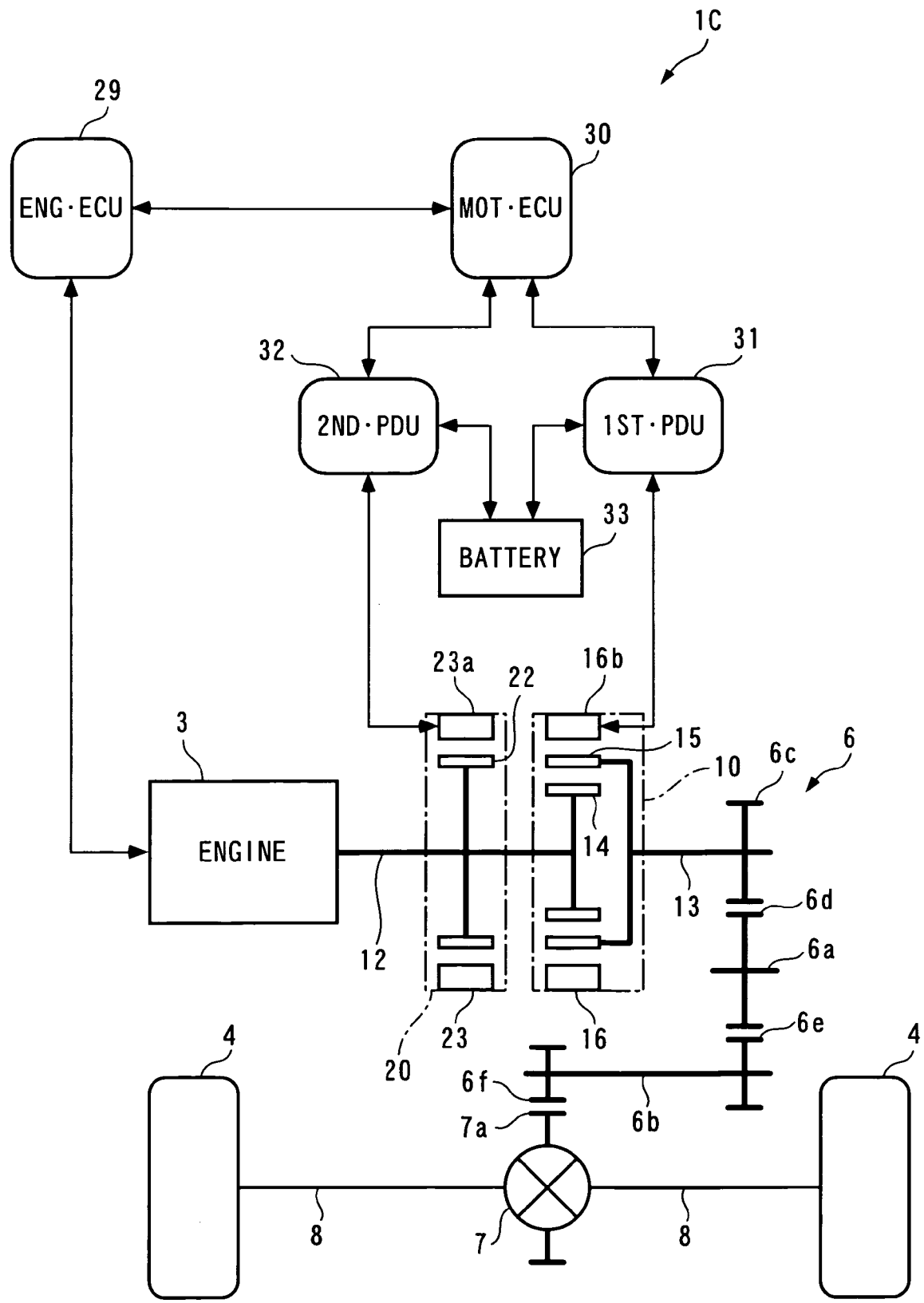
FIG. 23 A diagram schematically showing a hybrid vehicle according to a fourth embodiment.

Next, a hybrid vehicle (hereinafter referred to as "the vehicle") 1C according to a fourth embodiment of the present invention will be described with reference to FIG. 23. As shown in the figure, the vehicle 1C is distinguished from the vehicle 1 according to the first embodiment in that the arrangement of the first electric motor 10 and the second electric motor 20, and in the other respects, the vehicle 1C is configured substantially similarly to the vehicle 1 according to the first embodiment. Therefore, the following description will be given mainly of points different from the vehicle 1 according to the first embodiment, and component elements of the vehicle 1C identical to those of the vehicle 1 according to the first embodiment are denoted by identical reference numerals, with detailed description omitted.

In the vehicle 1C, the second electric motor 20 is disposed between the engine 3 and the first electric motor 10, and the rotor 22 of the second electric motor 20 is concentrically fixed to a predetermined portion of the input shaft 12 (rotating shaft). Further, in the first electric motor 10, the first rotor 14 is concentrically fixed to the right end of the input shaft 12 on the downstream side of the rotor 22, and the second rotor 15 is concentrically fixed to the left end of the output shaft 13. With this arrangement, during operation of the first electric motor 10, when the second rotor 15 is rotating, power thereof is transmitted to the front wheels 4 and 4. It should be noted that in the present embodiment, the front wheels 4 correspond to the first drive wheels.

Next, a description will be given of the method of controlling both the first electric motor 10 and the second electric motor 20 by the MOT•ECU 30 during operation of the vehicle. First, a description will be given of engine start control performed when the vehicle 1C is at a stop. In this control, in a case where the engine 3 is at rest and the vehicle 1C is at a stop, when the aforementioned predetermined starting conditions are satisfied, electric power is supplied from the battery 33 to the first electric motor 10 and/or the second electric motor 20, and the first electric motor 10 and/or the second electric motor 20 are/is controlled such that power from the first electric motor 10 and/or the second electric motor 20 is transmitted to the engine 3 via the input shaft 12. With this control, the engine 3 can be started by the power from the first electric motor 10 and/or the second electric motor 20.

Further, in a case where the vehicle 1C is at a stop with the engine 3 in operation, when the aforementioned predetermined vehicle-starting conditions are satisfied, vehicle start control is executed. More specifically, when the vehicle 1C is at a stop, power from the engine 3 is transmitted to the input shaft 12, and the first rotor 14 of the first electric motor 10 is driven. In this state, if the first electric motor 10 is controlled to execute regeneration of electric power by the first electric motor 10 and the regenerated electric power is supplied to the second electric motor 20, the rotor 22 of the second electric motor 20 drives the first rotor 14, whereby energy recirculation occurs. In this state, if the electric power generated by the first electric motor 10 is controlled to be reduced, the second rotor 15 of the first electric motor 10 rotates to drive the output shaft 13 which drives the front wheels 4 and 4, whereby the vehicle 1C is started. After the start of the vehicle 1C, the electric power regenerated by the first electric motor 10 is further controlled to be reduced, and after the direction of the rotation of the magnetic fields of the stator 16 of the first electric motor 10 is changed from reverse rotation to normal rotation, by executing regeneration control of the second electric motor 20 and powering control of the first electric motor 10, to thereby increase the vehicle speed.

Further, when the vehicle 3 is traveling with the engine 3 in operation, speed change control is executed. In the speed change control, depending on operating conditions of the engine 3 (e.g. the engine speed NE, the accelerator pedal opening AP, etc.) and/or traveling conditions of the hybrid vehicle 1 (e.g. the vehicle speed VP), the second electric motor 20 is controlled such that a ratio between part of power output from the engine 3, which is transmitted via the input shaft 12 to the first rotor 14, and part of the same, from which electric power is regenerated by the second electric motor 20, is changed, and the first electric motor 10 is controlled by supplying the regenerated electric power W thereto. In this case, since the first electric motor 10 has operating characteristics similar to those of a planetary gear unit, as mentioned hereinabove, by controlling the second electric motor 20 as described above and controlling the first electric motor 10 by supplying the regenerated electric power W to the first electric motor 10, provided that electrical losses are ignored, it is possible to change the ratio between the rotational speed of the input shaft 12 and the rotational speed of the output shaft 13, in other words, the ratio between the engine speed NE and the drive shaft speed ND as desired while transmitting all the power from the engine 3 to the front wheels 4 via the first electric motor 10 and the second electric motor 20. In short, by controlling the two electric motor 10 and 20, it is possible to realize the functions of an automatic transmission.

Further, during the speed change control, when predetermined power-transmitting conditions are satisfied, the regeneration of electric power by the first electric motor 10 is stopped, and the rotational speed of the first and second rotating magnetic fields of the first electric motor 10 is controlled to 0 by supplying lock current to the armatures 16b or executing phase-to-phase short circuit control of the first electric motor 10. When such control is performed, insofar as the power from the engine 3 is within a range capable of being transmitted by magnetism, it is possible to transmit all the power from the engine 3 to the front wheels 4 by magnetism, so that it is possible to enhance power transmission efficiency, compared with the case in which electric power regenerated by the first electric motor 10 is caused to be supplied to the second electric motor 20 via the 2ND•PDU 32.

On the other hand, in a case where the vehicle 1 is traveling with the engine 3 in operation (including when the engine 3 is in a decelerating fuel-cut operation), when the remaining charge SOC of the battery 33 is not higher than the aforementioned predetermined value SOC_REF, the electric power regenerated by the first electric motor 10 and/or the second electric motor 20 is controlled and charging control for charging the battery 33 is executed. This makes it possible to secure sufficient remaining charge SOC of the battery 33. It should be noted that during execution of the vehicle starting control and the speed change control described above, if the remaining charge SOC of the battery 33 is not higher than the predetermined value SOC_REF, the charging control for charging the battery 33 may be executed.

Further, when the aforementioned predetermined assist conditions are satisfied with the engine 3 in operation, the assist control is executed. More specifically, by supplying electric power from the battery 33 to the first electric motor 10 and/or the second electric motor 20, the first electric motor 10 and/or the second electric motor 20 are controlled such that power from the first electric motor 10 and/or the second electric motor 20, and power from the engine 3 are transmitted to the front wheels 4. With this control, in addition to the engine 3, the first electric motor 10 and/or the second electric motor 20 are/is used as power sources, whereby the vehicle 1C can perform assist traveling or assist starting.

Further, in a case where the engine 3 is at rest and the hybrid vehicle 1 is at a stop, when the aforementioned predetermined motor-driven vehicle-starting conditions are satisfied, the motor-driven start control is executed. More specifically, electric power is supplied, with the engine 3 left at rest, from the battery 33 to the second electric motor 20 via the 2ND•PDU 32, to control the second electric motor 20 (brake device) such that the rotor 22 is held in a rotation-inhibited state, to thereby brake the rotation of the first rotor 14, and electric power is supplied from the battery 33 to the first electric motor 10 via the 1ST•PDU 31 to control powering of the first electric motor 10. As a result, electric power from the first electric motor 10 is transmitted to the output shaft 13 by magnetism as power, whereby the vehicle 1C can be started.

Next, a description will be given of a control method in which during operation of the vehicle 1C, the control of the second electric motor 20 by the MOT•ECU 30 is stopped, and only the first electric motor 10 is controlled by the MOT•ECU 30. First, if the vehicle 1C is at a stop with the engine 3 is in operation, when the predetermined vehicle-starting conditions are satisfied, vehicle start control is executed. In the vehicle start control, when the predetermined vehicle-starting conditions are satisfied, first, the first electric motor 10 regenerates electric power from power from the engine 3. Then, after the start of the electric power regeneration, the first electric motor 10 is controlled such that the regenerated electric power is reduced. This makes it possible to start the vehicle 1C by the power from the engine 3 while preventing engine stalling.

Further, when the engine 3 is in operation and the vehicle 1 is traveling, distribution control of engine power is executed. In the distribution control, depending on operating conditions of the engine (e.g. the engine speed NE and the accelerator pedal opening AP) and/or traveling conditions of the hybrid vehicle 1 (e.g. the vehicle speed VP), the first electric motor 1 is controlled such that a ratio between part of power output from the engine 3, which is transmitted via the second rotor 15 to the front wheels 4, and part of the same, from which electric power is regenerated by the first electric motor 10, is changed. This makes it possible to cause the hybrid vehicle 1C to travel while appropriately controlling the regenerated electric power, depending on the operating conditions of the engine 3 and/or the traveling conditions of the hybrid vehicle 1C.

Further, during the distribution control, when the aforementioned predetermined power-transmitting conditions are satisfied, the first electric motor 1 is controlled such that the rotational speed of the first rotating and second rotating magnetic fields of the first electric motor 10 becomes equal to 0, whereby insofar as the power from the engine 3 is within a range capable of being transmitted by magnetism, it is possible to transmit all the power to the front wheels 4 via the first rotor 14 and the second rotor 15.

On the other hand, in a case where the vehicle 1C is traveling with the engine 3 in operation (including when the engine 3 is in a decelerating fuel-cut operation), and electric power is regenerated from power from the engine 3, when the remaining charge SOC of the battery 33 is not higher than the aforementioned predetermined value SOC_REF, the regenerated electric power supplied to the battery 33 to thereby execute charging control for charging the battery 33. It should be noted that also when electric power regeneration is executed during the aforementioned vehicle starting control, if the remaining charge SOC of the battery 33 is not higher than the predetermined value SOC_REF, the charging control for charging the battery 33 is executed. This makes it possible to secure sufficient remaining charge SOC of the battery 33.

Further, in a case where the aforementioned predetermined assist conditions are satisfied during traveling of the vehicle 1C with the engine 3 in operation, assist control is executed. More specifically, electric power is supplied from the battery 33 to the first electric motor 10 and the first electric motor 10 is controlled such that power from the engine 3 and power from the first electric motor 10 drive the front wheels 4. With this control, in addition to the engine 3, the first electric motor 10 is used as a power source, whereby the vehicle 1C can perform assist traveling. By thus controlling the first electric motor 10 alone, it is possible to operate the hybrid vehicle 1C.

Figure 24:
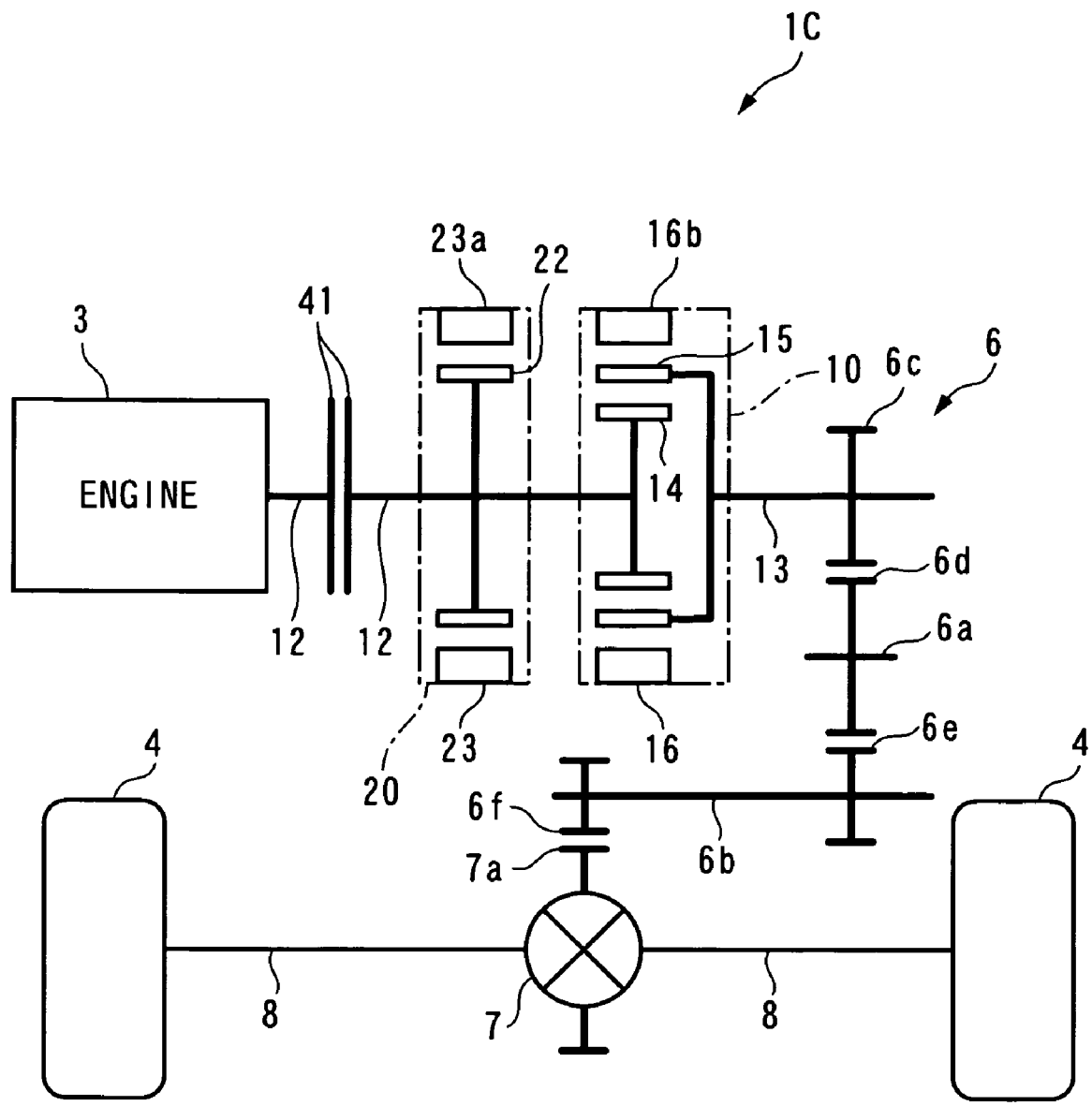
FIG. 24 A diagram showing an example in which a clutch is provided in the hybrid vehicle according to the fourth embodiment.

Although the fourth embodiment is an example in which when starting the vehicle 1C with the engine 3 at rest, the second electric motor 20 is controlled to a stationary state, and the powering control of the first electric motor 10 is executed, in place of this, as shown in FIG. 24, in the vehicle 1C, a clutch 41 may be provided between the engine 3 and the second electric motor 20. With this arrangement, when starting the vehicle 1 with the engine 3 left at rest, the MOT•ECU 30 holds the clutch 41 in a disconnected state, and in this state, at least one of the two electric motors 10 and 20 is subjected to powering control. This makes it possible to start the vehicle 1C with the engine 3 left at rest, by power of at least one of the electric motors 10 and 20. In this case, the clutch 41 may be any mechanism which executes or interrupts transmission of power, e.g. an electromagnetic clutch or a hydraulic clutch actuated by a hydraulic actuator, and which can be controlled by the MOT•ECU 30.

Figure 25:
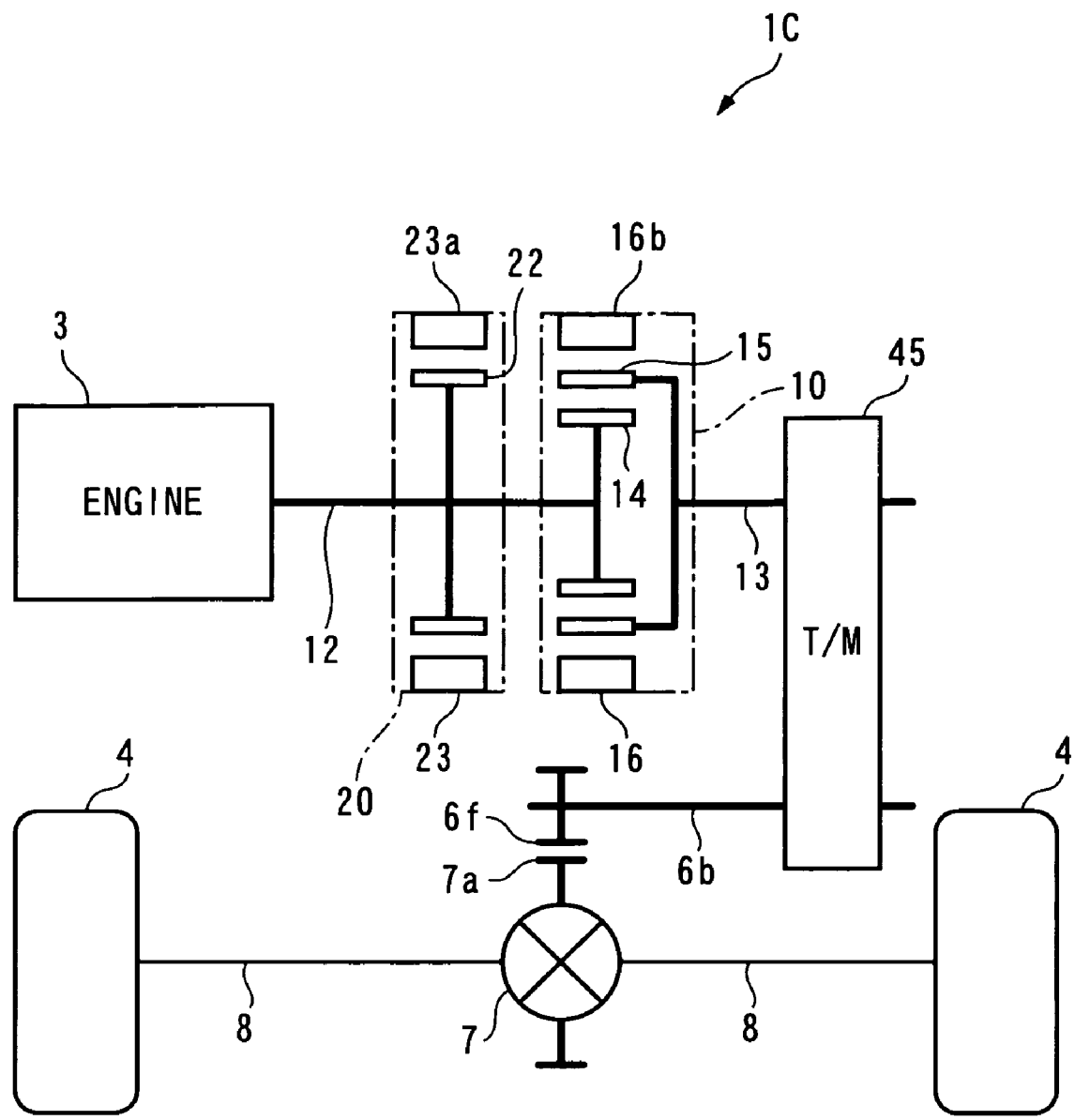
FIG. 25 A diagram showing an example in which a transmission apparatus is provided in the hybrid vehicle according to the fourth embodiment.

On the other hand, in the vehicle 1C according to the fourth embodiment, as shown in FIG. 25, the gear mechanism 6 may be replaced by a transmission 45. The transmission 45 changes the reduction gear ratio between the output shaft 13 and the front wheels r in a stepped or stepless manner and the MOT•ECU 30 controls the speed change operation. It should be noted that as the transmission 45, similarly to the transmission 35 described above, there may be employed any of a stepped automatic transmission equipped with a torque converter, a belt-type stepless automatic transmission, a toroidal-type stepless automatic transmission, an automatic MT, etc. as appropriate.

With this arrangement, it is possible to set the torque to be transmitted to the transmission 45 via the first the first electric motor 10 and the second electric motor 20 to a small value, by setting the reduction gear ratio of the transmission 45 for a low-rotational speed and high-load region, whereby the first electric motor 10 can be reduced in size. On the other hand, by setting the reduction gear ratio of the transmission 45 for a high-vehicle speed and high-load region to a small value, it is possible to reduce the rotational speed of the first electric motor 10 and that of the second electric motor 20. Therefore, as for the first electric motor 10, it is possible to reduce the field rotational speed thereof, whereby it is possible to reduce the energy loss and improve the transmission efficiency as well as prolong the service life thereof. Further, as for the second electric motor 20, it is possible to improve the operating efficiency and prolong the service life thereof.

Figure 26:
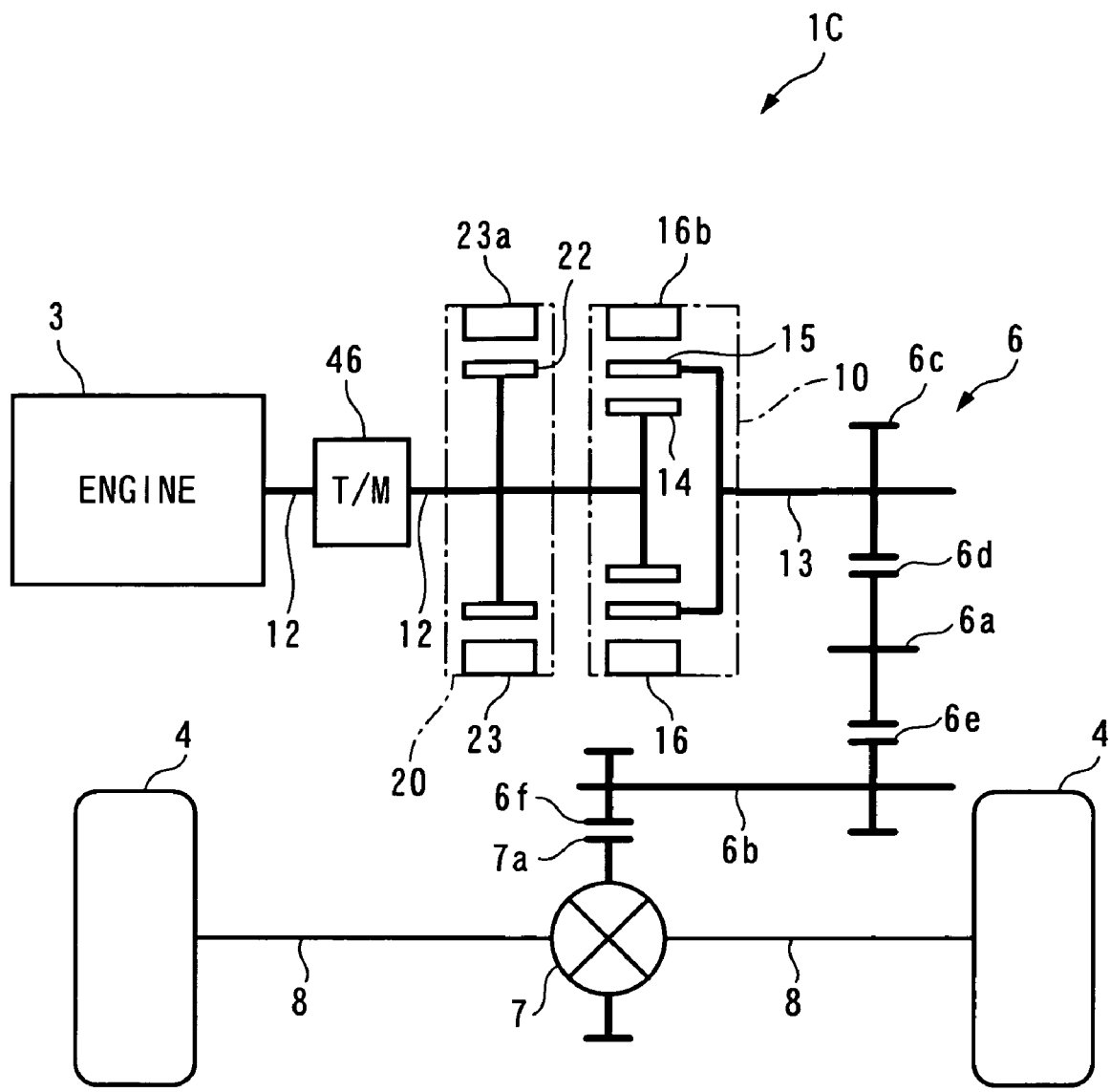
FIG. 26 A diagram showing another example in which a transmission apparatus is provided in the hybrid vehicle according to the fourth embodiment.

Further, in the vehicle 1C according to the fourth embodiment, as shown in FIG. 26, a transmission 46 may be provided in an intermediate portion 12 extending between the engine 3 and the rotor 22. The transmission 46 changes the speed increasing ratio between the engine 3 and the rotor 22 in a stepped or stepless manner and the MOT•ECU 30 controls the speed change operation. It should be noted that as the transmission 46, similarly to the transmission 35 described above, there may be employed any of a stepped automatic transmission equipped with a torque converter, a belt-type stepless automatic transmission, a toroidal-type stepless automatic transmission, an automatic MT, etc. as appropriate.

With this arrangement, it is possible to set the torque to be transmitted to a final reducer side via the first electric motor 10 to a small value, by setting the speed increasing ratio of the transmission 45 for a low-rotational speed and high-load region and the final reduction gear ratio of a final reducer to larger values, whereby the first electric motor 10 and the second electric motor 20 can be reduced in size.

On the other hand, by setting the speed increasing ratio of the transmission 45 for a high-vehicle speed and high-load region to a small value (or 1:1), it is possible to reduce the rotational speed of the first electric motor 10 and that of the second electric motor 20. Therefore, as for the first electric motor 10, it is possible to reduce the field rotational speed, whereby it is possible to reduce the energy loss and improve the transmission efficiency as well as prolong the service life thereof. As for the second electric motor 20, it is possible to improve the operating efficiency and prolong the service life thereof.

Further, in the hybrid vehicle 1C according to the forth embodiment, similarly to the vehicle 1A according to the second embodiment, the location of the second electric motor 20 may be changed from between the engine 3 and the first electric motor 10, rotor 22 to a location toward the rear wheels 5, and the rear wheels 5 may be driven by the second electric motor 20.

With this arrangement, similarly to the vehicle 1A according to the second embodiment, when starting the vehicle 1C, it is possible to start the vehicle 1A in an all-wheel drive state, whereby it is possible to improve startability on low μ roads including a snowy road. Further, also during traveling, the vehicle 1A can run in an all-wheel drive state, which makes it possible to improve traveling stability of the vehicle 1A on low at roads.

INDUSTRIAL APPLICABILITY

The present invention is very useful in that when an electric motor is mechanically connected to an engine, it is possible to improve the durability and efficiency of the electric motor, thereby making it possible to improve marketability,

The invention claimed is:

1. A hybrid vehicle comprising:
an engine;
a first electric motor including a stator, a first rotor and a second rotor relatively rotatable with respect to said stator, one of said first rotor and said second rotor being mechanically connected to said engine; and
first drive wheels mechanically connected to the other of said first rotor and said second rotor of said first electric motor,
wherein said stator includes a first armature row formed by a plurality of first armatures arranged side by side in a circumferential direction, for generating a first rotating magnetic field rotating in a predetermined rotating direction, by magnetic poles generated on said first armatures along with supply of electric power, and a second armature row formed by a plurality of second armatures arranged side by side in the circumferential direction, for generating a second rotating magnetic field rotating in the predetermined rotating direction, by magnetic poles generated on said second armatures along with supply of electric power,
wherein said first rotor includes a first magnetic pole row which is formed by a plurality of first magnetic poles arranged in the circumferential direction, each two adjacent ones of said first magnetic poles having polarities different from each other, and is arranged in a manner opposed to said first armature row, and a second magnetic pole row which is formed by a plurality of second magnetic poles arranged in the circumferential direction, each two adjacent ones of said second magnetic poles having polarities different from each other, and is arranged in a manner opposed to said second armature row,
wherein said second rotor includes a first soft magnetic material element row formed by a plurality of first soft magnetic material elements arranged in the circumferential direction at predetermined intervals, and is arranged between said first armature row and said first magnetic pole row, and a second soft magnetic material element row formed by a plurality of second soft magnetic material elements arranged in the circumferential direction at predetermined intervals, and is arranged between said second armature row and said second magnetic pole row, wherein when each magnetic pole of said first armature and each said first magnetic pole are opposed to each other, each magnetic pole of said second armature and each said second magnetic pole are opposed to each other; when each magnetic pole of said first armature and each said first magnetic pole opposed to each other have polarities different from each other, each magnetic pole of said second armature and each said second magnetic pole opposed to each other have a same polarity; and when each magnetic pole of said first armature and each said first magnetic pole opposed to each other have a same polarity, each magnetic pole of said second armature and each said second magnetic pole opposed to each other have polarities different from each other, and wherein when each magnetic pole of said first armature and each said first magnetic pole are opposed to each other, if each said first soft magnetic material element is in a position between said magnetic pole of said first armature and each said first magnetic pole, each said second soft magnetic material element is in a position between circumferentially adjacent two pairs of said magnetic poles of said second armatures and said second magnetic poles, and if each said second soft magnetic material element is in a position between said magnetic pole of said second armature and said second magnetic pole, each said first soft magnetic material element is in a position between circumferentially adjacent two pairs of said magnetic poles of said first armatures and said first magnetic poles.

2. A hybrid vehicle as claimed in claim 1, further comprising a control device for controlling electric power supplied to said first armature row and said second armature row of said first electric motor,
wherein said first rotor of said first electric motor is mechanically connected to said first drive wheels, and second rotor is mechanically connected to said engine.

3. A hybrid vehicle as claimed in claim 2, wherein in a case where said engine is at rest and at the same time the hybrid vehicle is at a stop, when predetermined engine-starting conditions are satisfied, said control device controls the electric power supplied to said first armature row and said scone armature row such that said first rotating magnetic field and said second rotating magnetic field are generated.

4. A hybrid vehicle as claimed in claim 2, wherein in a case where said engine is in operation and at the same time the hybrid vehicle is at a stop, when predetermined vehicle-starting conditions are satisfied, said control device controls the electric power supplied to said first armature row and said second armature row such that electric power is regenerated from power from said engine by said first electric motor, and after starting the regeneration, the regenerated electric power is reduced.

5. A hybrid vehicle as claimed in claim 2, wherein in a case where said engine is in operation and at the same time the hybrid vehicle is traveling, depending on at least either of operating conditions of said engine and traveling conditions of the hybrid vehicle, said control device controls the electric power supplied to said first armature row and said second armature row such that a ratio between part of power from said engine, which is transmitted to said first drive wheels via said first rotor, and part of the power, from which electric power is regenerated by said first electric motor, is changed.

6. A hybrid vehicle as claimed in claim 2, further comprising a power storage device electrically connected to said control device and said first electric motor, and
wherein in a case where said engine is in operation and a remaining charge of said power storage device is not higher than a predetermined value, said control device controls said first electric motor such that electric power is regenerated by said first electric motor, and executes charging control for charging said power storage device with the regenerated electric power.

7. A hybrid vehicle as claimed in claim 2, wherein in a case where said engine is in operation and at the same time the hybrid vehicle is traveling, when predetermined power-transmitting conditions are satisfied, said control device controls the electric power supplied to said first armature row and said second armature row such that a rational speed of the first rotating magnetic field and a rotational speed of the second rotating magnetic field of said first electric motor become equal to 0.

8. A hybrid vehicle as claimed in claim 2, further comprising a power storage device electrically connected to said control device and said first electric motor, and
wherein in a case where said engine is in operation and the hybrid vehicle is traveling, when predetermined assist conditions are satisfied, said control device controls said first electric motor such that by supplying electric power in said power storage device to said first electric motor, said first drive wheels are driven by power from said engine and said first electric motor.

9. A hybrid vehicle as claimed in claim 2, further comprising a brake device electrically connected to said control device, for braking rotation of said second rotor, and
wherein in a case where said engine is at rest and the hybrid vehicle is at a stop, when predetermined motor-driven vehicle-starting conditions are satisfied, said control device controls said brake device such that the rotation of said second rotor is braked, and controls the electric power supplied to said first armature row and said second armature row such that the first rotating magnetic field and second rotating magnetic field are generated.

10. A hybrid vehicle as claimed in claim 2, further comprising a second electric motor electrically connected to said control device, and having a rotating shaft mechanically connected to said first drive wheels and said first rotor.

11. A hybrid vehicle as claimed in claim 10, wherein in a case where said engine is in operation and the hybrid vehicle is at a stop, when predetermined vehicle-starting conditions are satisfied, said control device controls the electric power supplied to said first armature row and said second armature row such that electric power is regenerated from power from said engine by said first electric motor, and controls said second electric motor by supplying the regenerated electric power to said second electric motor.

12. A hybrid vehicle as claimed in claim 10, wherein in a case where said engine is in operation and at the same time the hybrid vehicle is traveling, depending on at least either of operating conditions of said engine and traveling conditions of the hybrid vehicle, said control device controls the electric power supplied to said first armature row and said second armature row such that a ratio between part of power from said engine, which is transmitted to said first drive wheels via said first rotor and said rotating shaft, and part of the power, from which electric power is regenerated by said first electric motor, is changed, and controls said second electric motor by supplying the regenerated electric power to said second electric motor.

13. A hybrid vehicle as claimed in claim 10, further comprising a power storage device electrically connected to said control device, said first electric motor, and said second electric motor, and
wherein in a case where said engine is in operation and at the same time a remaining charge in said power storage device is not higher than a predetermined value, said control device controls at least one of said first electric motor and said second electric motor such that electric power is regenerated by at least one of said first electric motor and said second electric motor, and executes charging control for charging said power storage device with the regenerated electric power.

14. A hybrid vehicle as claimed in claim 10, further comprising a power storage device electrically connected to said control device, said first electric motor, and said second electric motor, and
wherein in a case where said engine is in operation and at the same time predetermined assist conditions are satisfied, said control device controls at least one of said first electric motor and said second electric motor such that electric power in said power storage device is supplied to at least one of said first electric motor and said second electric motor to thereby cause power from at least one of said first electric motor and said second electric motor and power from said engine to be transmitted to said first drive wheels.

15. A hybrid vehicle as claimed in claim 10, wherein in a case where said engine is at rest and at the same time the hybrid vehicle is at a stop, when predetermined motor-driven vehicle-starting conditions are satisfied, said control device executing powering control of sad first electric motor and said second electric motor.

16. A hybrid vehicle as claimed in claim 10, further comprising a transmission for performing a speed changing operation between said rotating shaft of said first rotor of said first electric motor and said second electric motor, and said first drive wheels.

17. A hybrid vehicle as claimed in claim 10, further comprising a transmission for performing a speed changing operation between said second rotor of said first electric motor and said engine.

18. A hybrid vehicle as claimed in claim 10, wherein said rotating shaft of said second electric motor is mechanically connected to said first rotor of said first electric motor and said first drive wheels via a transmission, and
wherein said transmission performs a speed changing operation between said rotating shaft of said second electric motor, and said first rotor of said first electric motor and said first drive wheels.

19. A hybrid vehicle as claimed in claim 2, further comprising a second electric motor electrically connected to said control device, and mechanically connected to second drive wheels which are separate from said first drive wheels.

20. A hybrid vehicle as claimed in claim 19, further comprising a transmission for performing a speed changing operation between said second rotor of said first electric motor and said engine.

21. A hybrid vehicle as claimed in claim 19, further comprising a transmission for performing a speed changing operation between said second electric motor and said second drive wheels.

22. A hybrid vehicle as claimed in claim 1, further comprising a control device for controlling electric power supplied to said first armature row and said second armature row of said first electric motor, and wherein said first rotor of said first electric motor is mechanically connected to said engine, and said second rotor is mechanically connected to said first drive wheels.

23. A hybrid vehicle as claimed in claim 22, wherein in a case where said engine is at rest and at the same time the hybrid vehicle is at a stop, when predetermined engine-starting conditions are satisfied, said control device controls the electric power supplied to said first armature row and said scone armature row such that said first rotating magnetic field and said second rotating magnetic field are generated.

24. A hybrid vehicle as claimed in claim 22, wherein in a case where said engine is in operation and at the same time the hybrid vehicle is at a stop, when predetermined vehicle-starting conditions are satisfied, said control device controls the electric power supplied to said first armature row and said second armature row such that electric power is regenerated from power from said engine by said first electric motor, and after starting the regeneration, the regenerated electric power is reduced.

25. A hybrid vehicle as claimed in claim 22, wherein in a case where said engine is in operation and at the same time the hybrid vehicle is traveling, depending on at least either of operating conditions of said engine and traveling conditions of the hybrid vehicle, said control device controls the electric power supplied to said first armature row and said second armature row such that a ratio between part of power from said engine, which is transmitted to said first drive wheels via said second rotor, and part of the power, from which electric power is regenerated by said first electric motor, is changed.

26. A hybrid vehicle as claimed in claim 22, further comprising a power storage device electrically connected to said control device and said first electric motor, and wherein in a case where said engine is in operation and a remaining charge of said power storage device is not higher than a predetermined value, said control device controls said first electric motor such that electric power is regenerated by said first electric motor, and executes charging control for charging said power storage device with the regenerated electric power.

27. A hybrid vehicle as claimed in claim 22, wherein in a case where said engine is in operation and at the same time the hybrid vehicle is traveling, when predetermined power-transmitting conditions are satisfied, said control device controls the electric power supplied to said first armature row and said second armature row such that a rational speed of the first rotating magnetic field and a rotational speed of the second rotating magnetic field of said first electric motor become equal to 0.

28. A hybrid vehicle as claimed in claim 22, further comprising a power storage device electrically connected to said control device and said first electric motor, and wherein in a case where said engine is in operation and the hybrid vehicle is traveling, when predetermined assist conditions are satisfied, said control device controls said first electric motor such that by supplying electric power in said power storage device to said first electric motor, said first drive wheels are driven by power from said engine and said first electric motor.

29. A hybrid vehicle as claimed in claim 22, further comprising a brake device electrically connected to said control device, for braking rotation of said first rotor, and wherein in a case where said engine is at rest and the hybrid vehicle is at a stop, when predetermined motor-driven vehicle-starting conditions are satisfied, said control device controls said brake device such that the rotation of said first rotor is braked, and controls the electric power supplied to said first armature row and said second armature row such that the first rotating magnetic field and second rotating magnetic field are generated.

30. A hybrid vehicle as claimed in claim 22, further comprising a second electric motor electrically connected to said control device, and having a rotating shaft mechanically connected to said engine and said first rotor.

31. A hybrid vehicle as claimed in claim 30, wherein in a case where said engine is at rest and the hybrid vehicle is at a stop, when predetermined engine-starting conditions are satisfied, said control device controls at least one of said first electric motor and said second electric motor such that at least one of power from said first electric motor and power from said second electric motor is supplied to said engine via said rotating shaft.

32. A hybrid vehicle as claimed in claim 30, wherein in a case where said engine is in operation and the hybrid vehicle is at a stop, when predetermined vehicle-starting conditions are satisfied, said control device controls the electric power supplied to said first armature row and said second armature row such that electric power is regenerated from power from said engine by said first electric motor and after starting the regeneration, the generated electric power is reduced, and controls said second electric motor by supplying the regenerated electric power to said second electric motor.

33. A hybrid vehicle as claimed in claim 30, wherein in a case where said engine is in operation and at the same time the hybrid vehicle is traveling, depending on at least either of operating conditions of said engine and traveling conditions of the hybrid vehicle, said control device controls said second electric motor such that a ratio between part of power from said engine, which is transmitted to said first rotor via said rotating shaft, and part of the power, from which electric power is regenerated by said second electric motor, is changed, and controls said first electric motor by supplying the regenerated electric power to said first armature row and said second armature row of said first electric motor.

34. A hybrid vehicle as claimed in claim 30, further comprising a power storage device electrically connected to said control device, said first electric motor, and said second electric motor, and wherein in a case where said engine is in operation and at the same time a remaining charge in said power storage device is not higher than a predetermined value, said control device controls at least one of said first electric motor and said second electric motor such that electric power is regenerated by at least one of said first electric motor and said second electric motor, and executes charging control for charging said power storage device with the regenerated electric power.

35. A hybrid vehicle as claimed in claim 30, further comprising a power storage device electrically connected to said control device, said first electric motor, and said second electric motor, and wherein in a case where said engine is in operation and at the same time predetermined assist conditions are satisfied, said control device controls at least one of said first electric motor and said second electric motor such that electric power in said power storage device is supplied to at least one of said first electric motor and said second electric motor to thereby cause power from at least one of said first electric motor and said second electric motor and power from said engine to be transmitted to said first drive wheels.

36. A hybrid vehicle as claimed in claim 30, wherein in a case where said engine is at rest and at the same time the hybrid vehicle is at a stop, when predetermined motor-driven vehicle-starting conditions are satisfied, said control device controls said second electric motor such that said rotating shaft is held unrotatable, and executes powering control of sad first electric motor.

37. A hybrid vehicle as claimed in claim 30, further comprising a clutch for mechanically connecting or disconnecting between said rotating shaft of said first rotor of said first electric motor and said second electric motor, and said engine, and
    wherein in a case where said engine is at rest, and the hybrid vehicle is at a stop, when predetermined vehicle-starting conditions are satisfied, said control device controls said clutch to a disconnecting state, and executes powering control of at least one of said first electric motor and said second electric motor.

38. A hybrid vehicle as claimed in claim 30, further comprising a transmission for performing a speed changing operation between said second rotor of said first electric motor and said first drive wheels.

39. A hybrid vehicle as claimed in claim 30, further comprising a transmission for performing a speed changing operation between said rotating shaft of said second electric motor and said engine.

40. A hybrid vehicle as claimed in claim 22, further comprising a second electric motor electrically connected to the control device, and mechanically connected to second drive wheels which are separate from said first drive wheels.

\* \* \* \* \*